United States Patent
Chen et al.

(10) Patent No.: US 11,706,444 B2
(45) Date of Patent: Jul. 18, 2023

(54) INTER PREDICTION METHOD AND APPARATUS

(71) Applicant: Huawei Technologies Co., Ltd., Shenzhen (CN)

(72) Inventors: Huanbang Chen, Shenzhen (CN); Haitao Yang, Shenzhen (CN); Lian Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/357,555

(22) Filed: Jun. 24, 2021

(65) Prior Publication Data

US 2021/0329289 A1 Oct. 21, 2021

Related U.S. Application Data

(63) Continuation of application No. PCT/CN2019/127669, filed on Dec. 23, 2019.

(30) Foreign Application Priority Data

Dec. 24, 2018 (CN) .......................... 201811588243.6
Feb. 2, 2019 (CN) .......................... 201910108004.4

(51) Int. Cl.
*H04N 19/53* (2014.01)
*H04N 19/105* (2014.01)
(Continued)

(52) U.S. Cl.
CPC ........... *H04N 19/53* (2014.11); *H04N 19/105* (2014.11); *H04N 19/139* (2014.11); *H04N 19/176* (2014.11); *H04N 19/523* (2014.11)

(58) Field of Classification Search
CPC .. H04N 19/176; H04N 19/513; H04N 19/139; H04N 19/46; H04N 19/137;
(Continued)

(56) References Cited

U.S. PATENT DOCUMENTS 10,798,403 B2 * 10/2020 Ikai .......................... H04N 19/52
10,944,984 B2 * 3/2021 Huang .................... H04N 19/52
(Continued)

FOREIGN PATENT DOCUMENTS

CN 102497550 A 6/2012
CN 103561263 A 2/2014
(Continued)

*Primary Examiner* — Daniel Chang
(74) *Attorney, Agent, or Firm* — Leydig, Voit & Mayer, Ltd.

(57) ABSTRACT

An inter prediction method, including: when a prediction mode of a to-be-processed picture block is an affine motion model-based advanced motion vector prediction mode, obtaining control point motion vectors of the to-be-processed picture block, where the control point motion vectors meet preset first motion vector resolution and/or first motion vector bit depth; then, deriving a motion vector of each motion compensation unit in the to-be-processed picture block based on the control point motion vectors; and obtaining a reconstructed block of the to-be-processed picture block based on the motion vector of each motion compensation unit.

25 Claims, 10 Drawing Sheets

(51) Int. Cl.
*H04N 19/139* (2014.01)
*H04N 19/176* (2014.01)
*H04N 19/523* (2014.01)

(58) Field of Classification Search
CPC .... H04N 19/51; H04N 19/523; H04N 19/159; H04N 19/52
See application file for complete search history.

(56) References Cited

U.S. PATENT DOCUMENTS

| | | | |
|---|---|---|---|
| 2015/0264390 A1* | 9/2015 | Laroche | H04N 19/105 375/240.16 |
| 2017/0332095 A1 | 11/2017 | Zou et al. | |
| 2018/0098063 A1 | 4/2018 | Chen et al. | |
| 2018/0192069 A1 | 7/2018 | Chen et al. | |
| 2018/0359483 A1 | 12/2018 | Chen et al. | |
| 2019/0037231 A1* | 1/2019 | Ikai | H04N 19/513 |
| 2019/0230361 A1* | 7/2019 | Zhang | H04N 19/537 |
| 2020/0059651 A1* | 2/2020 | Lin | H04N 19/52 |
| 2020/0077111 A1* | 3/2020 | Chuang | H04N 19/513 |
| 2020/0112725 A1* | 4/2020 | Huang | H04N 19/139 |
| 2021/0092379 A1* | 3/2021 | Zhang | H04N 19/119 |
| 2021/0092436 A1* | 3/2021 | Zhang | H04N 19/176 |
| 2021/0321125 A1* | 10/2021 | Kim | H04N 19/105 |

FOREIGN PATENT DOCUMENTS

| | | | |
|---|---|---|---|
| CN | 106303543 A | 1/2017 | |
| CN | 108886618 A | 11/2018 | |
| TW | 201739252 A | 11/2017 | |
| WO | WO-2016184261 A1 * | 11/2016 | ............... G06T 7/20 |
| WO | 2017130696 A1 | 8/2017 | |
| WO | 2017157259 A1 | 9/2017 | |
| WO | WO-2017164441 A1 * | 9/2017 | ........... H04N 19/103 |
| WO | 2018226066 A1 | 12/2018 | |

* cited by examiner

INTER PREDICTION METHOD AND APPARATUS

CROSS-REFERENCE TO RELATED APPLICATIONS

This application is a continuation of International Application No. PCT/CN2019/127669, filed on Dec. 23, 2019, which claims priority to Chinese Patent Application No. 201811588243.6, filed on Dec. 24, 2018, and Chinese Patent Application No. 201910108004.4, filed on Feb. 2, 2019. All of the aforementioned patent applications are hereby incorporated by reference in their entireties.

TECHNICAL FIELD

Embodiments of this application relate to the video codec field, and in particular, to an inter prediction method and apparatus.

BACKGROUND

With development of information technologies, video services such as high definition television, an online meeting, IPTV, and 3D television rapidly develop. Because of advantages such as intuitiveness and high efficiency, a video signal becomes a most important manner of obtaining information in people's daily life. The video signal includes a large data volume, and therefore needs to occupy a large amount of transmission bandwidth and storage space. To effectively transmit and store the video signal, compression encoding needs to be performed on the video signal. A video compression technology has increasingly become an indispensable key technology in the video application field. In an encoding and decoding process, to save the storage space, motion information is generally stored with relatively low resolution. However, if encoding or decoding is still performed with relatively low-resolution motion information, inter prediction accuracy is relatively low.

SUMMARY

Embodiments of this application provide an inter prediction method and apparatus, which can effectively improve inter prediction accuracy.

According to a first aspect, an embodiment of this application provides an inter prediction method, including: determining that a prediction mode of a to-be-processed picture block is an affine motion model-based prediction mode; obtaining control point motion vectors of the to-be-processed picture block; deriving a motion vector of each motion compensation unit in the to-be-processed picture block based on the control point motion vectors; performing motion compensation based on the motion vector of each motion compensation unit, to obtain a prediction block of the to-be-processed picture block; processing the motion vector of the motion compensation unit to meet preset motion vector resolution and/or motion vector bit depth; and obtaining a reconstructed block of the to-be-processed picture block based on the prediction block and a processed motion vector.

In an embodiment, the processing the motion vector of the motion compensation unit to meet preset motion vector resolution and/or motion vector bit depth includes: comparing motion vector resolution and/or motion vector bit depth of the motion compensation unit with the preset motion vector resolution and/or motion vector bit depth; and when the motion vector resolution of the motion compensation unit does not meet the preset motion vector resolution and/or motion vector bit depth, converting the motion vector resolution and/or the motion vector bit depth of the motion compensation unit into the preset motion vector resolution and/or motion vector bit depth.

In an embodiment, the converting the motion vector resolution and/or the motion vector bit depth of the motion compensation unit into the preset motion vector resolution and/or motion vector bit depth includes:

If motion vector resolution and bit depth of a storage unit are ¼ accuracy and 16 bits, and the motion vector resolution and bit depth of the motion compensation unit are ¹⁄₁₆ accuracy and 18 bits, resolution and bit depth finally stored in motion information of the motion compensation unit are ¼ accuracy and 16 bits. A motion vector in ¼ accuracy may be directly derived according to formula (9) in the specification for storage. Alternatively, a motion vector in ¹⁄₁₆ accuracy obtained in the step of deriving the motion vector of each motion compensation unit in the to-be-processed picture block based on the control point motion vectors may be directly quantized to obtain a motion vector in ¼ accuracy. A quantization method is, for example, a round function in the following, where mvShift is set to 2.

In an embodiment, the method further includes: when the motion vector of the motion compensation unit meets the preset motion vector resolution and/or motion vector bit depth, skipping performing the conversion.

In an embodiment, the obtaining a reconstructed block of the to-be-processed picture block based on the prediction block and a processed motion vector includes: adding the prediction block and a residual block of the to-be-processed picture block to obtain the reconstructed block of the to-be-processed picture block; or updating the prediction block based on the processed motion vector, and adding an updated prediction block and a residual block of the to-be-processed picture block to obtain the reconstructed block of the to-be-processed picture block; or adding the prediction block and a residual block of the to-be-processed picture block to obtain the reconstructed block of the to-be-processed picture block, and performing filtering processing on the reconstructed block based on the processed motion vector; or adding the prediction block and a residual block of the to-be-processed picture block to obtain the reconstructed block of the to-be-processed picture block, and using the processed motion vector and the reconstructed block as prediction information of a subsequent to-be-processed picture block.

According to a second aspect, an embodiment of this application provides an inter prediction method, including: determining that a prediction mode of a to-be-processed picture block is an affine motion model-based prediction mode; obtaining control point motion vectors of the to-be-processed picture block; processing the control point motion vectors to meet preset motion vector resolution and/or motion vector bit depth; deriving a motion vector of each motion compensation unit in the to-be-processed picture block based on a processed motion vector; and performing motion compensation based on the motion vector of each motion compensation unit, to obtain a prediction block of the to-be-processed picture block.

In an embodiment, the processing the control point motion vectors to meet preset motion vector resolution and/or motion vector bit depth includes: comparing control point motion vector resolution and/or motion vector bit depth with the preset motion vector resolution and/or motion vector bit depth; and when the control point motion vector resolution does not meet the preset motion vector resolution and/or motion vector bit depth, converting the control point motion vector resolution and/or motion vector bit depth into the preset motion vector resolution and/or motion vector bit depth.

In an embodiment, the converting the control point motion vector resolution and/or motion vector bit depth into the preset motion vector resolution and/or motion vector bit depth includes:

If the CPMV is obtained by using an inherited motion vector prediction method, resolution of the CPMV and bit depth may be obtained based on an adjacent affine unit of a current block, where motion vector resolution and bit depth of an adjacent block are obtained by reading motion information of a storage unit, that is, ¼ accuracy and 16 bits. A motion vector in 1/16 accuracy is derived according to formulas (6) and (7) in the specification.

A specific implementation operation may be performed based on the following procedure. Log 2 is a function of taking a logarithm of 2, << indicates left shift, >> indicates right shift, P is a width of an adjacent affine coding block, and Q is a height of the adjacent affine coding block:

$$\log 2P = \text{Log } 2(P)$$

$$\log 2Q = \text{Log } 2(Q)$$

$$\text{mvScaleHor} = vx4 << 7$$

$$\text{mvScaleVer} = vy4 << 7$$

$$dHorX = (vx5 - vx4) << (7 - \log 2P)$$

$$dVerX = (vy5 - vy4) << (7 - \log 2Q)$$

If an adjacent affine decoding block is a 6-parameter affine decoding block, let:

$$dHorY = (vx6 - vx4) << (7 - \log 2P)$$

$$dVerY = (vy6 - vy4) << (7 - \log 2Q)$$

If an adjacent affine decoding block is a 4-parameter affine decoding block, let:

$$dHorY = -dVerX$$

$$dVerY = dHorX$$

Then, control point motion vectors of a current affine decoding block may be calculated based on the following formulas:

$$vx0 = \text{Round}(\text{mvScaleHor} + dHorX*(x0-x4-M/2) + dHorY*(y0-y4-N/2))$$

$$vy0 = \text{Round}(\text{mvScaleVer} + dVerX*(x0-x4-M/2) + dVerY*(y0-y4-N/2))$$

$$vx1 = \text{Round}(\text{mvScaleHor} + dHorX*(x1-x4-M/2) + dHorY*(y1-y4-N/2))$$

$$vy1 = \text{Round}(\text{mvScaleVer} + dVerX*(x1-x4-M/2) + dVerY*(y1-y4-N/2))$$

$$vx2 = \text{Round}(\text{mvScaleHor} + dHorX*(x2-x4-M/2) + dHorY*(y2-y4-N/2))$$

$$vy2 = \text{Round}(\text{mvScaleVer} + dVerX*(x2-x4-M/2) + dVerY*(y2-y4-N/2))$$

Operations of the Round function are as follows: For any input K and mvShift, output K is obtained in the following manner:

$$\text{offset} = 1 << (\text{mvShift} - 1)$$

$$K = K >= 0 ? (K + \text{offset}) >> \text{mvShift} : -((-K + \text{offset}) >> \text{mvShift})$$

By setting mvShift to 5, the resolution of the CPMV is improved.

The resulting CPMV is then clipped so that the CPMV does not exceed a dynamic range of 18 bits.

If the CPMV is obtained by using a constructed motion vector prediction method, resolution and storage of the CPMV are the same as those of an adjacent block, that is, ¼ accuracy and 16 bits. Then, left shift is performed by 2 bits to obtain an 18-bit CPMV in ¼ accuracy.

In an embodiment, the method further includes: when the control point motion vectors meet the preset motion vector resolution and/or motion vector bit depth, skipping performing the conversion.

According to a third aspect, an embodiment of this application provides an inter prediction apparatus, including: a determining module, configured to determine that a prediction mode of a to-be-processed picture block is an affine motion model-based prediction mode; an obtaining module, configured to obtain control point motion vectors of the to-be-processed picture block; a calculation module, configured to derive a motion vector of each motion compensation unit in the to-be-processed picture block based on the control point motion vectors; a compensation module, configured to perform motion compensation based on the motion vector of each motion compensation unit, to obtain a prediction block of the to-be-processed picture block; a processing module, configured to process the motion vector of the motion compensation unit to meet preset motion vector resolution and/or motion vector bit depth; and a reconstruction module, configured to obtain a reconstructed block of the to-be-processed picture block based on the prediction block and a processed motion vector.

In an embodiment, the processing module is specifically configured to: compare motion vector resolution and/or motion vector bit depth of the motion compensation unit with the preset motion vector resolution and/or motion vector bit depth; and when the motion vector resolution of the motion compensation unit does not meet the preset motion vector resolution and/or motion vector bit depth, convert the motion vector resolution and/or the motion vector bit depth of the motion compensation unit into the preset motion vector resolution and/or motion vector bit depth.

In an embodiment, the processing module is further configured to: when the motion vector of the motion compensation unit meets the preset motion vector resolution and/or motion vector bit depth, skip performing the conversion.

In an embodiment, the reconstruction module is specifically configured to: add the prediction block and a residual block of the to-be-processed picture block to obtain the reconstructed block of the to-be-processed picture block; or update the prediction block based on the processed motion vector, and add an updated prediction block and a residual block of the to-be-processed picture block to obtain the reconstructed block of the to-be-processed picture block; or add the prediction block and a residual block of the to-be-processed picture block to obtain the reconstructed block of the to-be-processed picture block, and perform filtering processing on the reconstructed block based on the processed motion vector; or add the prediction block and a residual block of the to-be-processed picture block to obtain the reconstructed block of the to-be-processed picture block, and use the processed motion vector and the reconstructed block as prediction information of a subsequent to-be-processed picture block.

According to a fourth aspect, an embodiment of this application provides an inter prediction apparatus, including: a determining module, configured to determine that a prediction mode of a to-be-processed picture block is an affine motion model-based prediction mode; an obtaining module, configured to obtain control point motion vectors of the to-be-processed picture block; a processing module, configured to process the control point motion vectors to meet preset motion vector resolution and/or motion vector bit depth; a calculation module, configured to derive a motion vector of each motion compensation unit in the to-be-processed picture block based on a processed motion vector; and a compensation module, configured to perform motion compensation based on the motion vector of each motion compensation unit, to obtain a prediction block of the to-be-processed picture block.

In an embodiment, the processing module is specifically configured to: compare control point motion vector resolution and/or motion vector bit depth with the preset motion vector resolution and/or motion vector bit depth; and when the control point motion vector resolution does not meet the preset motion vector resolution and/or motion vector bit depth, convert the control point motion vector resolution and/or motion vector bit depth into the preset motion vector resolution and/or motion vector bit depth.

In an embodiment, the processing module is further configured to: when the control point motion vectors meet the preset motion vector resolution and/or motion vector bit depth, skip performing the conversion.

According to a fifth aspect, an embodiment of this application provides a video codec device, including: a nonvolatile memory and a processor that are coupled to each other, where the processor invokes program code stored in the memory to perform the method in any one of the foregoing aspects.

Compared with a conventional technology in which stored motion information and motion information for motion compensation need to be separately derived, in this application, motion compensation is performed by improving the control point motion vector resolution and bit depth, which can effectively improve inter prediction accuracy of a coding block using an affine motion model.

In addition, for technical effects brought by a design manner of any one of the foregoing aspects, refer to technical effects brought by different design manners of the first aspect and the second aspect. Details are not described herein again.

In the embodiments of this application, a name of the inter prediction apparatus imposes no limitation on the apparatus. In actual implementation, the apparatus may have other names. Provided that functions of each device are similar to those in the embodiments of this application, it falls within the scope of the claims of this application and their equivalent technologies.

According to a sixth aspect, an embodiment of this application provides an inter prediction method, including: after it is determined that a prediction mode of a to-be-processed picture block is an affine motion model-based advanced motion vector prediction (Advanced Motion Vector Prediction, AMVP) mode, obtaining control point motion vectors of the to-be-processed picture block, and then deriving a motion vector of each motion compensation unit in the to-be-processed picture block based on the control point motion vectors; and obtaining a reconstructed block of the to-be-processed picture block based on the motion vector of each motion compensation unit. The control point motion vectors meet preset first motion vector resolution and/or first motion vector bit depth.

This embodiment of this application provides a resolution change process in the affine AMVP mode. By improving the control point motion vector resolution and bit depth and performing motion compensation, inter prediction accuracy of a coding block using the affine motion model can be effectively improved.

With reference to the sixth aspect, in a first feasible implementation, the obtaining control point motion vectors of the to-be-processed picture block includes: obtaining control point motion vector differences (CPMVD) and control point motion vector predictors (CPMVP); when resolution of the CPMVDs is not equal to the first motion vector resolution, obtaining the control point motion vectors of the to-be-processed picture block based on the CPMVDs and a first shift value; or when resolution of the CPMVPs is not equal to the first motion vector resolution, obtaining the control point motion vectors of the to-be-processed picture block based on the CPMVPs and a second shift value.

For example, the control point motion vectors of the to-be-processed picture block are obtained according to the following formula:

CPMV=CPMVD'+CPMVP', where when the resolution of the CPMVD is not equal to the first motion vector resolution, CPMVD'=CPMVD<<mvrShift1; when the resolution of the CPMVD is equal to the first motion vector resolution, CPMVD'=CPMVD; when the resolution of the CPMVP is not equal to the first motion vector resolution, CPMVP'=CPMVP<<mvrShift2; when the resolution of the CPMVP is equal to the first motion vector resolution, CPMVP'=CPMVP; and CPMV represents the control point motion vector, mvrShift1 represents the first shift value, and mvrShift2 represents the second shift value.

For example, when the first motion vector resolution is $\frac{1}{16}$ pixel accuracy, and the resolution of the CPMVD is $\frac{1}{16}$ pixel accuracy, the first shift value is equal to 0. When the first motion vector resolution is $\frac{1}{16}$ pixel accuracy, and the resolution of the CPMVD is $\frac{1}{4}$ pixel accuracy, the first shift value is equal to 2. When the first motion vector resolution is $\frac{1}{16}$ pixel accuracy, and the resolution of the CPMVD is integral pixel accuracy, the first shift value is equal to 4. When the first motion vector resolution is $\frac{1}{16}$ pixel accuracy, and the resolution of the CPMVP is $\frac{1}{16}$ pixel accuracy, the second shift value is equal to 0. When the first motion vector resolution is $\frac{1}{16}$ pixel accuracy, and the resolution of the CPMVP is $\frac{1}{4}$ pixel accuracy, the second shift value is equal to 2. When the first motion vector resolution is $\frac{1}{16}$ pixel accuracy, and the resolution of the CPMVP is integral pixel accuracy, the second shift value is equal to 4.

It should be understood that when the first shift value is equal to 0 or the second shift value is equal to 0, in an embodiment, no shifting is performed.

With reference to the foregoing embodiment, another embodiment, when bit depth of the control point motion vectors is greater than the first motion vector bit depth, the control point motion vectors are clipped, so that the bit depth of the control point motion vectors is equal to the first motion vector bit depth.

With reference to the foregoing embodiments, another embodiment, the control point motion vectors are clipped, so that the bit depth of the control point motion vectors is equal to the first motion vector bit depth.

With reference to any one of the foregoing embodiments, in another embodiment, the method further includes: processing motion vector resolution of the motion compensation unit to meet preset second motion vector resolution, and/or processing motion vector bit depth of the motion compensation unit to meet preset second motion vector bit depth; and storing a processed motion vector of the motion compensation unit.

For example, the processed motion vector of the motion compensation unit is obtained according to the following formula:

MCUMV'=(MCUMV>>mvrShift3), where MCUMV' represents the processed motion vector of the motion compensation unit, MCUMV represents a motion vector of the motion compensation unit before processing, and mvrShift3 represents a third shift value.

For example, when the second motion vector resolution is ¼ pixel accuracy, and the resolution of the MCUMV is 1/16 pixel accuracy, the third shift value is equal to 2; when the second motion vector resolution is ¼ pixel accuracy, and the resolution of the MCUMV is ¼ pixel accuracy, the third shift value is equal to 0; and when the second motion vector resolution is ¼ pixel accuracy, and the resolution of the MCUMV is 1/32 pixel accuracy, the third shift value is equal to 3.

With reference to the foregoing embodiments, in another embodiment, the method further includes: clipping bit depth of the processed motion vector of the motion compensation unit, so that the bit depth of the processed motion vector of the motion compensation unit is equal to the second motion vector bit depth.

With reference to the foregoing embodiments, in another embodiment, the method further includes: when bit depth of the processed motion vector of the motion compensation unit is greater than the second motion vector bit depth, clipping the processed motion vector of the motion compensation unit, so that the bit depth of the processed motion vector of the motion compensation unit is equal to the second motion vector bit depth.

With reference to any one of the foregoing embodiments, in another embodiment, the obtaining a reconstructed block of the to-be-processed picture block based on the motion vector of each motion compensation unit includes: performing motion compensation based on the motion vector of each motion compensation unit, to obtain a prediction block of the to-be-processed picture block; and obtaining the reconstructed block of the to-be-processed picture block based on the prediction block and the motion vector of each motion compensation unit.

According to a seventh aspect, an embodiment of this application provides an inter prediction method, including: after it is determined that a prediction mode of a to-be-processed picture block is an affine motion model-based merge (Merge) prediction mode, obtaining control point motion vectors of the to-be-processed picture block; adjusting the control point motion vectors to meet preset first motion vector resolution and/or first motion vector bit depth; deriving a motion vector of each motion compensation unit in the to-be-processed picture block based on adjusted control point motion vectors; and obtaining a reconstructed block of the to-be-processed picture block based on the motion vector of each motion compensation unit.

Embodiment 1 of this application provides a resolution change process in the affine AMVP mode. By improving the control point motion vector resolution and bit depth and performing motion compensation, inter prediction accuracy of a coding block using the affine motion model can be effectively improved.

With reference to the seventh aspect, in an embodiment, the adjusting the control point motion vectors includes: when resolution of the control point motion vectors is not equal to the first motion vector resolution, obtaining the adjusted control point motion vectors based on the control point motion vectors and a first shift value.

For example, the adjusted control point motion vectors are obtained according to the following formula:

CPMV'=CPMV<<mvrShift1, where CPMV represents the control point motion vector, CPMV' represents the adjusted control point motion vector, and mvrShift1 represents the first shift value.

For example, when the first motion vector resolution is 1/16 pixel accuracy, and the control point motion vector resolution is 1/16 pixel accuracy, the first shift value is equal to 0; when the first motion vector resolution is 1/16 pixel accuracy, and the control point motion vector resolution is ¼ pixel accuracy, the first shift value is equal to 2; and when the first motion vector resolution is 1/16 pixel accuracy, and the control point motion vector resolution is integral pixel accuracy, the first shift value is equal to 4.

It should be understood that when the first shift value is equal to 0, in an embodiment, no shifting is performed.

With reference to the foregoing embodiments, in another embodiment, the method further includes: when bit depth of the adjusted control point motion vectors is greater than the first motion vector bit depth, clipping the adjusted control point motion vectors, so that the bit depth of the adjusted control point motion vectors is equal to the first motion vector bit depth.

With reference to the foregoing embodiments, in another embodiment, the method further includes: clipping the adjusted control point motion vectors, so that bit depth of the adjusted control point motion vectors is equal to the first motion vector bit depth.

With reference to the seventh aspect, in an embodiment, a prediction mode of a processed adjacent picture block of the to-be-processed picture block is an affine motion model-based prediction mode. When the control point motion vectors of the to-be-processed picture block are derived based on control point motion vectors of the processed adjacent picture block, the adjusted control point motion vectors are obtained according to the following formulas:

$$vx0 = K1 >= 0 ? (K1 + \text{offset}) >> \text{mvShift} : -((-K1 + \text{offset}) >> \text{mvShift}),$$

$$vy0 = K2 >= 0 ? (K2 + \text{offset}) >> \text{mvShift} : -((-K2 + \text{offset}) >> \text{mvShift}),$$

$$vx1 = K3 >= 0 ? (K3 + \text{offset}) >> \text{mvShift} : -((-K3 + \text{offset}) >> \text{mvShift}),$$

$$vy1 = K4 >= 0 ? (K4 + \text{offset}) >> \text{mvShift} : -((-K4 + \text{offset}) >> \text{mvShift}),$$

$$vx2 = K5 >= 0 ? (K5 + \text{offset}) >> \text{mvShift} : -((-K5 + \text{offset}) >> \text{mvShift}),$$

$$vy2 = K6 >= 0 ? (K6 + \text{offset}) >> \text{mvShift} : -((-K6 + \text{offset}) >> \text{mvShift}), \text{ where}$$

$$K1 = \text{mvScaleHor} + \text{dHorX}*(x0-x4-M/2) + \text{dHorY}*(y0-y4-N/2),$$

$$K2 = \text{mvScaleVer} + \text{dVerX}*(x0-x4-M/2) + \text{dVerY}*(y0-y4-N/2),$$

$K3 = \text{mvScaleHor} + \text{dHorX}*(x1-x4-M/2) + \text{dHorY}*(y1-y4-N/2),$ $K4 = \text{mvScaleVer} + \text{dVerX}*(x1-x4-M/2) + \text{dVerY}*(y1-y4-N/2),$ $K5 = \text{mvScaleHor} + \text{dHorX}*(x2-x4-M/2) + \text{dHorY}*(y2-y4-N/2),$ $K6 = \text{mvScaleVer} + \text{dVerX}*(x2-x4-M/2) + \text{dVerY}*(y2-y4-N/2),$ offset = 1<<(mvShift−1), mvScaleHor = vx4<<7, mvScaleVer = vy4<<7, dHorX = (vx5−vx4)<<(7−log 2(P)), dVerX = (vy5−vy4)<<(7−log 2(Q)), when the affine motion model of the processed adjacent picture block is a 6-parameter model, dHorY=(vx6−vx4)<<(7−log 2(P)), and dVerY=(vy6−vy4)<<(7−log 2(Q));

when the affine motion model of the processed adjacent picture block is a 4-parameter model, dHorY=−dVerX, and dVerY=dHorX;

Log 2( ) represents a function of taking a logarithm of 2, << represents left shift, >> represents right shift, P is a width of the processed adjacent picture block, and Q is a height of the processed adjacent picture block;

(vx0, vy0), (vx1, vy1), and (vx2, vy2) respectively represent horizontal components and vertical components of motion vectors of three control points of the to-be-processed picture block; to be specific, (vx0, vy0) is a horizontal component and a vertical component of a motion vector of a first control point of the to-be-processed picture block, (vx1, vy1) is a horizontal component and a vertical component of a motion vector of a second control point of the to-be-processed picture block, and (vx2, vy2) is a horizontal component and a vertical component of a motion vector of a third control point of the to-be-processed picture block;

(vx4, vy4), (vx5, vy5), and (vx6, vy6) respectively represent horizontal components and vertical components of motion vectors of three control points of the processed adjacent picture block; to be specific, (vx4, vy4) is a horizontal component and a vertical component of a motion vector of a first control point of the processed adjacent picture block, (vx5, vy5) is a horizontal component and a vertical component of a motion vector of a second control point of the processed adjacent picture block, and (vx6, vy6) is a horizontal component and a vertical component of a motion vector of a third control point of the processed adjacent picture block; and mvShift is determined based on control point motion vector resolution of the processed adjacent picture block.

It should be noted that the adjacent picture block may be a spatially adjacent affine coding block or a temporally adjacent affine coding block.

When resolution of the CPMV stored in the adjacent affine block is ¼ pixel accuracy, the resolution of the CPMV of the to-be-processed picture block is obtained as 1/16 pixel accuracy by setting mvShift to 5. When the resolution of the CPMV stored in the adjacent affine block is ¼ pixel accuracy, the resolution of the CPMV of the to-be-processed picture block may be obtained as 1/32 pixel accuracy by setting mvShift to 6. When the resolution of the CPMV stored in the adjacent affine block is ¼ pixel accuracy, the resolution of the CPMV of the to-be-processed picture block may be obtained as ¼ pixel accuracy by setting mvShift to 7. The resolution of the CPMV of the adjacent affine block may refer to stored motion vector resolution of a storage unit.

With reference to any one of the foregoing embodiments, in another embodiment, the method further includes: processing motion vector resolution of the motion compensation unit to meet preset second motion vector resolution, and/or processing motion vector bit depth of the motion compensation unit to meet preset second motion vector bit depth; and storing a processed motion vector of the motion compensation unit.

For example, the processed motion vector of the motion compensation unit is obtained according to the following formula:

MCUMV'=(MCUMV>>mvrShift2), where MCUMV' represents the processed motion vector of the motion compensation unit, MCUMV represents a motion vector of the motion compensation unit before processing, and mvrShift2 represents a second shift value.

For example, when the second motion vector resolution is ¼ pixel accuracy, and the resolution of the MCUMV is 1/16 pixel accuracy, the second shift value is equal to 2; when the second motion vector resolution is ¼ pixel accuracy, and the resolution of the MCUMV is ¼ pixel accuracy, the second shift value is equal to 0; and when the second motion vector resolution is ¼ pixel accuracy, and the resolution of the MCUMV is 1/32 pixel accuracy, the second shift value is equal to 3.

With reference to the foregoing embodiments, in another embodiment, the method further includes: clipping bit depth of the processed motion vector of the motion compensation unit, so that the bit depth of the processed motion vector of the motion compensation unit is equal to the second motion vector bit depth.

With reference to the foregoing embodiments, in another embodiment, the method further includes: when bit depth of the processed motion vector of the motion compensation unit is greater than the second motion vector bit depth, clipping the processed motion vector of the motion compensation unit, so that the bit depth of the processed motion vector of the motion compensation unit is equal to the second motion vector bit depth.

With reference to any one of the foregoing embodiments, in another embodiment, the obtaining a reconstructed block of the to-be-processed picture block based on the motion vector of each motion compensation unit includes: performing motion compensation based on the motion vector of each motion compensation unit, to obtain a prediction block of the to-be-processed picture block; and obtaining the reconstructed block of the to-be-processed picture block based on the prediction block and the motion vector of each motion compensation unit.

According to an eighth aspect, an embodiment of this application provides an inter prediction apparatus, including: a determining module, configured to determine that a prediction mode of a to-be-processed picture block is an affine motion model-based AMVP mode; an obtaining module, configured to obtain control point motion vectors of the to-be-processed picture block, where the control point motion vectors meet preset first motion vector resolution and/or first motion vector bit depth; a calculation module, configured to derive a motion vector of each motion compensation unit in the to-be-processed picture block based on the control point motion vectors; and a reconstruction module, configured to obtain a reconstructed block of the to-be-processed picture block based on the motion vector of each motion compensation unit.

With reference to the eighth aspect, in an embodiment, the obtaining module is specifically configured to: obtain CPMVDs and CPMVPs; when resolution of the CPMVDs is not equal to the first motion vector resolution, obtain the control point motion vectors of the to-be-processed picture block based on the CPMVDs and a first shift value; or when resolution of the CPMVPs is not equal to the first motion vector resolution, obtain the control point motion vectors of the to-be-processed picture block based on the CPMVPs and a second shift value.

For example, the control point motion vectors of the to-be-processed picture block are obtained according to the following formula:

CPMV=CPMVD'+CPMVP'. When the resolution of the CPMVD is not equal to the first motion vector resolution, CPMVD'=CPMVD<<mvrShift1. When the resolution of the CPMVD is equal to the first motion vector resolution, CPMVD'=CPMVD. When the resolution of the CPMVP is not equal to the first motion vector resolution, CPMVP'=CPMVP<<mvrShift2. When the resolution of the CPMVP is equal to the first motion vector resolution, CPMVP'=CPMVP. CPMV represents the control point motion vector, mvrShift1 represents the first shift value, and mvrShift2 represents the second shift value.

For example, when the first motion vector resolution is 1/16 pixel accuracy, and the resolution of the CPMVD is 1/16 pixel accuracy, the first shift value is equal to 0. When the first motion vector resolution is 1/16 pixel accuracy, and the resolution of the CPMVD is 1/4 pixel accuracy, the first shift value is equal to 2. When the first motion vector resolution is 1/16 pixel accuracy, and the resolution of the CPMVD is integral pixel accuracy, the first shift value is equal to 4. When the first motion vector resolution is 1/16 pixel accuracy, and the resolution of the CPMVP is 1/16 pixel accuracy, the second shift value is equal to 0. When the first motion vector resolution is 1/16 pixel accuracy, and the resolution of the CPMVP is 1/4 pixel accuracy, the second shift value is equal to 2. When the first motion vector resolution is 1/16 pixel accuracy, and the resolution of the CPMVP is integral pixel accuracy, the second shift value is equal to 4.

It should be understood that when the first shift value is equal to 0 or the second shift value is equal to 0, in an embodiment, no shifting is performed.

With reference to the foregoing embodiments, in another embodiment, the obtaining module is further configured to: when bit depth of the control point motion vectors is greater than the first motion vector bit depth, clip the control point motion vectors, so that the bit depth of the control point motion vectors is equal to the first motion vector bit depth.

With reference to the foregoing embodiments, in another embodiment, the obtaining module is further configured to: clip the control point motion vectors, so that bit depth of the control point motion vectors is equal to the first motion vector bit depth.

With reference to any one of the foregoing embodiments, in another embodiment, the obtaining module is further configured to: process motion vector resolution of the motion compensation unit to meet preset second motion vector resolution, and/or process motion vector bit depth of the motion compensation unit to meet preset second motion vector bit depth; and the apparatus further includes a storage module, where the storage module is configured to store a processed motion vector of the motion compensation unit.

For example, the processed motion vector of the motion compensation unit is obtained according to the following formula:

MCUMV'=(MCUMV>>mvrShift3), where MCUMV' represents the processed motion vector of the motion compensation unit, MCUMV represents a motion vector of the motion compensation unit before processing, and mvrShift3 represents a third shift value.

For example, when the second motion vector resolution is 1/4 pixel accuracy, and the resolution of the MCUMV is 1/16 pixel accuracy, the third shift value is equal to 2; when the second motion vector resolution is 1/4 pixel accuracy, and the resolution of the MCUMV is 1/4 pixel accuracy, the third shift value is equal to 0; and when the second motion vector resolution is 1/4 pixel accuracy, and the resolution of the MCUMV is 1/32 pixel accuracy, the third shift value is equal to 3.

With reference to the foregoing embodiments, in another embodiment, the obtaining module is further configured to: clip bit depth of the processed motion vector of the motion compensation unit, so that the bit depth of the processed motion vector of the motion compensation unit is equal to the second motion vector bit depth.

With reference to the foregoing embodiments, in another embodiment, the obtaining module is further configured to: when bit depth of the processed motion vector of the motion compensation unit is greater than the second motion vector bit depth, clip the processed motion vector of the motion compensation unit, so that the bit depth of the processed motion vector of the motion compensation unit is equal to the second motion vector bit depth.

With reference to any one of the foregoing embodiments, in another embodiment, the reconstruction module is specifically configured to: perform motion compensation based on the motion vector of each motion compensation unit, to obtain a prediction block of the to-be-processed picture block; and obtain the reconstructed block of the to-be-processed picture block based on the prediction block and the motion vector of each motion compensation unit.

According to a ninth aspect, an embodiment of this application provides an inter prediction apparatus, including: a determining module, configured to determine that a prediction mode of a to-be-processed picture block is an affine motion model-based merge prediction mode; an obtaining module, configured to obtain control point motion vectors of the to-be-processed picture block; an adjustment module, configured to adjust the control point motion vectors to meet preset first motion vector resolution and/or first motion vector bit depth; a calculation module, configured to derive a motion vector of each motion compensation unit in the to-be-processed picture block based on adjusted control point motion vectors; and a reconstruction module, configured to obtain a reconstructed block of the to-be-processed picture block based on the motion vector of each motion compensation unit.

With reference to the ninth aspect, in a first feasible implementation, the adjustment module is specifically configured to: when resolution of the control point motion vectors is not equal to the first motion vector resolution, obtain the adjusted control point motion vectors based on the control point motion vectors and a first shift value.

For example, the adjusted control point motion vectors are obtained according to the following formula:

CPMV'=CPMV<<mvrShift1, where CPMV represents the control point motion vector, CPMV' represents the adjusted control point motion vector, and mvrShift1 represents the first shift value.

For example, when the first motion vector resolution is 1/16 pixel accuracy, and the control point motion vector resolution is 1/16 pixel accuracy, the first shift value is equal to 0; when the first motion vector resolution is 1/16 pixel accuracy, and the control point motion vector resolution is 1/4 pixel accuracy, the first shift value is equal to 2; and when the first motion vector resolution is 1/16 pixel accuracy, and the control point motion vector resolution is integral pixel accuracy, the first shift value is equal to 4.

It should be understood that when the first shift value is equal to 0, in an embodiment, no shifting is performed.

With reference to the foregoing embodiments, in another embodiment, the adjustment module is further configured to: when bit depth of the adjusted control point motion vectors is greater than the first motion vector bit depth, clip the adjusted control point motion vectors, so that the bit depth of the adjusted control point motion vectors is equal to the first motion vector bit depth.

With reference to the foregoing embodiments, in another embodiment, the adjustment module is further configured to: clip the adjusted control point motion vectors, so that bit depth of the adjusted control point motion vectors is equal to the first motion vector bit depth.

With reference to the ninth aspect, in an embodiment, a prediction mode of a processed adjacent picture block of the to-be-processed picture block is an affine motion model-based prediction mode. When the control point motion vectors of the to-be-processed picture block are derived based on control point motion vectors of the processed adjacent picture block, the adjusted control point motion vectors are obtained according to the following formulas:

$$vx0=K1>=0?(K1+\text{offset})>>\text{mvShift}:-((-K1+\text{offset})>>\text{mvShift}),$$

$$vy0=K2>=0?(K2+\text{offset})>>\text{mvShift}:-((-K2+\text{offset})>>\text{mvShift}),$$

$$vx1=K3>=0?(K3+\text{offset})>>\text{mvShift}:-((-K3+\text{offset})>>\text{mvShift}),$$

$$vy1=K4>=0?(K4+\text{offset})>>\text{mvShift}:-((-K4+\text{offset})>>\text{mvShift}),$$

$$vx2=K5>=0?(K5+\text{offset})>>\text{mvShift}:-((-K5+\text{offset})>>\text{mvShift}),$$

$$vy2=K6>=0?(K6+\text{offset})>>\text{mvShift}:-((-K6+\text{offset})>>\text{mvShift}), \text{ where}$$

$$K1=\text{mvScaleHor}+\text{dHorX}*(x0-x4-M/2)+\text{dHorY}*(y0-y4-N/2),$$

$$K2=\text{mvScaleVer}+\text{dVerX}*(x0-x4-M/2)+\text{dVerY}*(y0-y4-N/2),$$

$$K3=\text{mvScaleHor}+\text{dHorX}*(x1-x4-M/2)+\text{dHorY}*(y1-y4-N/2),$$

$$K4=\text{mvScaleVer}+\text{dVerX}*(x1-x4-M/2)+\text{dVerY}*(y1-y4-N/2),$$

$$K5=\text{mvScaleHor}+\text{dHorX}*(x2-x4-M/2)+\text{dHorY}*(y2-y4-N/2),$$

$$K6=\text{mvScaleVer}+\text{dVerX}*(x2-x4-M/2)+\text{dVerY}*(y2-y4-N/2),$$

$$\text{offset}=1<<(\text{mvShift}-1),$$

$$\text{mvScaleHor}=vx4<<7,$$

$$\text{mvScaleVer}=vy4<<7,$$

$$\text{dHorX}=(vx5-vx4)<<(7-\log 2(P)),$$

$$\text{dVerX}=(vy5-vy4)<<(7-\log 2(Q)),$$

when the affine motion model of the processed adjacent picture block is a 6-parameter model, dHorY=(vx6−vx4)<<(7−log 2(P)), and dVerY=(vy6−vy4)<<(7−log 2(Q));

when the affine motion model of the processed adjacent picture block is a 4-parameter model, dHorY=−dVerX, and dVerY=dHorX;

Log 2( ) represents a function of taking a logarithm of 2, << represents left shift, >> represents right shift, P is a width of the processed adjacent picture block, and Q is a height of the processed adjacent picture block;

(vx0, vy0), (vx1, vy1), and (vx2, vy2) respectively represent horizontal components and vertical components of motion vectors of three control points of the to-be-processed picture block; to be specific, (vx0, vy0) is a horizontal component and a vertical component of a motion vector of a first control point of the to-be-processed picture block, (vx1, vy1) is a horizontal component and a vertical component of a motion vector of a second control point of the to-be-processed picture block, and (vx2, vy2) is a horizontal component and a vertical component of a motion vector of a third control point of the to-be-processed picture block;

(vx4, vy4), (vx5, vy5), and (vx6, vy6) respectively represent horizontal components and vertical components of motion vectors of three control points of the processed adjacent picture block; to be specific, (vx4, vy4) is a horizontal component and a vertical component of a motion vector of a first control point of the processed adjacent picture block, (vx5, vy5) is a horizontal component and a vertical component of a motion vector of a second control point of the processed adjacent picture block, and (vx6, vy6) is a horizontal component and a vertical component of a motion vector of a third control point of the processed adjacent picture block; and mvShift is determined based on control point motion vector resolution of the processed adjacent picture block.

It should be noted that the adjacent picture block may be a spatially adjacent affine coding block or a temporally adjacent affine coding block.

When resolution of the CPMV stored in the adjacent affine block is 1/4 pixel accuracy, the resolution of the CPMV of the to-be-processed picture block is obtained as 1/16 pixel accuracy by setting mvShift to 5. When the resolution of the CPMV stored in the adjacent affine block is 1/4 pixel accuracy, the resolution of the CPMV of the to-be-processed picture block may be obtained as 1/32 pixel accuracy by setting mvShift to 6. When the resolution of the CPMV stored in the adjacent affine block is 1/4 pixel accuracy, the resolution of the CPMV of the to-be-processed picture block may be obtained as 1/4 pixel accuracy by setting mvShift to 7. The resolution of the CPMV of the adjacent affine block may refer to stored motion vector resolution of a storage unit.

With reference to any one of the foregoing embodiments, in another embodiment, the adjustment module is further configured to: process motion vector resolution of the motion compensation unit to meet preset second motion vector resolution, and/or process motion vector bit depth of the motion compensation unit to meet preset second motion vector bit depth; and the apparatus further includes a storage module, where the storage module is configured to store a processed motion vector of the motion compensation unit.

For example, the processed motion vector of the motion compensation unit is obtained according to the following formula:

MCUMV'=(MCUMV>>mvrShift2), where MCUMV' represents the processed motion vector of the motion compensation unit, MCUMV represents a motion vector of the motion compensation unit before processing, and mvrShift2 represents a second shift value.

For example, when the second motion vector resolution is ¼ pixel accuracy, and the resolution of the MCUMV is 1/16 pixel accuracy, the second shift value is equal to 2; when the second motion vector resolution is ¼ pixel accuracy, and the resolution of the MCUMV is ¼ pixel accuracy, the second shift value is equal to 0; and when the second motion vector resolution is ¼ pixel accuracy, and the resolution of the MCUMV is 1/32 pixel accuracy, the second shift value is equal to 3.

With reference to the foregoing embodiments, in another embodiment, the adjustment module is further configured to: clip bit depth of the processed motion vector of the motion compensation unit, so that the bit depth of the processed motion vector of the motion compensation unit is equal to the second motion vector bit depth.

With reference to the foregoing embodiments, in another embodiment, the adjustment module is further configured to: when bit depth of the processed motion vector of the motion compensation unit is greater than the second motion vector bit depth, clip the processed motion vector of the motion compensation unit, so that the bit depth of the processed motion vector of the motion compensation unit is equal to the second motion vector bit depth.

With reference to any one of the foregoing embodiments, in another embodiment, the reconstruction module is specifically configured to: perform motion compensation based on the motion vector of each motion compensation unit, to obtain a prediction block of the to-be-processed picture block; and obtain the reconstructed block of the to-be-processed picture block based on the prediction block and the motion vector of each motion compensation unit.

According to a tenth aspect of this application, an inter prediction device is provided, including a processor and a memory coupled to the processor, where the processor is configured to perform the inter prediction method according to any feasible implementation of the first aspect, the second aspect, the sixth aspect, or the seventh aspect.

According to an eleventh aspect of this application, a computer-readable storage medium is provided, where the computer-readable storage medium stores an instruction, and when the instructions are run on a computer, the computer is enabled to perform the inter prediction method according to any feasible implementation of the first aspect, the second aspect, the sixth aspect, or the seventh aspect.

According to a twelfth aspect of this application, a computer program product including instructions is provided. When the instructions are run on a computer, the computer is enabled to perform the inter prediction method according to any feasible implementation of the first aspect, the second aspect, the sixth aspect, or the seventh aspect.

According to a thirteenth aspect of this application, a video picture encoder is provided, where the video picture encoder includes the inter prediction apparatus according to any feasible implementation of the third aspect, the fourth aspect, the fifth aspect, the eighth aspect, or the ninth aspect.

According to a fourteenth aspect of this application, a video picture decoder is provided, where the video picture decoder includes the inter prediction apparatus according to any feasible implementation of the third aspect, the fourth aspect, the fifth aspect, the eighth aspect, or the ninth aspect.

In addition, for technical effects brought by a design manner of any one of the foregoing aspects, refer to technical effects brought by different design manners of the sixth aspect and the seventh aspect. Details are not described herein again.

In the embodiments of this application, a name of the inter prediction apparatus imposes no limitation on the apparatus. In actual implementation, the apparatus may have other names. Provided that functions of each device are similar to those in the embodiments of this application, it falls within the scope of the claims of this application and their equivalent technologies.

According to a fifteenth aspect, an embodiment of this application provides an inter prediction method, including: after CPMVDs and CPMVPs of a to-be-processed picture block are obtained, left shifting the CPMVDs by a first shift value, left shifting the CPMVPs by a second shift value, and adding left-shifted CPMVDs and left-shifted CPMVPs to obtain control point motion vectors; deriving a motion vector of each motion compensation unit in the to-be-processed picture block based on the control point motion vectors; and obtaining a reconstructed block of the to-be-processed picture block based on the motion vector of each motion compensation unit. When resolution of the CPMVD is equal to first motion vector resolution, the first shift value is 0, and when resolution of the CPMVP is equal to the first motion vector resolution, the second shift value is 0.

According to the inter prediction method provided in this embodiment of this application, motion compensation is performed by improving control point motion vector resolution and bit depth, which can effectively improve inter prediction accuracy of a coding block using an affine motion model.

For example, in a case that the first motion vector resolution is 1/16 pixel accuracy, when the resolution of the CPMVD is 1/16 pixel accuracy, the first shift value is equal to 0; when the resolution of the CPMVD is ¼ pixel accuracy, the first shift value is equal to 2; when the resolution of the CPMVD is integral pixel accuracy, the first shift value is equal to 4; when the resolution of the CPMVP is 1/16 pixel accuracy, the second shift value is equal to 0; when the resolution of the CPMVP is ¼ pixel accuracy, the second shift value is equal to 2; and when the resolution of the CPMVP is integral pixel accuracy, the second shift value is equal to 4.

In an embodiment, the method further includes: when bit depth of the control point motion vector is greater than first motion vector bit depth, clipping the control point motion vector, so that the bit depth of the control point motion vector is equal to the first motion vector bit depth.

In another embodiment, the method further includes: clipping the control point motion vectors, so that bit depth of the control point motion vectors is equal to first motion vector bit depth.

In another embodiment, the method further includes: processing the motion vector of the motion compensation unit to meet preset second motion vector resolution; and storing a processed motion vector of the motion compensation unit.

Optionally, the processing the motion vector of the motion compensation unit includes: left shifting the motion vector of the motion compensation unit by a third shift value.

In another embodiment, the method further includes: clipping bit depth of the processed motion vector of the motion compensation unit, so that the bit depth of the processed motion vector of the motion compensation unit is equal to second motion vector bit depth.

In another embodiment, the method further includes: when bit depth of the processed motion vector of the motion compensation unit is greater than the second motion vector bit depth, clipping the processed motion vector of the motion compensation unit, so that the bit depth of the processed motion vector of the motion compensation unit is equal to the second motion vector bit depth.

For example, in a case that the second motion vector resolution is ¼ pixel accuracy, when the motion vector resolution of the motion compensation unit is ¹⁄₁₆ pixel accuracy, the third shift value is equal to 2; when the motion vector resolution of the motion compensation unit is ¼ pixel accuracy, the third shift value is equal to 0; and when the motion vector resolution of the motion compensation unit is ¹⁄₃₂ pixel accuracy, the third shift value is equal to 3.

In another embodiment, the obtaining a reconstructed block of the to-be-processed picture block based on the motion vector of each motion compensation unit includes: performing motion compensation based on the motion vector of each motion compensation unit, to obtain a prediction block of the to-be-processed picture block; and obtaining the reconstructed block of the to-be-processed picture block based on the prediction block and the motion vector of each motion compensation unit.

According to a sixteenth aspect, an embodiment of this application provides an inter prediction apparatus, including: an obtaining module, configured to obtain control point motion vector differences CPMVDs and control point motion vector predictors CPMVPs of a to-be-processed picture block, where the obtaining module is further configured to left shift the CPMVDs by a first shift value, and when resolution of the CPMVD is equal to first motion vector resolution, the first shift value is 0; the obtaining module is further configured to left shift the CPMVPs by a second shift value, and when resolution of the CPMVP is equal to the first motion vector resolution, the second shift value is 0; and the obtaining module is further configured to add left-shifted CPMVDs and left-shifted CPMVPs to obtain control point motion vectors; a calculation module, configured to derive a motion vector of each motion compensation unit in the to-be-processed picture block based on the control point motion vectors; and a reconstruction module, configured to obtain a reconstructed block of the to-be-processed picture block based on the motion vector of each motion compensation unit.

For example, in a case that the first motion vector resolution is ¹⁄₁₆ pixel accuracy, when the resolution of the CPMVD is ¹⁄₁₆ pixel accuracy, the first shift value is equal to 0; when the resolution of the CPMVD is ¼ pixel accuracy, the first shift value is equal to 2; when the resolution of the CPMVD is integral pixel accuracy, the first shift value is equal to 4; when the resolution of the CPMVP is ¹⁄₁₆ pixel accuracy, the second shift value is equal to 0; when the resolution of the CPMVP is ¼ pixel accuracy, the second shift value is equal to 2; and when the resolution of the CPMVP is integral pixel accuracy, the second shift value is equal to 4.

In a embodiment, the obtaining module is further configured to: when bit depth of the control point motion vectors is greater than first motion vector bit depth, clip the control point motion vectors, so that the bit depth of the control point motion vectors is equal to the first motion vector bit depth.

In another embodiment, the obtaining module is further configured to: clip the control point motion vectors, so that bit depth of the control point motion vectors is equal to first motion vector bit depth.

In another embodiment, the obtaining module is further configured to process the motion vector of the motion compensation unit to meet preset second motion vector resolution; and the apparatus further includes a storage module. The storage module is configured to store a processed motion vector of the motion compensation unit.

Optionally, the obtaining module is configured to left shift the motion vector of the motion compensation unit by a third shift value.

In another embodiment, the obtaining module is further configured to: clip bit depth of the processed motion vector of the motion compensation unit, so that the bit depth of the processed motion vector of the motion compensation unit is equal to second motion vector bit depth.

In another embodiment, the obtaining module is further configured to: when bit depth of the processed motion vector of the motion compensation unit is greater than second motion vector bit depth, clip the processed motion vector of the motion compensation unit, so that the bit depth of the processed motion vector of the motion compensation unit is equal to the second motion vector bit depth.

For example, in a case that the second motion vector resolution is ¼ pixel accuracy, when the motion vector resolution of the motion compensation unit is ¹⁄₁₆ pixel accuracy, the third shift value is equal to 2; when the motion vector resolution of the motion compensation unit is ¼ pixel accuracy, the third shift value is equal to 0; and when the motion vector resolution of the motion compensation unit is ¹⁄₃₂ pixel accuracy, the third shift value is equal to 3.

In another embodiment, the reconstruction module is specifically configured to: perform motion compensation based on the motion vector of each motion compensation unit, so as to obtain a prediction block of the to-be-processed picture block; and obtain the reconstructed block of the to-be-processed picture block based on the prediction block and the motion vector of each motion compensation unit.

According to a seventeenth aspect, an embodiment of this application provides an inter prediction device, including a processor and a memory coupled to the processor, where the processor is configured to perform the inter prediction method according to any feasible implementation of the first aspect, the second aspect, the sixth aspect, the seventh aspect, or the fifteenth aspect.

According to an eighteenth aspect of this application, a computer-readable storage medium is provided, where the computer-readable storage medium stores an instruction, and when the instructions are run on a computer, the computer is enabled to perform the inter prediction method according to any feasible implementation of the first aspect, the second aspect, the sixth aspect, the seventh aspect, or the fifteenth aspect.

According to a nineteenth aspect of this application, a computer program product including instructions is provided. When the instructions are run on a computer, the computer is enabled to perform the inter prediction method according to any feasible implementation of the first aspect, the second aspect, the sixth aspect, the seventh aspect, or the fifteenth aspect.

According to a twentieth aspect of this application, a video picture encoder is provided, where the video picture encoder includes the inter prediction apparatus according to any feasible implementation of the third aspect, the fourth aspect, the fifth aspect, the eighth aspect, the ninth aspect, or the sixteenth aspect.

According to a twenty-first aspect of this application, a video picture decoder is provided, where the video picture decoder includes the inter prediction apparatus according to any feasible implementation of the third aspect, the fourth aspect, the fifth aspect, the eighth aspect, the ninth aspect, or the sixteenth aspect.

In addition, for technical effects brought by a design manner of any one of the foregoing aspects, refer to technical effects brought by different design manners of the sixth aspect, the seventh aspect, and the sixteenth aspect. Details are not described herein again.

In the embodiments of this application, a name of the inter prediction apparatus imposes no limitation on the apparatus. In actual implementation, the apparatus may have other names. Provided that functions of each device are similar to those in the embodiments of this application, it falls within the scope of the claims of this application and their equivalent technologies.

DESCRIPTION OF EMBODIMENTS

Figure 1A:
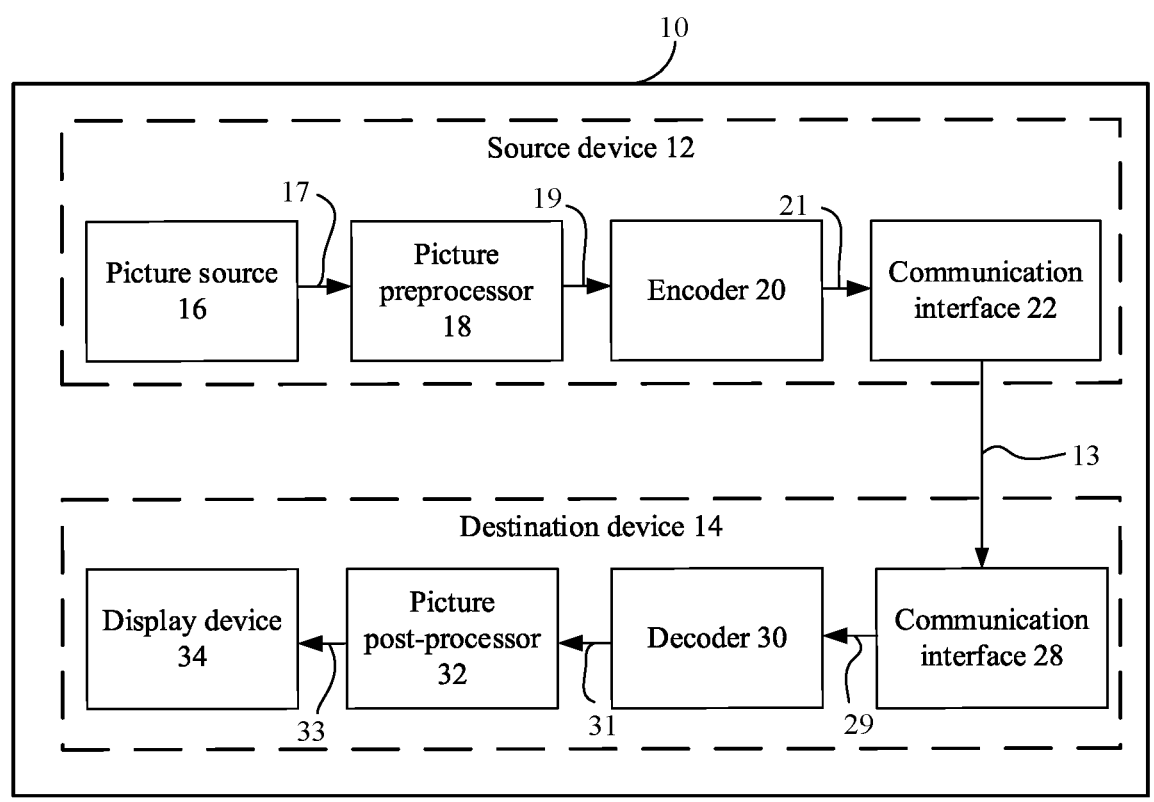
FIG. 1A is a block diagram of an instance of a video encoding and decoding system 10 used to implement an embodiment of the present invention according to embodiments of this application.

The following describes the embodiments of this application with reference to the accompanying drawings in the embodiments of this application. In the following description, reference is made to the accompanying drawings that form a part of this disclosure and that show, by way of illustration, specific aspects of the embodiments of this application or that may use specific aspects of the embodiments of this application. It should be understood that the embodiments of this application may be used in other aspects, and may include a structural or logical change not depicted in the accompanying drawings. Therefore, the following detailed description should not be understood in the sense of limitation, and the scope of this application is defined by the appended claims. For example, it should be understood that the disclosure with reference to the described method may also be applied to a corresponding device or system for performing the method, and vice versa. For example, if one or more specific method steps are described, a corresponding device may include one or more units, such as functional units, to perform the described one or more method steps (for example, one unit performs one or more steps, or each of a plurality of units performs one or more of a plurality of steps), even though such one or more units are not explicitly illustrated or described in the accompanying drawings. In addition, for example, if a specific apparatus is described based on one or more units, such as functional units, a corresponding method may include one step to perform functionality of one or more units (for example, one step is used to perform functionality of one or more units, or each of a plurality of steps is used to perform functionality of one or more of a plurality of units), even though such one or more steps are not explicitly illustrated or described in the accompanying drawings. Further, it should be understood that, unless otherwise clearly stated, the example embodiments and/or features of aspects described herein may be combined with each other.

The technical solutions in the embodiments of this application may not only be applied to existing video coding standards (for example, standards such as H.264 and HEVC), but may also be applied to future video coding standards (for example, the H.266 standard). Terms used in the implementation part of this application are merely used to explain specific embodiments of this application, and are not intended to limit this application. The following first simply describes some concepts that may be involved in the embodiments of this application.

Video encoding generally refers to processing a sequence of pictures forming a video or video sequence. In the video encoding field, terms "picture", "frame" or "image" may be used as synonyms. Video coding used herein represents video encoding or video decoding. Video encoding is performed on a source side, and usually includes processing (for example, compressing) an original video picture to reduce an amount of data required to represent the video picture, for more efficient storage and/or transmission. Video decoding is performed on a destination side, and usually includes performing inverse processing with respect to an encoder to reconstruct the video picture. "Coding" of the video picture in the embodiments is understood as "encoding" or "decoding" of the video sequence. A combination of the encoding portion and the decoding portion is also referred to as codec (encoding and decoding).

A video sequence includes a series of pictures (picture), the picture is further divided into slices (slice), and the slice is then divided into blocks (block). Video coding is performed block by block. In some new video coding standards, the concept of block is further extended. For example, there is a macroblock (MB) in the H.264 standard, and the macroblock may be further divided into a plurality of prediction blocks (partition) that can be used for prediction encoding. In the high efficiency video coding (HEVC) standard, a plurality of block units are functionally divided by using basic concepts such as a coding unit (CU), a prediction unit (PU), and a transform unit (TU), and are described by using a new tree-based structure. For example, the CU may be divided into smaller CUs based on a quad-tree, and the smaller CU may be further divided, so as to form a quad-tree structure. The CU is a basic unit for dividing and encoding a coding picture. The PU and the TU also have a similar tree structure. The PU may be corresponding to a prediction block, and is a basic unit for prediction encoding. The CU is further divided into a plurality of PUs based on a division mode. The TU may correspond to the transform block, and is a basic unit for transforming a prediction residual. However, all of the CU, the PU, and the TU essentially belong to the concept of block (or picture block).

For example, in HEVC, a CTU is split into a plurality of CUs by using a quad-tree structure represented as a coding tree. Whether to encode a picture area by using inter-picture (time) or intra-picture (space) prediction is determined at a CU level. Each CU may be further split into one, two, or four PUs based on a PU splitting type. A same prediction process is applied within a PU, and related information is transmitted to a decoder on a PU basis. After a residual block is obtained by applying a prediction process based on the PU splitting type, the CU may be partitioned into transform units (TU) based on another quad-tree structure similar to the coding tree used for the CU. In the latest development of video compression technology, a quad-tree and a binary tree (QTBT) are used to partition a coding block. In a QTBT block structure, the CU may be of a square or rectangular shape.

In this specification, for ease of description and understanding, a to-be-coded picture block in a current coding picture may be referred to as a current block, for example, in encoding, the current block refers to a block currently being encoded; and in decoding, the current block refers to a block currently being decoded. A decoded picture block that is in a reference picture and that is used to predict the current block is referred to as a reference block, that is, the reference block is a block that provides a reference signal for the current block, where the reference signal represents a pixel value in the picture block. A block that is in the reference picture and that provides a prediction signal for the current block may be referred to as a prediction block, where the prediction signal represents a pixel value or a sampling value or a sampling signal within the prediction block. For example, after a plurality of reference blocks are traversed, an optimal reference block is found, and the optimal reference block will provide prediction for the current block, and is referred to as a prediction block.

In a case of lossless video coding, an original video picture may be reconstructed, that is, a reconstructed video picture has the same quality as the original video picture (it is assumed that there is no transmission loss or other data loss during storage or transmission). In a case of lossy video coding, by performing further compression, for example, through quantization, an amount of data required to represent a video picture is reduced, and a decoder side cannot completely reconstruct the video picture, that is, quality of a reconstructed video picture is lower or worse than quality of the original video picture.

Several video coding standards of H.261 are "lossy hybrid video codecs" (that is, spatial and temporal prediction in a sample domain are combined with 2D transform coding for applying quantization in a transform domain). Each picture of a video sequence is usually partitioned into a set of non-overlapping blocks, and the coding is typically performed on a block level. In other words, on the encoder side the video is typically processed, for example, encoded, on a block (video block) level, for example, by using spatial (intra picture) prediction and temporal (inter picture) prediction to generate a prediction block, subtracting the prediction block from the current block (currently processed or to-be-processed block) to obtain a residual block, and transforming the residual block and quantizing the residual block in the transform domain to reduce an amount of data to be transmitted (compressed), while on the decoder side the inverse processing compared to the encoder is applied to the encoder to the encoded or compressed block to reconstruct the current block for representation. In addition, the encoder replicates the decoder processing loop, so that both generate identical prediction (for example, intra- and inter prediction) and/or reconstructions for processing, that is, coding, a subsequent block.

The following describes a system architecture applied in an embodiment of this application. FIG. 1A schematically shows a schematic block diagram of a video encoding and decoding system 10 applied in an embodiment of this application. As shown in FIG. 1A, the video encoding and decoding system 10 may include a source device 12 and a destination device 14. The source device 12 generates encoded video data. Therefore, the source device 12 may be referred to as a video encoding apparatus. The destination device 14 may decode the encoded video data generated by the source device 12. Therefore, the destination device 14 may be referred to as a video decoding apparatus. Various implementations of the source device 12, the destination device 14, or both may include one or more processors and a memory coupled to the one or more processors. The memory may include but is not limited to a RAM, a ROM, an EEPROM, a flash memory, or any other medium that may be configured to store desired program code in a form of an instruction or a data structure accessible to a computer, as described herein. The source device 12 and the destination device 14 may include various apparatuses including a desktop computer, a mobile computing apparatus, a notebook (for example, a laptop) computer, a tablet computer, a set-top box, a telephone handset such as a so-called "smart" phone, a television set, a camera, a display apparatus, a digital media player, a video game console, an in-vehicle computer, a wireless communication device, or the like.

Although FIG. 1A depicts the source device 12 and the destination device 14 as separate devices, a device embodiment may also include both the source device 12 and the destination device 14 or functionality of both, that is, the source device 12 or corresponding functionality and the destination device 14 or corresponding functionality. In such an embodiment, same hardware and/or software, or separate hardware and/or software, or any combination thereof, may be used to implement the source device 12 or the corresponding functionality and the destination device 14 or the corresponding functionality.

A communication connection may be established between the source device 12 and the destination device 14 by using a link 13, and the destination device 14 may receive the encoded video data from the source device 12 by using the link 13. The link 13 may include one or more media or devices capable of moving the encoded video data from the source device 12 to the destination device 14. In one instance, the link 13 may include one or more communication media that enable the source device 12 to transmit the encoded video data directly to the destination device 14 in real time. In this instance, the source device 12 may modulate the encoded video data based on a communication standard (for example, a wireless communication protocol), and may transmit modulated video data to the destination device 14. The one or more communication media may include wireless and/or wired communication media, such as a radio frequency (RF) spectrum or one or more physical transmission lines. The one or more communication media may form a part of a packet-based network, such as a local area network, a wide area network, or a global network (for example, Internet). The one or more communication media may include routers, switches, base stations, or other devices that facilitate communication from the source device 12 to the destination device 14.

The source device 12 includes an encoder 20. In addition, optionally, the source device 12 may further include a picture source 16, a picture preprocessor 18, and a communication interface 22. In a specific implementation, the encoder 20, the picture source 16, the picture preprocessor 18, and the communication interface 22 may be hardware components in the source device 12, or may be software programs in the source device 12, which are separately described as follows:

The picture source 16 may include or may be any type of picture capturing device for, for example, capturing a real-world picture, and/or any type of picture or comment generating device (for screen content encoding, some text on the screen is also considered to be a part of a to-be-encoded picture or image), for example, a computer graphics processor for generating a computer animated picture, or for obtaining and/or providing a real-world picture, a computer animated picture (for example, screen content, a virtual reality (virtual reality, VR) picture), and/or any combination thereof (for example, an augmented reality (augmented reality, AR) picture). The picture source 16 may be a camera for capturing a picture or a memory for storing a picture, and the picture source 16 may further include any type of (internal or external) interface for storing a previously captured or generated picture and/or obtaining or receiving a picture. When the picture source 16 is a camera, the picture source 16 may be, for example, a local or integrated camera integrated in the source device. When the picture source 16 is a memory, the picture source 16 may be a local or, for example, an integrated memory integrated in a source device. When the picture source 16 includes an interface, the interface may be, for example, an external interface for receiving a picture from an external video source, the external video source may be, for example, an external picture capturing device, such as a camera, an external memory, or an external picture generating device, and the external picture generating device may be, for example, an external computer graphics processor, a computer, or a server. An interface may be any type of interface based on any proprietary or standardized interface protocol, such as a wired or wireless interface or an optical interface.

The picture may be considered as a two-dimensional array or a matrix of pixels (picture element). A pixel in the array may also be referred to as a sampling point. A quantity of sampling points in horizontal and vertical directions (or axes) of the array or the picture defines a size and/or resolution of the picture. To represent a color, three color components are usually used, that is, the picture may be represented as or include three sampling arrays. For example, in an RGB format or color space, a picture includes corresponding red, green, and blue sampling arrays. However, in video encoding, each pixel is usually represented in a luminance/chrominance format or color space, for example, a picture in a YUV format includes a luminance component indicated by Y (which may also be indicated by L) and two chrominance components indicated by U and V. The luminance (luma) component Y represents luminance or gray horizontal intensity (for example, both are the same in a gray level picture), and the two chrominance (chroma) components U and V represent the chrominance or color information component. Correspondingly, a picture in the YUV format includes a luminance sampling array of luminance sampling values (Y) and two chrominance sampling arrays of chrominance values (U and V). A picture in the RGB format may be converted or transformed into the YUV format, and vice versa. This process is also referred to as color transform or conversion. If a picture is black and white, the picture may include only a luminance sampling array. In this embodiment of this application, the picture transmitted from the picture source 16 to a picture processor may also be referred to as original picture data 17.

The picture preprocessor 18 is configured to: receive the original picture data 17, and preprocess the original picture data 17, so as to obtain a preprocessed picture 19 or preprocessed picture data 19. For example, preprocessing performed by the picture preprocessor 18 may include trimming, color format conversion (for example, conversion from the RGB format to the YUV format), color modulation, or denoising.

The encoder 20 (or referred to as the video encoder 20) is configured to receive the preprocessed picture data 19, and process the preprocessed picture data 19 in a correlation prediction mode (such as prediction modes in various embodiments of this specification), to provide encoded picture data 21 (structural details of the encoder 20 are further described below based on FIG. 2 or FIG. 4 or FIG. 5). In some embodiments, the encoder 20 may be configured to execute the embodiments described later, so as to implement application of an inter prediction method described in this application to an encoder side.

The communication interface 22 may be configured to receive the encoded picture data 21 and may transmit the encoded picture data 21 to the destination device 14 or any other device (for example, a memory) by using the link 13 for storage or direct reconstruction. The any other device may be any device for decoding or storage. The communication interface 22 may be, for example, configured to encapsulate the encoded picture data 21 in an appropriate format, such as a data packet, for transmission on the link 13.

The destination device 14 includes a decoder 30. In addition, optionally, the destination device 14 may further include a communication interface 28, a picture post-processor 32, and a display device 34, which are separately described as follows:

The communication interface 28 may be configured to receive the encoded picture data 21 from the source device 12 or any other source, where the any other source is, for example, a storage device, and the storage device is, for example, an encoded picture data storage device. The communication interface 28 may be configured to transmit or receive the encoded picture data 21 by using the link 13 between the source device 12 and the destination device 14 or by using a network of any type, where the link 13 is, for example, a direct wired or wireless connection, and the network of any type is, for example, a wired or wireless network or any combination thereof, or a private or public network of any type or any combination thereof. The communication interface 28 may be, for example, configured to decapsulate a data packet transmitted by the communication interface 22 to obtain the encoded picture data 21.

Both the communication interface 28 and the communication interface 22 may be configured as unidirectional communication interfaces or bidirectional communication interfaces, and may be configured to, for example, send and receive a message to establish a connection, acknowledge and exchange any other information related to a communication link and/or data transmission such as encoded picture data transmission.

The decoder 30 (or referred to as the video decoder 30) is configured to receive the encoded picture data 21 and provide decoded picture data 31 or a decoded picture 31 (structural details of the decoder 30 are further described below based on FIG. 3 or FIG. 4 or FIG. 5). In some embodiments, the decoder 30 may be configured to execute the embodiments described later, so as to implement application of an inter prediction method described in this application to a decoder side.

The picture post-processor 32 is configured to perform post-processing on the decoded picture data 31 (also referred to as reconstructed picture data), so as to obtain post-processed picture data 33. The post-processing performed by the picture post-processor 32 may include: color format conversion (for example, conversion from the YUV format to the RGB format), color modulation, trimming, or resampling, or any other processing, and may be further configured to transmit the post-processing picture data 33 to the display device 34.

The display device 34 is configured to receive the post-processed picture data 33 to display a picture to, for example, a user or a viewer. The display device 34 may be or may include any type of display for presenting a reconstructed picture, such as an integrated or external display or monitor. For example, the display may include a liquid crystal display (LCD), an organic light emitting diode (OLED) display, a plasma display, a projector, a micro LED display, a liquid crystal on silicon (LCoS), a digital light processor (DLP), or any other type of display.

Although FIG. 1A depicts the source device 12 and the destination device 14 as separate devices, a device embodiment may also include both the source device 12 and the destination device 14 or functionality of both, that is, the source device 12 or corresponding functionality and the destination device 14 or corresponding functionality. In such an embodiment, same hardware and/or software, or separate hardware and/or software, or any combination thereof, may be used to implement the source device 12 or the corresponding functionality and the destination device 14 or the corresponding functionality.

It may be apparent to a person skilled in the art based on the description that functionality of different units or existence and (accurate) division of the functionality of the source device 12 and/or the destination device 14 shown in FIG. 1A may vary based on actual devices and applications. The source device 12 and the destination device 14 may include any one of various devices, including any type of handheld or stationary device, such as a notebook or laptop computer, a mobile phone, a smartphone, a tablet or tablet computer, a video camera, a desktop computer, a set-top box, a television set, a camera, an in-vehicle device, a display device, a digital media player, a video game console, a video streaming device (such as a content service server or a content distribution server), a broadcast receiver device, and a broadcast transmitter device, and may not use or use any type of operating system.

The encoder 20 and the decoder 30 may be implemented as any one of various suitable circuits, such as one or more microprocessors, a digital signal processor (DSP), an application-specific integrated circuit (ASIC), a field-programmable gate array (FPGA), discrete logic, hardware, or any combination thereof. If some of the technologies are implemented in software, the device may store software instructions in a suitable non-transitory computer-readable storage medium and may use one or more processors to execute the instructions by using hardware to execute the technologies of this disclosure. Any of the foregoing content (including hardware, software, and a combination of hardware and software) may be considered as one or more processors.

In some cases, the video encoding and decoding system 10 shown in FIG. 1A is merely an example, and the technologies of this application may be applied to a video encoding setting (for example, video encoding or video decoding) that does not need to include any data communication between encoding and decoding devices. In other instances, data may be retrieved from a local memory, streamed on a network, or the like. The video encoding device may encode data and store the data in a memory, and/or the video decoding device may retrieve the data from the memory and decode the data. In some instances, encoding and decoding are performed by devices that do not communicate with one another but only encode data to and/or retrieve data from the memory and decode the data.

Figure 1B:
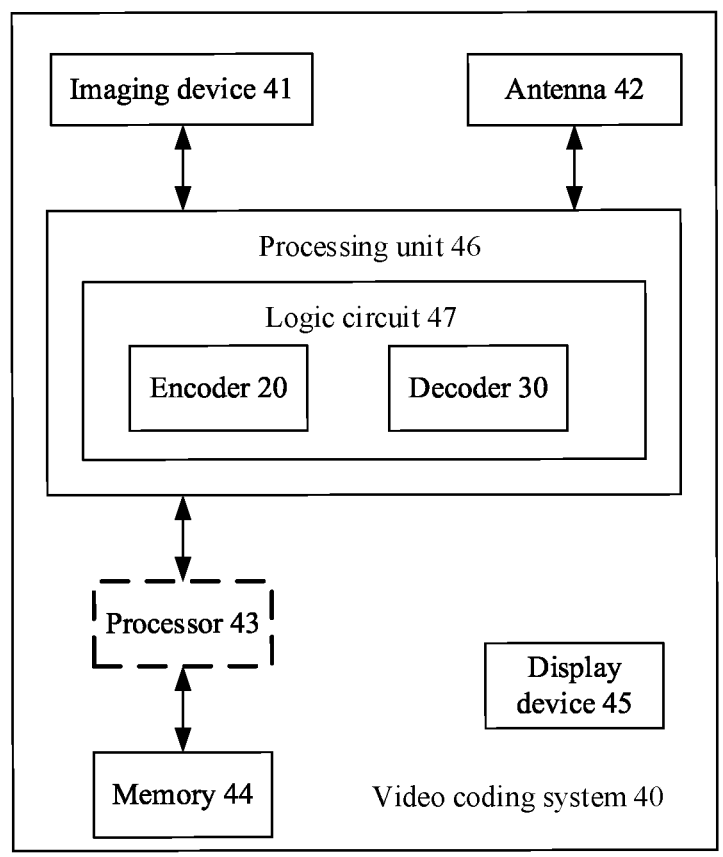
FIG. 1B is a block diagram of an instance of a video coding system 40 used to implement an embodiment of the present invention according to embodiments of this application.
Figure 2:
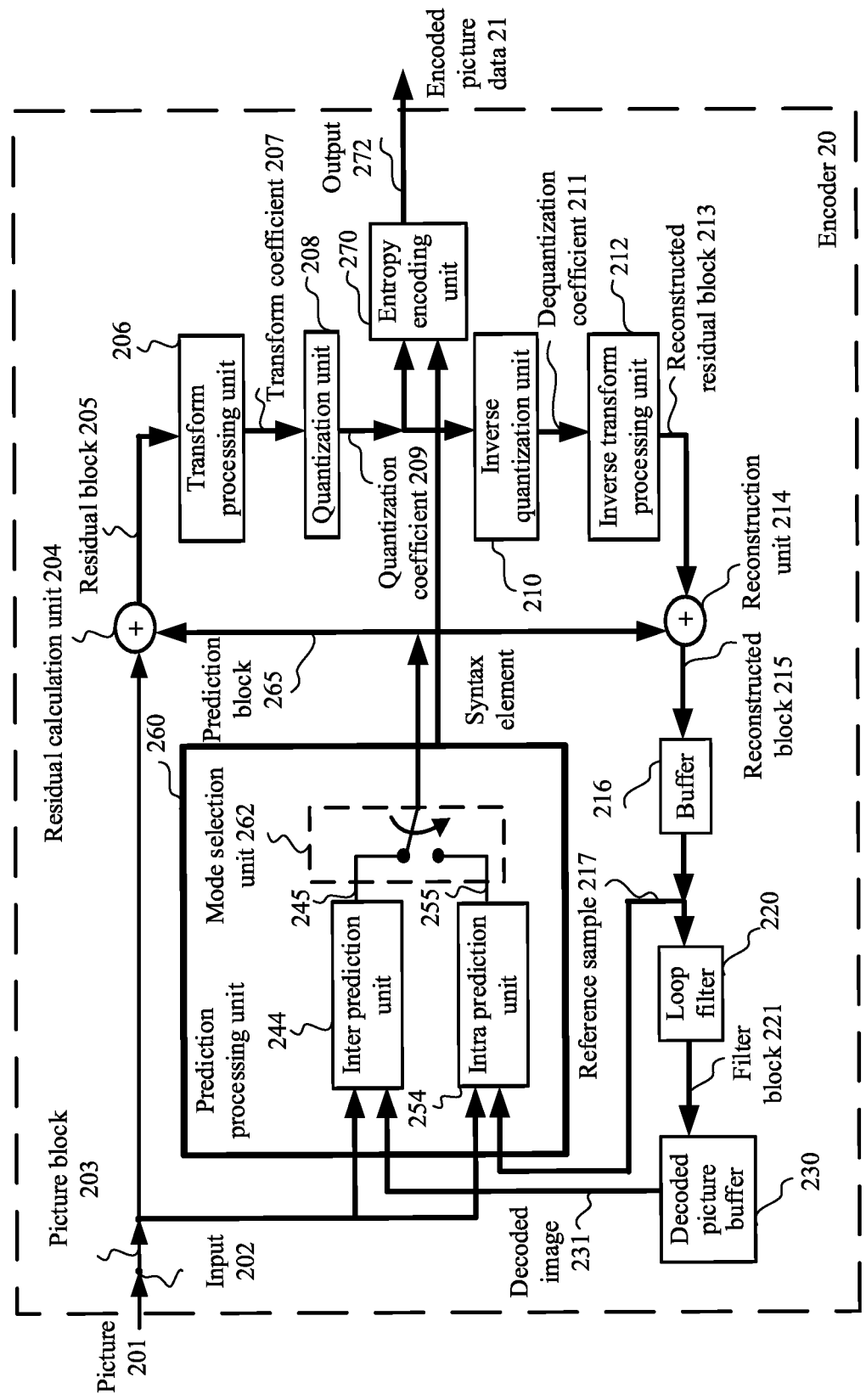
FIG. 2 is a structural block diagram of an instance of an encoder 20 used to implement an embodiment of the present invention according to embodiments of this application.
Figure 3:
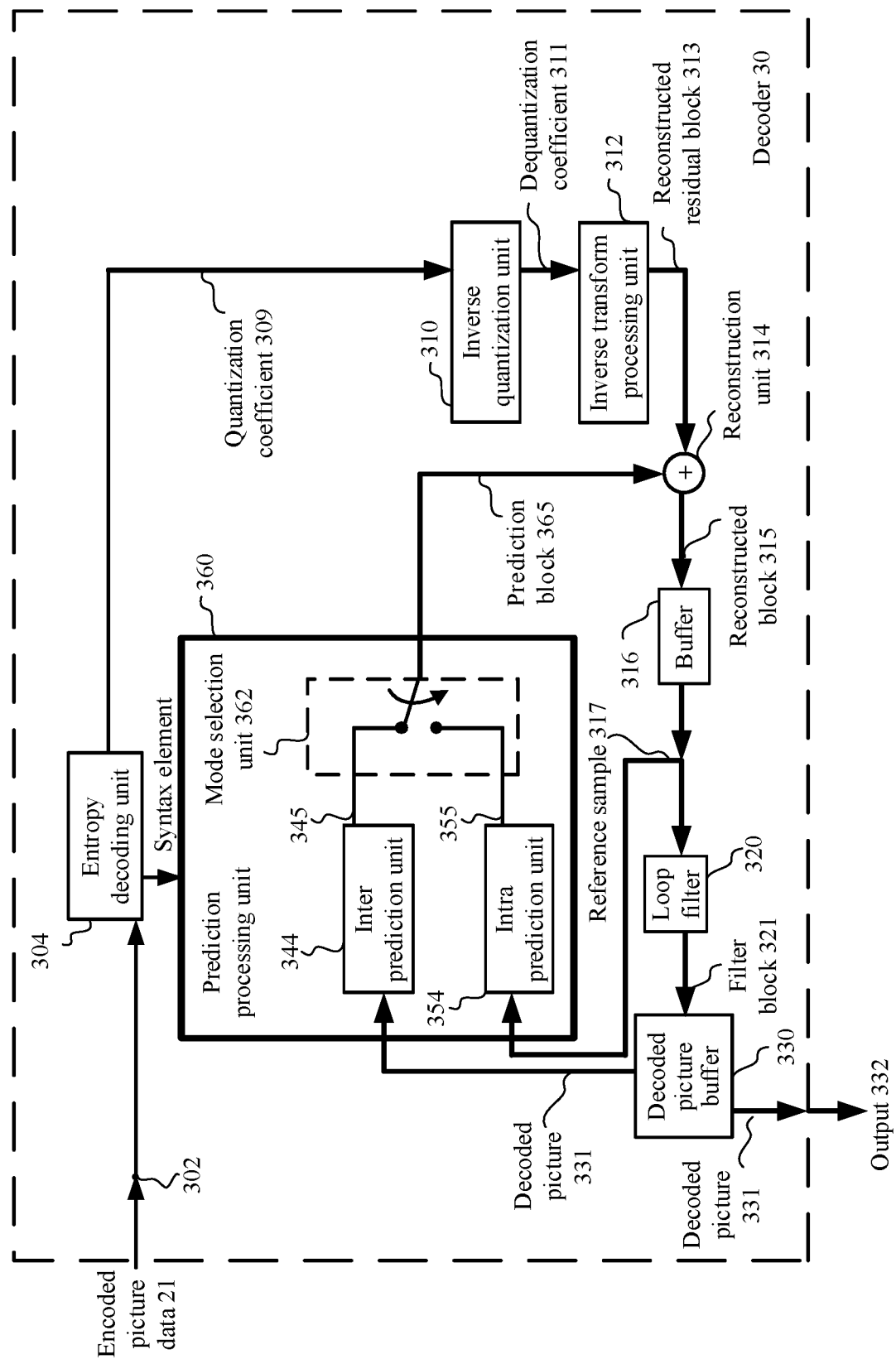
FIG. 3 is a structural block diagram of an instance of a decoder 30 used to implement an embodiment of the present invention according to embodiments of this application.

FIG. 1B is an explanatory diagram of an instance of a video coding system 40 including the encoder 20 of FIG. 2 and/or the decoder 30 of FIG. 3 according to an example embodiment. The video coding system 40 may implement combinations of various technologies in the embodiments of this application. In the described implementation, the video coding system 40 may include an imaging device 41, an encoder 20, a decoder 30 (and/or a video encoder/decoder implemented by a logic circuit 47 of a processing unit 46), an antenna 42, one or more processors 43, one or more memories 44, and/or a display device 45.

As shown in FIG. 1B, the imaging device 41, the antenna 42, the processing unit 46, the logic circuit 47, the encoder 20, the decoder 30, the processor 43, the memory 44, and/or the display device 45 can communicate with each other. As discussed, although the video coding system 40 is depicted with the encoder 20 and the decoder 30, in different instances, the video coding system 40 may include only the encoder 20 or the decoder 30.

In some instances, the antenna 42 may be configured to transmit or receive an encoded bitstream of video data. In addition, in some instances, the display device 45 may be configured to present video data. In some instances, the logic circuit 47 may be implemented by using the processing unit 46. The processing unit 46 may include an application-specific integrated circuit (ASIC) logic, a graphics processor, a general purpose processor, and the like. The video coding system 40 may also include an optional processor 43. The optional processor 43 may similarly include an application-specific integrated circuit (ASIC) logic, a graphics processor, a general purpose processor, and the like. In some instances, the logic circuit 47 may be implemented by using hardware, such as video encoding dedicated hardware, and the processor 43 may be implemented by using general software, an operating system, and the like. In addition, the memory 44 may be any type of memory, such as a volatile memory (such as a static random access memory (SRAM), a dynamic random access memory (DRAM), or a non-volatile memory (such as a flash memory). In a non-limiting instance, the memory 44 may be implemented by using a cache memory. In some instances, the logic circuit 47 may access the memory 44 (for example, for implementing a picture buffer). In another instance, the logic circuit 47 and/or the processing unit 46 may include a memory (for example, a cache) for implementing a picture buffer or the like.

In some instances, the encoder 20 implemented by using the logic circuit may include a picture buffer (for example, implemented by using the processing unit 46 or the memory 44) and a graphics processing unit (for example, implemented by using the processing unit 46). The graphics processing unit may be communicatively coupled to the picture buffer. The graphics processing unit may include the encoder 20 implemented by using the logic circuit 47 to implement various modules described with reference to FIG. 2 and/or any other encoder system or subsystem described herein. The logic circuit may be configured to perform various operations described herein.

In some instances, the decoder 30 may be implemented in a similar manner by using the logic circuit 47 to implement various modules described with reference to the decoder 30 of FIG. 3 and/or any other decoder system or subsystem described herein. In some instances, the decoder 30 implemented by using the logic circuit may include a picture buffer (for example, implemented by using the processing unit 46 or the memory 44) and a graphics processing unit (for example, implemented by using the processing unit 46). The graphics processing unit may be communicatively coupled to the picture buffer. The graphics processing unit may include the decoder 30 implemented by using the logic circuit 47 to implement various modules described with reference to FIG. 3 and/or any other decoder system or subsystem described herein.

In some instances, the antenna 42 may be configured to receive an encoded bitstream of video data. As discussed, the encoded bitstream may include data, an indicator, an index value, pattern selection data, and the like related to an encoded video frame as discussed herein, such as data related to encoding partition (for example, a transform coefficient or a quantized transform coefficient (as discussed), an optional indicator, and/or data defining encoding partition). The video coding system 40 may further include the decoder 30 coupled to the antenna 42 and configured to decode the encoded bitstream. The display device 45 is configured to present a video frame.

It should be understood that, for the instance described with reference to the encoder 20, the decoder 30 may be configured to perform a reverse process in this embodiment of this application. With respect to a signaling syntax element, the decoder 30 may be configured to receive and parse such a syntax element and decode related video data accordingly. In some examples, the encoder 20 may entropy encode the syntax element into an encoded video bitstream. In such instances, the decoder 30 may parse such a syntax element and decode related video data accordingly.

It should be noted that the method described in this embodiment of this application is mainly used in an inter prediction process. This process exists in both the encoder 20 and the decoder 30. The encoder 20 and the decoder 30 in this embodiment of this application may be an encoder/a decoder corresponding to a video standard protocol such as H.263, H.264, HEVV, MPEG-2, MPEG-4, VP8, or VP9, or a next-generation video standard protocol such as H.266.

FIG. 2 shows a schematic/conceptual block diagram of an instance of an encoder 20 configured to implement an embodiment of this application. In an instance of FIG. 2, the encoder 20 includes a residual calculation unit 204, a transform processing unit 206, a quantization unit 208, an inverse quantization unit 210, an inverse transform processing unit 212, a reconstruction unit 214, a buffer 216, a loop filter unit 220, a decoded picture buffer (decoded picture buffer, DPB) 230, a prediction processing unit 260, and an entropy encoding unit 270. The prediction processing unit 260 may include an inter prediction unit 244, an intra prediction unit 254, and a mode selection unit 262. The inter prediction unit 244 may include a motion estimation unit and a motion compensation unit (not shown). The encoder 20 shown in FIG. 2 may also be referred to as a hybrid video encoder or a video encoder based on a hybrid video codec.

For example, the residual calculation unit 204, the transform processing unit 206, the quantization unit 208, the prediction processing unit 260, and the entropy encoding unit 270 form a forward signal path of the encoder 20, and for example, the inverse quantization unit 210, the inverse transform processing unit 212, the reconstruction unit 214, the buffer 216, the loop filter 220, the decoded picture buffer (decoded picture buffer, DPB) 230, and the prediction processing unit 260 form a backward signal path of the encoder, where the backward signal path of the encoder corresponds to a signal path of a decoder (refer to the decoder 30 in FIG. 3).

The encoder 20 receives a picture 201 or a picture block 203 of the picture 201 such as a picture in a picture sequence that forms a video or a video sequence, by using, for example, an input 202. The picture block 203 may also be referred to as a current picture block or a to-be-coded picture block, and the picture 201 may be referred to as a current picture or a to-be-encoded picture (especially when the current picture is distinguished from another picture in video encoding, for example, the another picture is a previously encoded and/or decoded picture in a same video sequence, that is, a video sequence including the current picture).

An embodiment of the encoder 20 may include a partition unit (not shown in FIG. 2) configured to partition the picture 201 into a plurality of blocks, such as a picture block 203, usually into a plurality of non-overlapping blocks. The partition unit may be configured to use a same block size and define a corresponding grid of the block size for all pictures in the video sequence, or be configured to change block sizes between pictures or subsets or picture groups, and partition each picture into corresponding blocks.

In an instance, the prediction processing unit 260 of the encoder 20 may be configured to execute any combination of the above partition technologies.

For example, in the picture 201, the picture block 203 is also or may be considered as a two-dimensional array or matrix of sampling points with a sampling value, although a size of the picture block 203 is smaller than that of the picture 201. In other words, the picture block 203 may include, for example, one sampling array (for example, a luminance array in a case of a black-and-white picture 201) or three sampling arrays (for example, one luminance array and two chrominance arrays in a case of a color picture) or any other quantity and/or category of arrays based on an applied color format. Quantities of sampling points in horizontal and vertical directions (or axes) of the picture block 203 define the size of the picture block 203.

The encoder 20 shown in FIG. 2 is configured to encode the picture 201 block by block, for example, encode and predict each picture block 203.

The residual calculation unit 204 is configured to calculate a residual block 205 based on the picture block 203 and a prediction block 265 (other details of the prediction block 265 are provided below), for example, by subtracting a sample value of the prediction block 265 from a sample value of the picture block 203 sample by sample (pixel by pixel), to obtain the residual block 205 in a sample domain.

The transform processing unit 206 is configured to apply transform such as discrete cosine transform (discrete cosine transform, DCT) or discrete sine transform (discrete sine transform, DST) on a sample value of the residual block 205 to obtain a transform coefficient 207 in a transform domain. The transform coefficient 207 may also be referred to as a transform residual coefficient, and represents the residual block 205 in the transform domain.

The transform processing unit 206 may be configured to apply an integer approximate value of the DCT/DST, for example, transform specified for HEVC/H.265. Compared with orthogonal DCT transform, this integer approximate value is usually scaled by a factor. To maintain a norm of a residual block processed by using forward transform and inverse transform, an additional scaling factor is applied as a part of the transform process. The scaling factor is usually selected based on constraints, for example, the scaling factor is a power of 2 for a shift operation, bit depth of a transform coefficient, and a trade-off between accuracy and implementation costs. For example, a specific scaling factor is specified for inverse transform on the decoder 30 side by using, for example, the inverse transform processing unit 212 (and is specified for corresponding inverse transform on the encoder 20 side by using, for example, the inverse transform processing unit 212), and correspondingly, a corresponding scaling factor may be specified for forward transform on the encoder 20 side by using the transform processing unit 206.

The quantization unit 208 is configured to quantize the transform coefficient 207 to obtain a quantized transform coefficient 209, for example, by applying scalar quantization or vector quantization. The quantized transform coefficient 209 may also be referred to as a quantized residual coefficient 209. A quantization process may reduce bit depth associated with some or all of transform coefficients 207. For example, n bits of transform coefficients may be rounded down to m bits of transform coefficients during quantization, where n is greater than m. A degree of quantization may be modified by adjusting a quantization parameter (QP). For example, for scalar quantization, different scales may be applied to achieve finer or coarser quantization. A smaller quantization step corresponds to finer quantization, and a larger quantization step corresponds to coarser quantization. A suitable quantization step may be indicated by using a quantization parameter (QP). For example, the quantization parameter may be an index of a predefined set of suitable quantization steps. For example, a smaller quantization parameter may correspond to fine quantization (a smaller quantization step), a larger quantization parameter may correspond to coarse quantization (a larger quantization step), and vice versa. Quantization may include dividing the quantization step and corresponding quantization or inverse quantization performed, for example, by the inverse quantization unit 210, or may include multiplying by the quantization step. The quantization step may be determined by using the quantization parameter in embodiments based on some standards such as HEVC. In general, the quantization step may be calculated based on the quantization parameter by using fixed point approximation of an equation containing a division method. An additional scaling factor may be introduced for quantization and dequantization to recover a norm of a residual block that may be modified due to a scale used in the fixed-point approximation of the equation of the quantization step and the quantization parameter. In an instance implementation, scales of inverse transform and dequantization may be combined. Alternatively, a customized quantization table may be used and sent from the encoder to the decoder by using a signal, for example, in a bitstream. Quantization is a lossy operation, where a larger quantization step indicates a larger loss.

The inverse quantization unit 210 is configured to apply inverse quantization of the quantization unit 208 on a quantized coefficient to obtain a dequantized coefficient 211, for example, apply an inverse quantization solution of a quantization solution applied by the quantization unit 208, for example, based on or by using a quantization step same as that of the quantization unit 208. The dequantized coefficient 211 may also be referred to as a dequantized residual coefficient 211, which corresponds to the transform coefficient 207, although a loss due to quantization is generally different from that due to the transform coefficient.

The inverse transform processing unit 212 is configured to apply inverse transform of transform applied by the transform processing unit 206, for example, inverse discrete cosine transform (discrete cosine transform, DCT) or inverse discrete sine transform (discrete sine transform, DST), to obtain an inverse transform block 213 in the sample domain. The inverse transform block 213 may also be referred to as an inverse transform dequantized block 213 or an inverse transform residual block 213.

The reconstruction unit 214 (for example, a summer 214) is configured to add the inverse transform block 213 (that is, the reconstructed residual block 213) to the prediction block 265 to obtain a reconstructed block 215 in the sample domain, for example, add a sample value of the reconstructed residual block 213 to the sample value of the prediction block 265.

Optionally, a buffer unit 216 (or referred to as a "buffer" 216) of a line buffer 216 is configured to buffer or store the reconstructed block 215 and the corresponding sample value for, for example, intra prediction. In another embodiment, the encoder may be configured to use the unfiltered reconstructed block and/or the corresponding sample value stored in the buffer unit 216 for any type of estimation and/or prediction, such as intra prediction.

For example, an embodiment of the encoder 20 may be configured so that the buffer unit 216 is not only configured to store the reconstructed block 215 for intra prediction 254, but also used by the loop filter unit 220 (not shown in FIG. 2), so that the buffer unit 216 and the decoded picture buffer unit 230 form a buffer. Another embodiment may be used to use a filtered block 221 and/or a block or sample from the decoded picture buffer 230 (neither of which is shown in FIG. 2) as an input or a basis for intra prediction 254.

The loop filter unit 220 (or referred to as a "loop filter" 220) is configured to filter the reconstructed block 215 to obtain the filtered block 221, to smoothly perform pixel transform or improve video quality. The loop filter unit 220 is intended to represent one or more loop filters, such as a de-blocking filter, a sample-adaptive offset (sample-adaptive offset, SAO) filter, or another filter, such as a bilateral filter, an adaptive loop filter (adaptive loop filter, ALF), a sharpening or smoothing filter, or a collaborative filter. Although the loop filter unit 220 is shown as an in-loop filter in FIG. 2, in another configuration, the loop filter unit 220 may be implemented as a post filter. The filtered block 221 may also be referred to as a filtered reconstructed block 221. The decoded picture buffer 230 may store the reconstructed block after the loop filter unit 220 performs a filtering operation on the reconstructed block.

The embodiment of the encoder 20 (correspondingly, the loop filter unit 220) may be configured to output a loop filter parameter (for example, sample-adaptive offset information), for example, directly output the loop filter parameter or output the loop filter parameter after entropy encoding by the entropy encoding unit 270 or any another entropy encoding unit, for example, so that the decoder 30 can receive and apply the same loop filter parameter for decoding.

The decoded picture buffer (DPB) 230 may be a reference picture memory for storing reference picture data for encoding video data by the encoder 20. The DPB 230 may be formed by any one of a plurality of storage devices, such as a dynamic random access memory (DRAM) (including a synchronous DRAM (SDRAM), a magnetoresistive RAM (MRAM), a resistive RAM (RRAM)), or another type of storage device. The DPB 230 and the buffer 216 may be provided by using a same storage device or separate storage devices. In an instance, the decoded picture buffer (DPB) 230 is configured to store the filtered block 221. The decoded picture buffer 230 may be further configured to store a same current picture or, for example, other previously filtered blocks of different previously reconstructed pictures, such as previously reconstructed and filtered blocks 221, and may provide complete previously reconstructed, namely, decoded pictures (and corresponding reference blocks and samples) and/or partly reconstructed current pictures (and corresponding reference blocks and samples) for, for example, inter prediction. In an instance, the decoded picture buffer (DPB) 230 is configured to store the reconstructed block 215 if the reconstructed block 215 is reconstructed without in-loop filtering.

The prediction processing unit 260, also referred to as a block prediction processing unit 260, is configured to receive or obtain the picture block 203 (the current picture block 203 of the current picture 201) and reconstructed picture data, such as a reference sample from a same (current) picture of the buffer 216 and/or reference picture data 231 from one or more previously decoded pictures of the decoded picture buffer 230, and is configured to process such data for prediction, that is, provide a prediction block 265 that may be an inter prediction block 245 or an intra prediction block 255.

The mode selection unit 262 may be configured to select a prediction mode (for example, an intra- or inter prediction mode) and/or the corresponding prediction block 245 or 255 used as the prediction block 265 to calculate the residual block 205 and reconstruct the reconstructed block 215.

An embodiment of the mode selection unit 262 may be used to select a prediction mode (for example, select a prediction mode from those prediction modes supported by the prediction processing unit 260), where the prediction mode provides best match or a minimum residual (the minimum residual means better compression in transmission or storage), or provides a minimum signaling overhead (the minimum signaling overhead means better compression in transmission or storage), or considers or balances both. The mode selection unit 262 may be configured to determine the prediction mode based on rate distortion optimization (RDO), that is, select a prediction mode that provides minimum rate distortion optimization, or select a prediction mode in which related rate distortion meets at least a prediction mode selection criterion.

Prediction processing performed in an instance of the encoder 20 (for example, by using the prediction processing unit 260) and mode selection performed (for example, by using the mode selection unit 262) are explained in detail below.

As described above, the encoder 20 is configured to determine or select a best or an optimal prediction mode from (a predetermined) prediction mode set. The prediction mode set may include, for example, an intra prediction mode and/or an inter prediction mode.

An intra prediction mode set may include 35 different intra prediction modes, for example, non-directional modes such as a DC (or mean) mode and a planar mode, or directional modes as defined in H.265, or may include 67 different intra prediction modes, for example, non-directional modes such as a DC (or mean) mode and a planar mode, or directional modes as defined in developing H.266.

In a possible implementation, an inter prediction mode set depends on available reference pictures (that is, for example, at least some decoded pictures stored in the DBP 230 as described above) and another inter prediction parameter; for example, depends on whether an entire reference picture is used or only a portion of the reference picture is used, for example, an optimal matched reference block is searched for around a search window region of a region of a current block; and/or depends, for example, on whether pixel interpolation such as half/semi-pel and/or quarter-pel interpolation is used, where the inter prediction mode set may include, for example, advanced motion vector prediction (AMVP) mode and a merge mode. In a specific implementation, the inter prediction mode set may include an improved control point advanced motion vector prediction (AMVP) mode and an improved control point merge mode in this embodiment of this application. In an instance, the intra prediction unit 254 may be configured to execute any combination of inter prediction technologies described below.

In addition to the foregoing prediction modes, a skip mode and/or a direct mode may also be used in this embodiment of this application.

The prediction processing unit 260 may be further configured to partition the picture block 203 into smaller block partitions or sub-blocks, for example, through iterative use of quad-tree (quad-tree, QT) partition, binary-tree (BT) partition, or triple-tree (TT) partition, or any combination thereof; and is configured to perform prediction, for example, for each of the block partitions or the sub-blocks, where mode selection includes selecting a tree structure of the to-be-partitioned picture block 203 and selecting a prediction mode to be applied to each of the block partitions or the sub-blocks.

The inter prediction unit 244 may include a motion estimation (ME) unit (not shown in FIG. 2) and a motion compensation (MC) unit (not shown in FIG. 2). The motion estimation unit is configured to receive or obtain the picture block 203 (the current picture block 203 of the current picture 201) and the decoded picture 231, or at least one or more previously reconstructed blocks, such as one or more reconstructed blocks of other/different previously decoded pictures 231, to perform motion estimation. For example, the video sequence may include the current picture and the previously decoded picture 31, or in other words, the current picture and the previously decoded picture 31 may be parts of the picture sequence forming the video sequence, or form the picture sequence.

For example, the encoder 20 may be configured to select a reference block from a plurality of reference blocks of a same picture or different pictures in a plurality of other pictures, and to provide a reference picture and/or an offset (spatial offset) between a position of the reference block (X and Y coordinates) and a position of a current block to the motion estimation unit (not shown in FIG. 2) as an inter prediction parameter. The offset is also referred to as a motion vector (motion vector, MV).

The motion compensation unit is configured to: obtain the inter prediction parameter, and perform inter prediction based on or by using the inter prediction parameter to obtain the inter prediction block 245. Motion compensation performed by the motion compensation unit (not shown in FIG. 2) may include taking out or generating a prediction block based on a motion/block vector determined by using motion estimation (by possibly performing interpolation of sub-pixel accuracy). Interpolation filtering may produce an additional pixel sample from a known pixel sample, potentially increasing a quantity of candidate prediction blocks that can be used to encode a picture block. Once a motion vector for a PU of a current picture block is received, the motion compensation unit 246 may locate a prediction block to which the motion vector points in a reference picture list. The motion compensation unit 246 may further generate a syntax element associated with a block and a video slice, which can be used by the decoder 30 to decode a picture block of the video slice.

Specifically, the inter prediction unit 244 may transmit a syntax element to the entropy encoding unit 270, where the syntax element includes an inter prediction parameter (for example, indication information of an inter prediction mode that is used for prediction of the current block and that is selected after a plurality of inter prediction modes are traversed). In a possible application scenario, if there is only one inter prediction mode, the inter prediction parameter may not be carried in the syntax element. In this case, the decoder 30 may directly perform decoding by using a default prediction mode. It may be understood that the inter prediction unit 244 may be configured to execute any combination of inter prediction technologies.

The intra prediction unit 254 is configured to obtain, for example, receive a picture block 203 (a current picture block) of a same picture and one or more previously reconstructed blocks, for example, reconstructed adjacent blocks, to perform intra estimation. For example, the encoder 20 may be configured to select an intra prediction mode from a plurality of (predetermined) intra prediction modes.

An embodiment of the encoder 20 may be used to select an intra prediction mode based on an optimization criterion, such as based on a minimum residual (for example, providing an intra prediction mode most similar to the prediction block 255 of the current picture block 203) or minimum bit rate distortion.

The intra prediction unit 254 is further configured to determine the intra prediction block 255 based on an intra prediction parameter of the selected intra prediction mode. In any case, after an intra prediction mode for a block is selected, the intra prediction unit 254 is further configured to provide an intra prediction parameter to the entropy encoding unit 270, that is, to provide information indicating the selected intra prediction mode for a block. In an instance, the intra prediction unit 254 may be configured to execute any combination of intra prediction technologies.

Specifically, the intra prediction unit 254 may transmit a syntax element to the entropy encoding unit 270, where the syntax element includes an intra prediction parameter (for example, indication information of an intra prediction mode that is used for prediction of the current block and that is selected after a plurality of intra prediction modes are traversed). In a possible application scenario, if there is only one intra prediction mode, the intra prediction parameter may not be carried in the syntax element. In this case, the decoder 30 may directly perform decoding by using a default prediction mode.

The entropy encoding unit 270 is configured to apply (or not to apply) an entropy encoding algorithm or solution (for example, a variable length coding (VLC) solution, a context adaptive VLC (CAVLC) solution, an arithmetic coding solution, context adaptive binary arithmetic coding (CABAC), syntax-based context-adaptive binary arithmetic coding (SBAC), probability interval partitioning entropy (PIPE) encoding or another entropy encoding method or technology) to a single one or all of the quantized residual coefficient 209, the inter prediction parameter, the intra prediction parameter, and/or the loop filter parameter to obtain the encoded picture data 21 that can be output in a form of, for example, the encoded bitstream 21 by an output 272. The encoded bitstream may be transmitted to the video decoder 30 or archived for transmission or retrieval by the video decoder 30 later. The entropy encoding unit 270 may be further configured to entropy encode another syntax element of a current video slice that is being encoded.

Another structural variation of the video encoder 20 may be used to encode a video stream. For example, a non-transform-based encoder 20 may directly quantize a residual signal without the transform processing unit 206 for some blocks or frames. In another implementation, the encoder 20 may have the quantization unit 208 and the inverse quantization unit 210 that are combined into a single unit.

Specifically, in this embodiment of this application, the encoder 20 may be configured to implement an inter prediction method described in the following embodiment.

It should be understood that another structural change of the video encoder 20 may be used to encode a video stream. For example, for some picture blocks or picture frames, the video encoder 20 may directly quantize a residual signal without processing by the transform processing unit 206, and correspondingly without processing by the inverse transform processing unit 212. Alternatively, for some picture blocks or picture frames, the video encoder 20 does not generate residual data, and correspondingly does not need processing by the transform processing unit 206, the quantization unit 208, the inverse quantization unit 210, and the inverse transform processing unit 212. Alternatively, the video encoder 20 may store a reconstructed picture block directly as a reference block without processing by the loop filter 220. Alternatively, the quantization unit 208 and the inverse quantization unit 210 in the video encoder 20 may be combined together. The loop filter 220 is optional, and in a case of lossless compression coding, the transform processing unit 206, the quantization unit 208, the inverse quantization unit 210, and the inverse transform processing unit 212 are optional. It should be understood that, based on different application scenarios, the inter prediction unit 244 and the intra prediction unit 254 may be selectively enabled.

FIG. 3 shows a schematic/conceptual block diagram of an instance of a decoder 30 configured to implement an embodiment of this application. The video decoder 30 is configured to receive, for example, encoded picture data (for example, the encoded bitstream) 21 encoded by the encoder 20 to obtain a decoded picture 231. During a decoding process, the video decoder 30 receives video data, from the video encoder 20, such as representing an encoded video bitstream of a picture block of an encoded video slice and an associated syntax element.

In the instance of FIG. 3, the decoder 30 includes an entropy decoding unit 304, an inverse quantization unit 310, an inverse transform processing unit 312, a reconstruction unit 314 (for example, a summer 314), a buffer 316, a loop filter 320, a decoded picture buffer 330, and a prediction processing unit 360. The prediction processing unit 360 may include an inter prediction unit 344, an intra prediction unit 354, and a mode selection unit 362. In some instances, the video decoder 30 may perform a decoding process substantially inverse to an encoding process performed by the video encoder 20 described above with reference to FIG. 2.

The entropy decoding unit 304 is configured to perform entropy decoding on the encoded picture data 21 to obtain, for example, a quantized coefficient 309 and/or a decoded coding parameter (not shown in FIG. 3), such as any one or all of inter prediction, an intra prediction parameter, a loop filter parameter, and/or another syntax element (decoded). The entropy decoding unit 304 is further configured to forward the inter prediction parameter, the intra prediction parameter, and/or the another syntax element to the prediction processing unit 360. The video decoder 30 may receive a syntax element at a video slice level and/or a video block level.

The inverse quantization unit 310 may be functionally the same as the inverse quantization unit 210, the inverse transform processing unit 312 may be functionally the same as the inverse transform processing unit 212, the reconstruction unit 314 may be functionally the same as the reconstruction unit 214, the buffer 316 may be functionally the same as the buffer 216, the loop filter 320 may be functionally the same as the loop filter 220, and the decoded picture buffer 330 may be functionally the same as the decoded picture buffer 230.

The prediction processing unit 360 may include an inter prediction unit 344 and an intra prediction unit 354, where the inter prediction unit 344 may be functionally similar to the inter prediction unit 244, and the intra prediction unit 354 may be functionally similar to the intra prediction unit 254. The prediction processing unit 360 is usually configured to perform block prediction and/or obtain a prediction block 365 from the encoded picture data 21, and (explicitly or implicitly) receive or obtain a prediction-related parameter and/or information about a selected prediction mode from, for example, the entropy decoding unit 304.

When a video slice is encoded as an intra coded slice (I) slice, the intra-prediction unit 354 of the prediction processing unit 360 is configured to generate a prediction block 365 for a picture block of the current video slice based on an intra-prediction mode represented by a signal and data from a current frame or a previous decoded block of a picture. When a video frame is encoded as an inter coded slice (that is, B or P), the inter prediction unit 344 (for example, a motion compensation unit) of the prediction processing unit 360 is configured to generate a prediction block 365 for a video block of a current video slice based on a motion vector and another syntax element received from the entropy decoding unit 304. For inter prediction, a prediction block may be generated from a reference picture in a reference picture list. The video decoder 30 may construct reference frame lists: a list 0 and a list 1, based on a reference picture stored in the DPB 330 by using a default construction technology.

The prediction processing unit 360 is configured to: determine prediction information of a video block for the current video slice by parsing the motion vector and the another syntax element, and generate, by using the prediction information, a prediction block for a current video block being decoded. In an instance of this application, the prediction processing unit 360 determines, by using some received syntax elements, a prediction mode (for example, intra or inter prediction) for encoding a video block of a video slice, an inter prediction slice type (for example, a B slice, a P slice, or a GPB slice), one or more pieces of construction information in a reference picture list used for a slice, a motion vector of each inter encoding video block used for a slice, an inter prediction state of each inter encoding video block for a slice, and other information, so as to decode the video block of the current video slice. In another instance of this disclosure, a syntax element received by the video decoder 30 from a bitstream includes a syntax element in one or more of an adaptive parameter set (APS), a sequence parameter set (SPS), a picture parameter set (PPS), or a slice header.

The inverse quantization unit 310 may be configured to inversely quantize (that is, dequantize) a quantized transform coefficient provided in a bitstream and decoded by the entropy decoding unit 304. An inverse quantization process may include using a quantization parameter calculated by the video encoder 20 for each video block in the video slice, to determine a degree of quantization to be applied and also determine a degree of inverse quantization to be applied.

The inverse transform processing unit 312 is configured to apply inverse transform (for example, inverse DCT, inverse integer transform, or a conceptually similar inverse transform process) to the transform coefficient, so as to generate a residual block in a pixel domain.

The reconstruction unit 314 (for example, a summer 314) is configured to add an inverse transform block 313 (that is, a reconstructed residual block 313) to the prediction block 365 to obtain a reconstructed block 315 in a sample domain, for example, add a sample value of the reconstructed residual block 313 to a sample value of the prediction block 365.

The loop filter unit 320 (during or after an encoding cycle) is configured to filter the reconstructed block 315 to obtain a filtered block 321, to smoothly perform pixel transform or improve video quality. In an instance, the loop filter unit 320 may be configured to execute any combination of filtering technologies described below. The loop filter unit 320 is intended to represent one or more loop filters, such as a de-blocking filter, a sample-adaptive offset (sample-adaptive offset, SAO) filter, or another filter, such as a bilateral filter, an adaptive loop filter (adaptive loop filter, ALF), a sharpening or smoothing filter, or a collaborative filter. Although the loop filter unit 320 is shown as an in-loop filter in FIG. 3, in another configuration, the loop filter unit 320 may be implemented as a post filter.

A decoded video block 321 in a given frame or picture is then stored in the decoded picture buffer 330 storing a reference picture for subsequent motion compensation.

The decoder 30 is configured to, for example, output a decoded picture 31 by using an output 332 to present the picture to a user or to the user for viewing.

Another variation of the video decoder 30 may be used to decode a compressed bitstream. For example, the decoder 30 may generate an output video stream without the loop filter unit 320. For example, anon-transform-based decoder 30 may directly inversely quantize a residual signal without the inverse transform processing unit 312 for some blocks or frames. In another implementation, the video decoder 30 may have the inverse quantization unit 310 and the inverse transform processing unit 312 that are combined into a single unit.

Specifically, in this embodiment of this application, the decoder 30 is configured to implement an inter prediction method described in the following embodiment.

It should be understood that another structural change of the video decoder 30 may be used to decode an encoded video bitstream. For example, the video decoder 30 may generate an output video stream without processing by the filter 320. Alternatively, for some picture blocks or picture frames, the entropy decoding unit 304 of the video decoder 30 does not decode the quantized coefficient, and correspondingly does not need processing by the inverse quantization unit 310 and the inverse transform processing unit 312. The loop filter 320 is optional. In a case of lossless compression, the inverse quantization unit 310 and the inverse transform processing unit 312 are optional. It should be understood that, based on different application scenarios, the inter prediction unit and the intra prediction unit may be selectively enabled.

It should be understood that, in the encoder 20 and the decoder 30 in this application, a processing result of a specific phase may be further processed and then output to the next phase. For example, after interpolation filtering, motion vector derivation or loop filtering, a further operation, such as clip or shift, is performed on the processing result of a corresponding phase.

For example, further operations may be applied to the control point motion vectors of a current picture block that are derived based on a motion vector of an adjacent affine coding block, which is not limited in this application. For example, a value range of the motion vector is constrained to be within a bit width. It is assumed that an allowed bit width of the motion vector is bit depth (bitDepth), the value range of the motion vector is −2^(bitDepth−1) to 2^(bitDepth−1)−1, where symbol "^" represents a power. If bitDepth is set equal to 16, the range is −32768 to 32767. If bitDepth is set equal to 18, the value range is −131072 to 131071. The value range may be constrained in the following two manners:

Method 1: Remove the overflow most significant bit of the motion vector:

$$ux=(vx+2^{bitDepth})\%2^{bitDepth}$$

$$vx=(ux>=2^{bitDepth-1})?(ux-2^{bitDepth}):ux$$

$$uy=(vy+2^{bitDepth})\%2^{bitDepth}$$

$$vy=(uy>=2^{bitDepth-1})?(uy-2^{bitDepth}):uy$$

For example, if a value of mvx is −32769, after applying the foregoing formulas, the resulting value is 32767. In a computer, decimal numbers are stored as two's complement. The two's complement of −32769 is 1, 0111, 1111, 1111, 1111 (17 bits). Then the most significant bit is discarded, so the value of vx is 0111, 1111, 1111, 1111 (decimal number is 32767), which is same as the output by applying the formulas.

Method 2: Remove the overflow most significant bit by clipping the value, as shown in the following formula:

$$vx=Clip3(-2^{bitDepth-1},2^{bitDepth-1}-1,vx)$$

$$vy=Clip3(-2^{bitDepth-1},2^{bitDepth-1}-1,vy)$$

A definition of Clip3 means clipping a value of z within [x, y]:

$$Clip3(x, y, z) = \begin{cases} x; & z < x \\ y; & z > y \\ z; & \text{otherwise} \end{cases}$$

Figure 4:
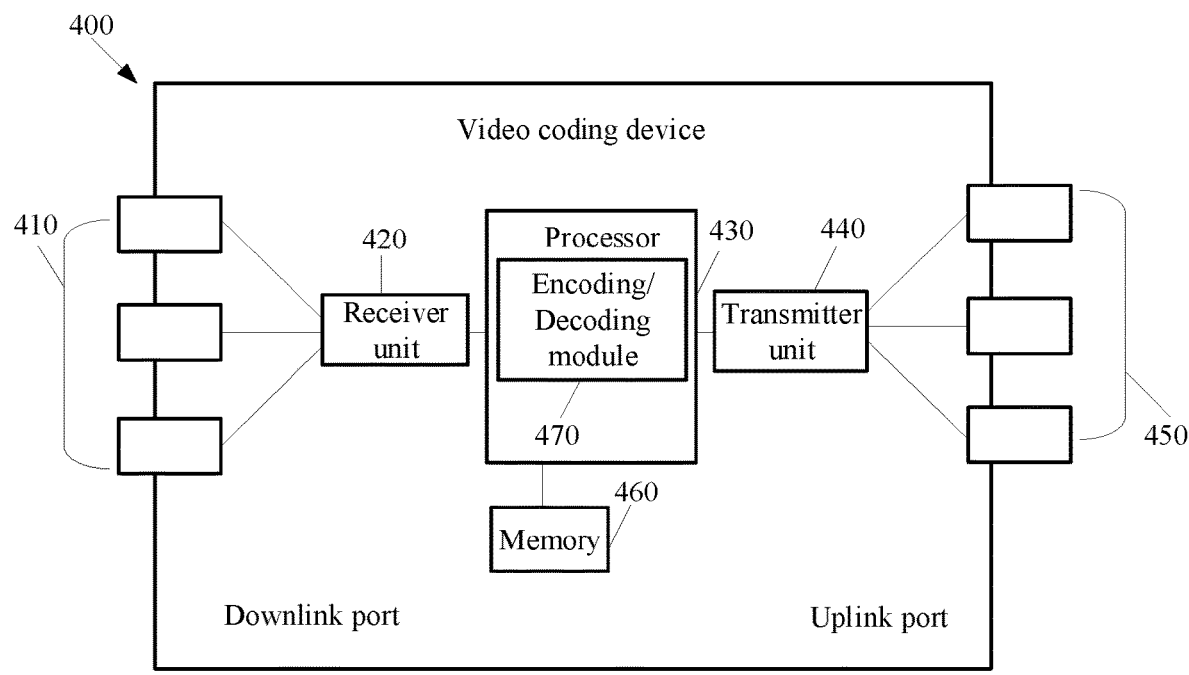
FIG. 4 is a block diagram of an instance of a video coding device 400 used to implement an embodiment of the present invention according to embodiments of this application.

FIG. 4 is a schematic structural diagram of a video coding device 400 (such as a video encoding device 400 or a video decoding device 400) according to an embodiment of this application. The video coding device 400 is adapted to implement the embodiment described herein. In an embodiment, the video coding device 400 may be a video decoder (such as the decoder 30 of FIG. 1A) or a video encoder (such as the encoder 20 of FIG. 1A). In another embodiment, the video coding device 400 may be one or more components of the decoder 30 of FIG. 1A or the encoder 20 of FIG. 1A.

The video coding device 400 includes: an ingress port 410 and a receiver unit (Rx) 420 configured to receive data, a processor, a logic unit, or a central processing unit (CPU) 430 configured to process data, a transmitter unit (Tx) 440 and an egress port 450 configured to transmit data, and a memory 460 configured to store data. The video coding device 400 may further include a photoelectric conversion component and an electro-optical (EO) component that are coupled to the ingress port 410, the receiver unit 420, the transmitter unit 440, and the egress port 450, and that are used for an egress or an ingress of an optical signal or an electrical signal.

The processor 430 is implemented by using hardware and software. The processor 430 may be implemented as one or more CPU chips, cores (for example, a multi-core processor), FPGAs, ASICs, and DSPs. The processor 430 communicates with the ingress port 410, the receiver unit 420, the transmitter unit 440, the egress port 450, and the memory 460. The processor 430 includes a coding module 470 (for example, an encoding module 470 or a decoding module 470). The encoding/decoding module 470 implements the embodiment disclosed in this specification, so as to implement an inter prediction method provided in the embodiment of this application. For example, the encoding/decoding module 470 implements, processes, or provides various coding operations. Therefore, functionality of the video coding device 400 is substantially improved by the encoding/decoding module 470 and transition of the video coding device 400 to a different state is affected. Alternatively, the encoding/decoding module 470 is implemented by using instructions stored in the memory 460 and executed by the processor 430.

The memory 460 includes one or more disks, tape drives, and solid state disks, may be used as a storage device for overflowed data, and is configured to store programs when these programs are selectively executed, and store instructions and data that are read in a program execution process. The memory 460 may be volatile and/or non-volatile, and may be a read-only memory (ROM), a random access memory (RAM), a ternary content-addressable memory (ternary content-addressable memory, TCAM), and/or a static random access memory (SRAM).

Figure 5:
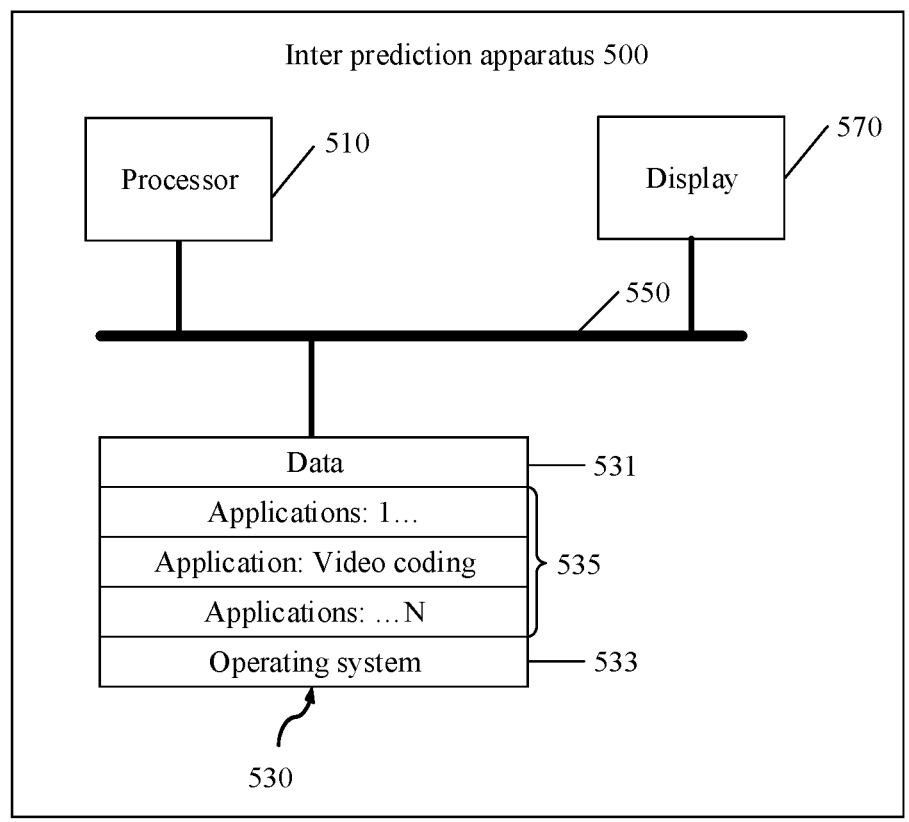
FIG. 5 is a block diagram of an instance of another encoding apparatus or decoding apparatus used to implement an embodiment of the present invention according to embodiments of this application.

FIG. 5 is a simplified block diagram of an apparatus 500 that may be used as any one or two of the source device 12 and the destination device 14 of FIG. 1A according to an example embodiment. The apparatus 500 may implement the technologies of this application. In other words, FIG. 5 is a schematic block diagram of an implementation of an encoding device or a decoding device (referred to as a coding device 500) according to an embodiment of this application. The coding device 500 may include a processor 510, a memory 530, and a bus system 550. The processor is connected to the memory by using the bus system, the memory is configured to store an instruction, and the processor is configured to execute the instructions stored in the memory. The memory of the coding device stores program code, and the processor may invoke the program code stored in the memory to execute various video encoding or decoding methods described in this application. To avoid repetition, details are not described herein again.

In the embodiment of this application, the processor 510 may be a central processing unit (Central Processing Unit, "CPU" for short), or the processor 510 may be another general purpose processor, a digital signal processor (DSP), an application-specific integrated circuit (ASIC), a field-programmable gate array (FPGA), or another programmable logic device, discrete gate or transistor logic device, discrete hardware component, or the like. The general purpose processor may be a microprocessor, or the processor may be any conventional processor or the like.

The memory 530 may include a read-only memory (ROM) device or a random access memory (RAM) device. Any another suitable type of storage device may also be used as the memory 530. The memory 530 may include code and data 531 accessed by the processor 510 by using the bus system 550. The memory 530 may further include an operating system 533 and an application program 535, and the application program 535 includes at least one program that allows the processor 510 to execute the video encoding or decoding method described in this application. For example, the application program 535 may include applications 1 to N, which further include a video encoding or decoding application (referred to as a video coding application) performing the video encoding or decoding method described herein.

The bus system 550 may further include a power bus, a control bus, a status signal bus, and the like, in addition to a data bus. However, for clear description, various types of buses in the figure are marked as the bus system 550.

Optionally, the coding device 500 may further include one or more output devices, such as a display 570. In an example, the display 570 may be a touch-sensitive display that combines the display with a touch-sensitive unit operable to sense a touch input. The display 570 may be connected to the processor 510 by using the bus system 550.

The following first describes concepts involved in this application.

(1) Inter Prediction Mode

In HEVC, two inter prediction modes are used: an advanced motion vector prediction (advanced motion vector prediction, AMVP) mode and a merge (merge) mode.

For the AMVP mode, spatially or temporally adjacent encoded blocks (denoted as adjacent blocks) of a current block are first traversed, and a candidate motion vector list is constructed based on motion information of each adjacent block. The candidate motion vector list may also be referred to as a motion information candidate list. Then, an optimal motion vector is determined from the candidate motion vector list by using a rate distortion cost. For example, candidate motion information with a minimum rate distortion cost is determined as the optimal motion vector, and the optimal motion vector is used as a motion vector predictor (motion vector predictor, MVP) of a current block. Positions of the adjacent blocks and a traversal sequence thereof are predefined. The rate distortion cost may be calculated according to formula (1):

$$J = SAD + \lambda R \quad (1)$$

where J represents the rate distortion cost, SAD represents a sum of absolute differences (sum of absolute differences, SAD) between a predicted pixel value and an original pixel value obtained after motion estimation is performed by using a candidate motion vector predictor, R represents a bit rate, and λ represents a Lagrange multiplier. An encoder side transmits an index value of a selected motion vector predictor in the candidate motion vector list and a reference frame index value to a decoder side. Further, motion search is performed in an MVP-centered adjacent domain to obtain an actual motion vector of a current block, and the encoder side transmits a difference (motion vector difference) between the MVP and the actual motion vector to the decoder side.

Figure 6:
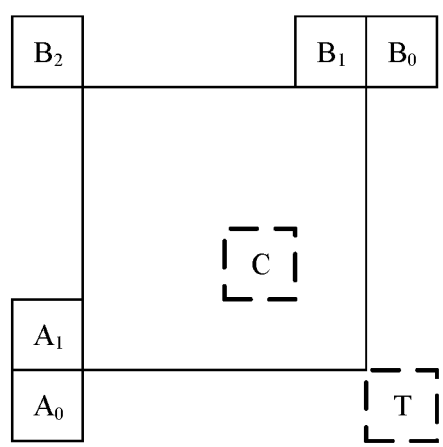
FIG. 6 is an example schematic diagram used to indicate candidate motion information of a current block in space domain and time domain according to an embodiment of this application.

For the merge mode, spatially or temporally adjacent encoded blocks (denoted as adjacent blocks) of a current block are first traversed, and a candidate motion vector list is constructed based on motion information of each adjacent block. Then, optimal motion information is determined from the candidate motion vector list as motion vector motion information of the current block by calculating a rate distortion cost. For details, refer to the foregoing description in the AMVP mode. Then, an index value (which may be denoted as a merge index) of a position of the optimal motion information in the candidate motion vector list is transferred to the decoder side. For example, candidate motion information of the current block in space domain and time domain is shown in FIG. 6. The candidate motion information of the space domain comes from five spatially adjacent blocks (A0, A1, B0, B1, and B2). If an adjacent block cannot be obtained (the adjacent block does not exist or the adjacent block is not encoded or a prediction mode used by the adjacent block is not an inter prediction mode), motion information of the adjacent block is not to be added to the candidate motion vector list. The candidate motion information of the current block in time domain is obtained by scaling an MV of a block in a corresponding position in a reference frame based on picture order counts (picture order count, POC) of the reference frame and a current frame. First, it is determined whether a block in a position T in the reference frame is available; and if the block is unavailable, a block in a position C is selected.

Similar to the AMVP mode, positions of adjacent blocks in the merge mode and a traversal sequence thereof are also predefined, and the positions of the adjacent blocks and the traversal sequence thereof may be different in different modes.

It can be learned that in both the AMVP mode and the merge mode, a candidate motion vector list needs to be maintained. Each time before new motion information is added to the candidate list, whether same motion information exists in the candidate motion vector list is checked. If the same motion information exists, the motion information is not to be added to the list. This check process may be referred to as pruning of the candidate motion vector list. List pruning is to prevent same motion information from appearing in the list, so as to avoid redundant rate distortion cost calculation.

During inter prediction in HEVC, same motion information is used for all pixels in a coding block, and then motion compensation is performed based on the motion information to obtain a predictor of a pixel in the coding block. However, not all the pixels in the coding block have a same motion feature. Using the same motion information may cause inaccurate motion compensation prediction, and consequently residual information is increased.

In a video coding standard, motion estimation is usually performed by using block matching based on a translational motion model, and it is assumed that motion of all pixels in the block is consistent. However, in the real world, motion is diverse, and there are many non-translational motion objects, such as a rotating object, a roller coaster that rotates in different directions, fireworks that are set off, and some special actions in a movie, especially a motion object in a UGC scenario. For encoding of these objects, if a block motion compensation technology based on a translational motion model in a current encoding standard is used, encoding efficiency is greatly affected. Therefore, a non-translational motion model, such as an affine motion model, is generated, so as to further improve encoding efficiency.

On this basis, based on different motion models, the AMVP mode may be divided into a translational motion model-based AMVP mode and a non-translational motion model-based AMVP mode. The merge mode may be divided into a translational motion model-based merge mode and a non-translational motion model-based merge mode.

(2) Non-Translational Motion Model

Non-translational motion model prediction indicates that the encoder side and the decoder side use a same motion model to derive motion information of each motion compensation subunit in a current block, and motion compensation is performed based on the motion information of the motion compensation subunit to obtain a prediction block, thereby improving prediction efficiency. Common non-translational motion models include a 4-parameter affine motion model and a 6-parameter affine motion model.

The motion compensation subunit in this embodiment of this application may be a pixel or a pixel block whose size is $N_1 \times N_2$ and divided by using a specific method, where $N_1$ and $N_2$ are both positive integers, and $N_1$ may be equal to $N_2$, or may not be equal to $N_2$.

The 4-parameter affine motion model is shown in the following formula (2):

$$\begin{cases} vx = a_1 + a_3 x + a_4 y \\ vy = a_2 - a_4 x + a_3 y \end{cases} \quad (2)$$

The 4-parameter affine motion model may be represented by using motion vectors of two pixels and coordinates of the two pixels relative to the top-left sample of a current block, and a pixel used to represent a motion model parameter is referred to as a control point. If the top-left sample (0, 0) and the top-right sample (W, 0) are used as control points, motion vectors (vx0, vy0) and (vx1, vy1) of the top-left sample and the top-right sample control point of the current block are first determined, and motion information of each motion compensation subunit in the current block is obtained based on formula (3), where (x, y) is coordinates of the motion compensation subunit relative to the top-left sample of the current block, and W is a width of the current block.

$$\begin{cases} vx = \frac{vx_1 - vx_0}{W} x - \frac{vy_1 - vy_0}{W} y + vx_0 \\ vy = \frac{vy_1 - vy_0}{W} x + \frac{vx_1 - vx_0}{W} y + vy_0 \end{cases} \quad (3)$$

The 6-parameter affine motion model is shown in the following formula (4):

$$\begin{cases} vx = a_1 + a_3 x + a_4 y \\ vy = a_2 + a_5 x + a_6 y \end{cases} \quad (4)$$

The 6-parameter affine motion model may be represented by using motion vectors of three pixels and coordinates of the three pixels relative to the top-left sample of a current block. If the top-left sample (0, 0), the top-right sample (W, 0), and the bottom-left sample (0, H) are used as control points, motion vectors of the top-left sample, upper right vertex, and lower left vertex control points of the current block are first respectively determined as (vx0, vy0), (vx1, vy1), and (vx2, vy2), and then motion information of each motion compensation subunit in the current block is obtained based on formula (5), where (x, y) is coordinates of the motion compensation subunit relative to the top-left sample of the current block, and W and H are respectively a width and a height of the current block.

$$\begin{cases} vx = \frac{vx_1 - vx_0}{W} x + \frac{vx_2 - vy_0}{H} y + vx_0 \\ vy = \frac{vy_1 - vy_0}{W} x + \frac{vy_2 - vx_0}{H} y + vy_0 \end{cases} \quad (5)$$

A coding block for which prediction is performed by using an affine motion model is referred to as an affine coding block.

Generally, motion information of a control point of an affine coding block may be obtained by using an affine motion model-based advanced motion vector prediction (Advanced Motion Vector Prediction, AMVP) mode or an affine motion model-based merge (Merge) mode.

Specifically, motion information of a control point of a current coding block may be obtained by using an inherited control point motion vector prediction method or a constructed control point motion vector prediction method.

(3) Inherited Control Point Motion Vector Prediction Method

The inherited control point motion vector prediction method is to determine a candidate control point motion vector of a current block by using a motion model of an adjacent encoded affine coding block.

Figure 7:
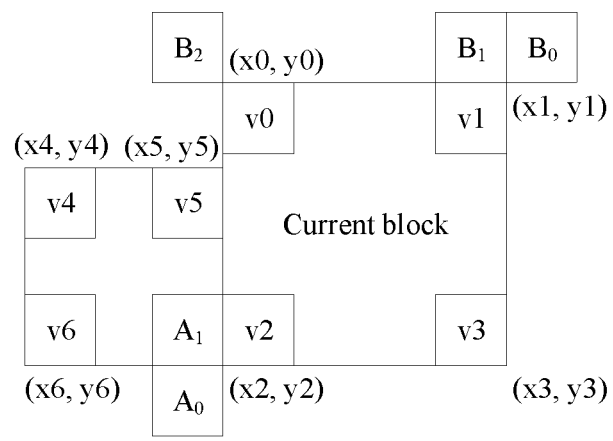
FIG. 7 is an example schematic diagram used to indicate obtaining of motion information of an affine model according to an embodiment of this application.

The current block shown in FIG. 7 is used as an example. Adjacent position blocks around the current block are traversed in a specified order, for example, A1→B1→B0→A0→B2, to find affine coding blocks in which the adjacent position blocks of the current block are located, so as to obtain control point motion information of the affine coding blocks, and further, a motion model constructed by using the control point motion information of the affine coding blocks is used to derive control point motion vectors of the current block to be used in the merge mode, or derive motion vector predictors of the control point to be used in the AMVP mode. It should be noted that A1→B1→B0→A0→B2 is merely an example, and a sequence of another combination is also applicable to this application. In addition, the adjacent position blocks are not limited to A1, B1, B0, A0, and B2.

The adjacent position block may be a pixel, a preset-size pixel block divided based on a specific method, for example, may be a 4×4 pixel block, or may be a 4×2 pixel block, or may be a pixel block with another size, which is not limited.

In the following, A1 is used as an example to describe a determining process, which is similar in other cases.

As shown in FIG. 7, if a coding block in which A1 is located is a 4-parameter affine coding block, a motion vector (vx4, vy4) of the top-left sample (x4, y4) and a motion vector (vx5, vy5) of the top-right sample (x5, y5) of the affine coding block are obtained. A motion vector (vx0, vy0) of the top-left sample (x0, y0) of a current affine coding block is calculated according to formula (6), and a motion vector (vx1, vy1) of the top-right sample (x1, y1) of the current affine coding block is calculated according to formula (7).

$$\begin{cases} vx_0 = vx_4 + \dfrac{(vx_5 - vx_4)}{x_5 - x_4} \times (x_0 - x_4) - \dfrac{(vy_5 - vy_4)}{x_5 - x_4} \times (y_0 - y_4) \\ vy_0 = vy_4 + \dfrac{(vy_5 - vy_4)}{x_5 - x_4} \times (x_0 - x_4) + \dfrac{(vx_5 - vx_4)}{x_5 - x_4} \times (y_0 - y_4) \end{cases} \quad (6)$$

$$\begin{cases} vx_1 = vx_4 + \dfrac{(vx_5 - vx_4)}{x_5 - x_4} \times (x_1 - x_4) - \dfrac{(vy_5 - vy_4)}{x_5 - x_4} \times (y_1 - y_4) \\ vy_1 = vy_4 + \dfrac{(vy_5 - vy_4)}{x_5 - x_4} \times (x_1 - x_4) + \dfrac{(vx_5 - vx_4)}{x_5 - x_4} \times (y_1 - y_4) \end{cases} \quad (7)$$

A combination of the motion vector (vx0, vy0) of the top-left sample (x0, y0) and the motion vector (vx1, vy1) of the top-right sample (x1, y1) of the current block that are obtained based on the affine coding block in which A1 is located is a candidate control point motion vector of the current block.

If the coding block in which A1 is located is a 6-parameter affine coding block, a motion vector (vx4, vy4) of the top-left sample (x4, y4), a motion vector (vx5, vy5) of the top-right sample (x5, y5), and a motion vector (vx6, vy6) of the bottom-left sample (x6, y6) of the affine coding block are obtained. A motion vector (vx0, vy0) of the top-left sample (x0, y0) of a current block is calculated according to formula (8), a motion vector (vx1, vy1) of the top-right sample (x1, y1) of the current block is calculated according to formula (9), and a motion vector (vx2, vy2) of the bottom-left sample (x2, y2) of the current block is calculated according to formula (10).

$$\begin{cases} vx_0 = vx_4 + \dfrac{(vx_5 - vx_4)}{x_5 - x_4} \times (x_0 - x_4) + \dfrac{(vx_6 - vx_4)}{y_6 - y_4} \times (y_0 - y_4) \\ vy_0 = vy_4 + \dfrac{(vy_5 - vy_4)}{x_5 - x_4} \times (x_0 - x_4) + \dfrac{(vy_6 - vy_4)}{y_6 - y_4} \times (y_0 - y_4) \end{cases} \quad (8)$$

$$\begin{cases} vx_1 = vx_4 + \dfrac{(vx_5 - vx_4)}{x_5 - x_4} \times (x_1 - x_4) + \dfrac{(vx_6 - vx_4)}{y_6 - y_4} \times (y_1 - y_4) \\ vy_1 = vy_4 + \dfrac{(vy_5 - vy_4)}{x_5 - x_4} \times (x_1 - x_4) + \dfrac{(vy_6 - vy_4)}{y_6 - y_4} \times (y_1 - y_4) \end{cases} \quad (9)$$

$$\begin{cases} vx_2 = vx_4 + \dfrac{(vx_5 - vx_4)}{x_5 - x_4} \times (x_2 - x_4) + \dfrac{(vx_6 - vx_4)}{y_6 - y_4} \times (y_2 - y_4) \\ vy_2 = vy_4 + \dfrac{(vy_5 - vy_4)}{x_5 - x_4} \times (x_2 - x_4) + \dfrac{(vy_6 - vy_4)}{y_6 - y_4} \times (y_2 - y_4) \end{cases} \quad (10)$$

A combination of the motion vector (vx0, vy0) of the top-left sample (x0, y0) of the current block, the motion vector (vx1, vy1) of the top-right sample (x1, y1), and the motion vector (vx2, vy2) of the bottom-left sample (x2, y2) of the current block that are obtained based on the affine coding block in which A1 is located is a candidate control point motion vector of the current block.

It should be noted that another motion model, another candidate position, and another searching and traversal sequence may also be applied to this application, and details are not described in this embodiment of this application.

It should be noted that a method for representing motion models of adjacent and current coding blocks by using another control point may also be applied to this application, and details are not described herein.

(4) Constructed Control Point Motion Vector (Constructed Control Point Motion Vectors) Prediction Method:

The constructed control point motion vector prediction method is to combine motion vectors of encoded blocks adjacent to control points of a current block as control point motion vectors of a current affine coding block, without needing to consider whether the adjacent encoded blocks are affine coding blocks.

Motion vectors of the top-left sample and the top-right sample of a current block are determined by using motion information of encoded blocks adjacent to the current coding block. The constructed control point motion vector prediction method is described by using an example shown in FIG. 8. It should be noted that FIG. 8 is merely an example.

Figure 8:
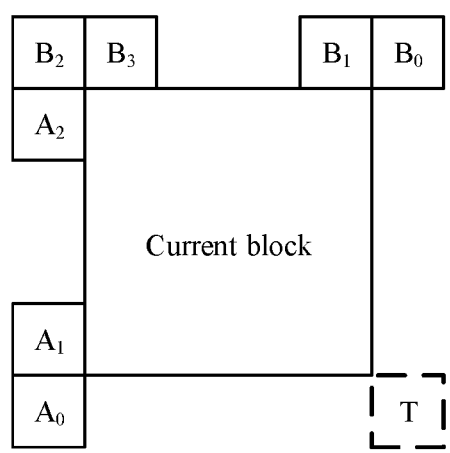
FIG. 8 is an example schematic diagram of a constructed control point motion vector prediction method according to an embodiment of this application.

As shown in FIG. 8, motion vectors of encoded blocks A2, B2, and B3 adjacent to the top-left sample are used as candidate motion vectors of a motion vector of the top-left sample of a current block. Motion vectors of encoded blocks B1 and B0 adjacent to the top-right sample are used as candidate motion vectors of a motion vector of the top-right sample of the current block. The candidate motion vectors of the top-left sample and the top-right sample are combined to form a plurality of 2-tuples. Motion vectors of two encoded blocks included in the 2-tuple may be used as candidate control point motion vectors of the current block. Refer to the following formula (11A):

$$\{v_{A2}, v_{B1}\}, \{v_{A2}, v_{B0}\}, \{v_{B2}, v_{B1}\}, \{v_{B2}, v_{B0}\}, \{v_{B3}, v_{B1}\}, \{v_{B3}, v_{B0}\} \quad (11A)$$

where $v_{A2}$ represents the motion vector of A2, $v_{B1}$ represents the motion vector of B1, $v_{B0}$ represents the motion vector of B0, $v_{B2}$ represents the motion vector of B2, and $v_{B3}$ represents the motion vector of B3.

As shown in FIG. 8, the motion vectors of the encoded blocks A2, B2, and B3 adjacent to the top-left sample are used as candidate motion vectors of the motion vector of the top-left sample of the current block. The motion vectors of the encoded blocks B1 and B0 adjacent to the top-right sample are used as candidate motion vectors of the motion vector of the top-right sample of the current block. Motion vectors of encoded blocks A0 and A1 adjacent to a top-left sample are used as candidate motion vectors of a motion vector of the bottom-left sample of the current block. The candidate motion vectors of the top-left sample, the top-right sample, and the bottom-left sample are combined to form a triplet. Motion vectors of three encoded blocks included in the triplet may be used as the candidate control point motion vectors of the current block, as shown in the following formulas (11B) and (11C):

$$\{v_{A2}, v_{B1}, v_{A0}\}, \{v_{A2}, v_{B0}, v_{A0}\}, \{v_{B2}, v_{B1}, v_{A0}\}, \{v_{B2}, v_{B0}, v_{A0}\}, \{v_{B3}, v_{B1}, v_{A0}\}, \{v_{B3}, v_{B0}, v_{A0}\} \quad (11B)$$

$$\{v_{A2}, v_{B1}, v_{A1}\}, \{v_{A2}, v_{B0}, v_{A1}\}, \{v_{B2}, v_{B1}, v_{A1}\}, \{v_{B2}, v_{B0}, v_{A1}\}, \{v_{B3}, v_{B1}, v_{A1}\}, \{v_{B3}, v_{B0}, v_{A1}\} \quad (11C);$$

where $v_{A2}$ represents the motion vector of A2, $v_{B1}$ represents the motion vector of B1, $v_{B0}$ represents the motion vector of B0, $v_{B2}$ represents the motion vector of B2, $v_{B3}$ represents the motion vector of B3, $v_{A0}$ represents the motion vector of A0, and $v_{A1}$ represents the motion vector of A1.

It should be noted that another method for combining control point motion vectors may also be applied to this application, and details are not described herein.

It should be noted that a method for representing motion models of adjacent and current coding blocks by using another control point may also be applied to this application, and details are not described herein.

(5) An Affine Motion Model-Based Advanced Motion Vector Prediction Mode (Affine AMVP Mode):

1. Constructing a Candidate Motion Vector List

A candidate motion vector list of the affine motion model-based AMVP mode is constructed by using the inherited control point motion vector prediction method and/or the constructed control point motion vector prediction method. In this embodiment of this application, the candidate motion vector list of the affine motion model-based AMVP mode may be referred to as a control point motion vector predictor candidate list (control point motion vectors predictor candidate list), and motion vector predictors of each control point include motion vectors of two (4-parameter affine motion model) control points or motion vectors of three (6-parameter affine motion model) control points.

Optionally, the control point motion vector predictor candidate list is pruned and sorted according to a specific rule, and may be truncated or filled in to reach a specific quantity.

2. Determining an Optimal Control Point Motion Vector Predictor

On the encoder side, a motion vector of each motion compensation subunit in a current coding block is obtained according to formula (3) or (5) and each control point motion vector predictor in the control point motion vector predictor candidate list, and a pixel value of a corresponding position in a reference frame to which the motion vector of each motion compensation subunit points is obtained as a predictor of the motion compensation subunit, to perform motion compensation by using an affine motion model. An average value of differences between original values and predictors of all pixels in the current coding block is calculated, and a control point motion vector predictor corresponding to a minimum average value is selected as an optimal control point motion vector predictor, and is used as motion vector predictors of two or three control points in the current coding block. An index number representing a position of the control point motion vector predictor in the control point motion vector predictor candidate list is encoded into a bitstream and sent to the decoder.

On the decoder side, the index number is parsed, and a control point motion vector predictor (control point motion vectors predictor, CPMVP) is determined from the control point motion vector predictor candidate list based on the index number.

3. Determining Control Point Motion Vectors

On the encoder side, motion searching is performed within a specific search range by using a control point motion vector predictor as a search start point to obtain control point motion vectors (control point motion vectors, CPMV). A difference between a control point motion vector and a control point motion vector predictor (control point motion vectors differences, CPMVD) is transferred to the decoder side.

On the decoder side, control point motion vector differences are parsed and added to the control point motion vector predictors to obtain the control point motion vectors.

(6) Affine Motion Model-Based Affine Merge Mode (Affine Merge Mode):

A control point motion vector merge candidate list (control point motion vectors merge candidate list) is constructed by using the inherited control point motion vector prediction method and/or the constructed control point motion vector prediction method.

Optionally, the control point motion vector merge candidate list is pruned and sorted according to a specific rule, and may be truncated or filled in to reach a specific quantity.

On the encoder side, a motion vector of each motion compensation subunit (a pixel or a pixel block with a size of $N_1 \times N_2$ that is obtained through division by using a specific method) in a current coding block is obtained according to formula (3) or (5) and each control point motion vector in the merge candidate list, so as to obtain a pixel value of a position in a reference frame to which the motion vector of each motion compensation subunit points; and the pixel value is used as a predictor of the motion compensation subunit to perform affine motion compensation. An average value of differences between original values and predictors of all pixels in the current coding block is calculated, and a control point motion vector corresponding to a minimum average value of the differences is selected as motion vectors of two or three control points in the current coding block. An index number indicating a position of the control point motion vector in the candidate list is encoded into a bitstream and sent to the decoder.

On the decoder side, the index number is parsed, and the control point motion vector (control point motion vectors, CPMV) is determined from the control point motion vector merge candidate list based on the index number.

(7) Adaptive Motion Vector Resolution (Adaptive Motion Vector Resolution, AMVR) Mode:

In the AMVR mode, a motion vector difference (Motion vector differences, MVD) may be encoded as 1/16 accuracy, 1/4 accuracy, or integral pixel accuracy. Different resolution may be represented by using AMVR index (index) values. For example, index=0 and corresponding MVD resolution is 1/16; index=1 and corresponding MVD resolution is 1/4; and index=2 and corresponding MVD resolution is integral pixel accuracy. Optionally, a correspondence between the AMVR index and a resolution value may also be in another manner. For example, index=0 and corresponding MVD resolution is 1/4. Details are not described in this application. In the following, an example in which index=0 and corresponding MVD resolution is 1/16, index=1 and corresponding MVD resolution is 1/4, and index=2 and corresponding MVD resolution is integral pixel accuracy is used for description.

In addition, an MV resolution value and occupied bit depth (bit-depth) of the MV resolution value may be used to jointly represent an available value range of the MV. If the MV resolution is R and the occupied bit depth is S bits, a maximum value of the MV is maxMV=$R*2^{s-1}-1$ and a minimum value of the MV is minMV=$R*2^{s-1}$. For example, If the MV resolution is 1/16, and the occupied bit depth is 16 bits, a range that can be represented by the MV is ($-2^{11}$, $2^{11}-1$).

If the MV resolution is 1/4, and the occupied bit depth is 16 bits, a range that can be represented by the MV is ($-2^{13}$, $2^{13}-1$).

If the MV resolution is 1/16, and the occupied bit depth is 18 bits, a range that can be represented by the MV is ($-2^{13}$, $2^{13}-1$).

If the AMVR mode is used fora current block, resolution of a CPMVD may be 1/16, and bit depth of the CPMVD may be 16 bits; or resolution of a CPMVD may be 1/4, and bit depth of the CPMVD may be 16 bits; or resolution of a CPMVD may be integral pixel accuracy, and bit depth of the CPMVD may be 16 bits.

Therefore, resolution of motion information in motion compensation and motion information storage processes may be different. For motion compensation and motion information (motion information of a subsequent encoding procedure) storage processes of an affine transform block, this application provides a resolution transform method in motion information storage and motion compensation of an affine coding block. If motion compensation and stored motion information are the same in terms of resolution, same motion vector resolution is used; and if motion compensation is different from the stored motion information in terms of resolution, motion vector resolution of motion compensation is quantized as resolution of the stored motion vector for storage.

Figure 9:
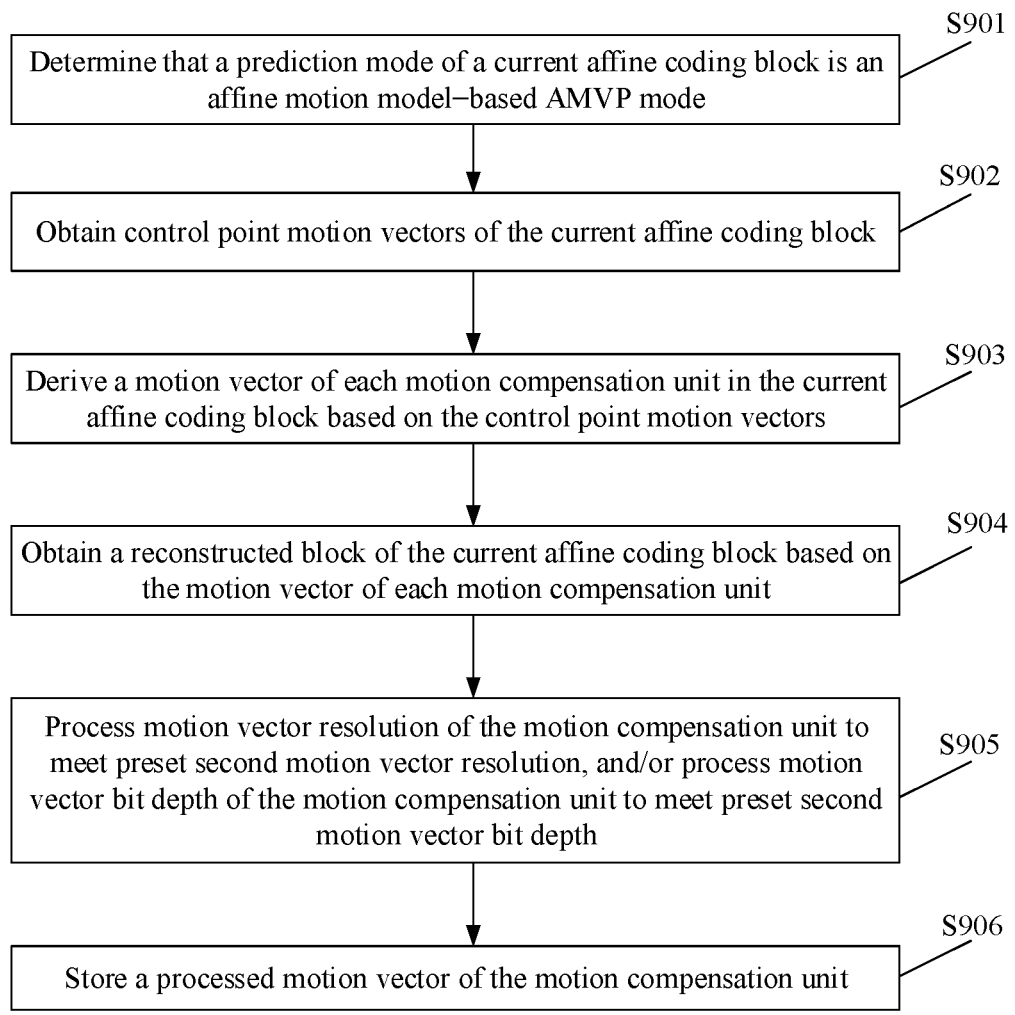
FIG. 9 is a flowchart of an inter prediction method according to an embodiment of this application.

The following describes the embodiments of this application with reference to accompanying drawings. FIG. 9 is a flowchart of an inter prediction method according to an embodiment of this application. It is assumed that a to-be-processed picture block is a current affine coding block. As shown in FIG. 9, the method may include the following steps.

S901. Determine that a prediction mode of the current affine coding block is an affine motion model-based AMVP mode.

A method for determining an inter prediction mode of the current affine coding block may be obtained by parsing a syntax element. A specific determining method is not specifically limited in this application. If it is determined that the inter prediction mode of the current affine coding block is the affine motion model-based AMVP mode, the following steps are performed.

S902. Obtain control point motion vectors of the current affine coding block.

For a method for obtaining control point motion information of the current affine coding block, refer to the descriptions of obtaining the control point motion information of the current affine coding block in the foregoing "affine motion model-based AMVP mode". Details are not described herein.

For example, on a decoder side, control point motion vector differences (CPMVD) and indexes of control point motion vector predictors may be obtained by parsing a bitstream, and the control point motion vector predictors (CPMVP) are determined from a control point motion vector predictor candidate list based on the indexes of the control point motion vector predictors. For example, the CPMVPs may be obtained by obtaining a motion vector of an adjacent encoded block in a storage unit, and the CPMVDs and the CPMVPs are added together to obtain the control point motion vectors (CPMV).

However, to save a storage space, the control point motion vector predictor candidate list is generally stored with low resolution. For example, resolution of the CPMVP may be ¼ pixel accuracy, and bit depth of the CPMVP may be 16 bits.

If an AMVR mode is used for the current affine coding block, resolution of the CPMVD may be 1/16 pixel accuracy, and bit depth of the CPMVD may be 16 bits; or resolution of the CPMVD may be ¼ pixel accuracy, and bit depth of the CPMVD may be 16 bits; or resolution of the CPMVD may be integral pixel accuracy, and bit depth of the CPMVD may be 16 bits.

If the CPMV is still determined by using a low-resolution CPMVP and CPMVD, inter prediction accuracy of the current affine coding block is relatively low. Therefore, the CPMV may be determined by improving the resolution of the CPMVP and the resolution of the CPMVD, so as to improve the inter prediction accuracy of the current affine coding block. The following describes in detail how to determine the CPMV by improving the resolution of the CPMVP and the resolution of the CPMVD.

First, the resolution of the CPMVD is compared with preset first motion vector resolution, and the resolution of the CPMVP is compared with the first motion vector resolution. When the resolution of the CPMVD is not equal to the first motion vector resolution, and the resolution of the CPMVP is equal to the first motion vector resolution, control point motion vectors of the current affine coding block may be obtained based on the CPMVD and a first shift value. When the resolution of the CPMVD is equal to the first motion vector resolution, and the resolution of the CPMVP is not equal to the first motion vector resolution, the control point motion vectors of the current affine coding block may be obtained based on the CPMVP and a second shift value. When the resolution of the CPMVD is not equal to the first motion vector resolution, and the resolution of the CPMVP is not equal to the first motion vector resolution, the control point motion vectors of the current affine coding block may be obtained based on the CPMVD, the first shift value, the CPMVP, and the second shift value.

For example, the following formula (12) may be used to obtain the control point motion vectors of the current affine coding block:

$$CPMV = CPMVD' + CPMVP' \qquad (12)$$

When the resolution of the CPMVD is not equal to the first motion vector resolution, $CPMVD' = CPMVD << mvrShift1$.

When the resolution of the CPMVD is equal to the first motion vector resolution, $CPMVD' = CPMVD$. It may be understood that the resolution of the CPMVD does not need to be adjusted.

When the resolution of the CPMVP is not equal to the first motion vector resolution, $CPMVP' = CPMVP << mvrShift2$.

When the resolution of the CPMVP is equal to the first motion vector resolution, $CPMVP' = CPMVP$. It may be understood that the resolution of the CPMVP does not need to be adjusted.

CPMV represents the control point motion vector, mvrShift1 represents the first shift value, and mvrShift2 represents the second shift value.

It should be noted that the first shift value may be determined based on the first motion vector resolution and the resolution of the CPMVD. For example, the first motion vector resolution is $1/2^m$, the resolution of the CPMVD is $1/2^n$, and the first shift value may be a difference obtained by subtracting n from m. Similarly, the second shift value may be determined based on the first motion vector resolution and the resolution of the CPMVP. For example, the first motion vector resolution is $1/2^m$, the resolution of the CPMVP is $1/2^n$, and the second shift value may be a difference obtained by subtracting n from m.

In a first feasible implementation, when the first motion vector resolution is 1/16 ($1/2^4$) pixel accuracy and the resolution of the CPMVD is 1/16 pixel accuracy, the first shift value is equal to 0; when the first motion vector resolution is 1/16 pixel accuracy, and the resolution of the CPMVD is ¼ ($1/2^2$) pixel accuracy, the first shift value is equal to 2; and when the first motion vector resolution is 1/16 pixel accuracy, and the resolution of the CPMVD is integral pixel accuracy) ($1/2^0$), the first shift value is equal to 4.

When the first motion vector resolution is 1/16 pixel accuracy, and the resolution of the CPMVP is 1/16 pixel accuracy, the second shift value is equal to 0; when the first motion vector resolution is 1/16 pixel accuracy, and the resolution of the CPMVP is ¼ pixel accuracy, the second shift value is equal to 2; and when the first motion vector resolution is 1/16 pixel accuracy, and the resolution of the CPMVP is integral pixel accuracy, the second shift value is equal to 4.

It should be understood that when the first shift value is equal to 0 or the second shift value is equal to 0, in an embodiment, no shifting is performed.

For example, when the first motion vector resolution is 1/16 pixel accuracy, the control point motion vector of the current affine coding block may have the following values.

If the resolution of the CPMVD is 1/16 pixel accuracy, and the resolution of the CPMVP is ¼ pixel accuracy, the first shift value may be 0, the second shift value may be 2, and the control point motion vector of the current affine coding block is CPMV=(CPMVD<<0)+(CPMVP<<2).

If the resolution of the CPMVD is ¼ pixel accuracy, and the resolution of the CPMVP is ¼ pixel accuracy, the first shift value may be 2, the second shift value may be 2, and the control point motion vector of the current affine coding block is CPMV=(CPMVD<<2)+(CPMVP<<2).

If the resolution of the CPMVD is integral pixel accuracy, and the resolution of the CPMVP is ¼ pixel accuracy, the first shift value may be 4, the second shift value may be 2, and the control point motion vector of the current affine coding block is CPMV=(CPMVD<<4)+(CPMVP<<2).

In a second feasible implementation, when the first motion vector resolution is 1/32 ($1/2^5$) pixel accuracy and the resolution of the CPMVD is 1/16 ($1/2^4$) pixel accuracy, the first shift value is equal to 1; when the first motion vector resolution is 1/32 pixel accuracy, and the resolution of the CPMVD is ¼ ($1/2^2$) pixel accuracy, the first shift value is equal to 3; and when the first motion vector resolution is 1/32 pixel accuracy, and the resolution of the CPMVD is integral pixel accuracy)($1/2^0$), the first shift value is equal to 5.

When the first motion vector resolution is 1/32 pixel accuracy, and the resolution of the CPMVP is 1/16 pixel accuracy, the second shift value is equal to 1; when the first motion vector resolution is 1/32 pixel accuracy, and the resolution of the CPMVP is ¼ pixel accuracy, the second shift value is equal to 3; and when the first motion vector resolution is 1/32 pixel accuracy, and the resolution of the CPMVP is integral pixel accuracy, the second shift value is equal to 5.

For example, when the first motion vector resolution is 1/32 pixel accuracy, the control point motion vector of the current affine coding block may have the following values.

If the resolution of the CPMVD is 1/16 pixel accuracy, and the resolution of the CPMVP is ¼ pixel accuracy, first shift value may be 1, the second shift value may be 3, and the control point motion vector of the current affine coding block is CPMV=(CPMVD<<1)+(CPMVP<<3).

If the resolution of the CPMVD is ¼ pixel accuracy, and the resolution of the CPMVP is ¼ pixel accuracy, the first shift value may be 3, the second shift value may be 3, and the control point motion vector of the current affine coding block is CPMV=(CPMVD<<3)+(CPMVP<<3).

If the resolution of the CPMVD is integral pixel accuracy, and the resolution of the CPMVP is ¼ pixel accuracy, the first shift value may be 5, the second shift value may be 3, and the control point motion vector of the current affine coding block is CPMV=(CPMVD<<5)+(CPMVP<<3).

In a third feasible implementation, when the first motion vector resolution is 1/64 ($1/2^6$) pixel accuracy and the resolution of the CPMVD is 1/16 ($1/2^4$) pixel accuracy, the first shift value is equal to 2; when the first motion vector resolution is 1/64 pixel accuracy, and the resolution of the CPMVD is ¼ ($1/2^2$) pixel accuracy, the first shift value is equal to 4; and when the first motion vector resolution is 1/64 pixel accuracy, and the resolution of the CPMVD is integral pixel accuracy) ($1/2^0$), the first shift value is equal to 6.

When the first motion vector resolution is 1/64 pixel accuracy, and the resolution of the CPMVP is 1/16 pixel accuracy, the second shift value is equal to 2; when the first motion vector resolution is 1/64 pixel accuracy, and the resolution of the CPMVP is ¼ pixel accuracy, the second shift value is equal to 4; and when the first motion vector resolution is 1/64 pixel accuracy, and the resolution of the CPMVP is integral pixel accuracy, the second shift value is equal to 6.

For example, when the first motion vector resolution is 1/64 pixel accuracy, the control point motion vector of the current affine coding block may have the following values.

If the resolution of the CPMVD is 1/16 pixel accuracy, and the resolution of the CPMVP is ¼ pixel accuracy, the first shift value may be 2, the second shift value may be 4, and the control point motion vector of the current affine coding block is CPMV=(CPMVD<<2)+(CPMVP<<4).

If the resolution of the CPMVD is ¼ pixel accuracy, and the resolution of the CPMVP is ¼ pixel accuracy, the first shift value may be 4, the second shift value may be 4, and the control point motion vector of the current affine coding block is CPMV=(CPMVD<<4)+(CPMVP<<4).

If the resolution of the CPMVD is integral pixel accuracy, and the resolution of the CPMVP is ¼ pixel accuracy, the first shift value may be 6, the second shift value may be 4, and the control point motion vector of the current affine coding block is CPMV=(CPMVD<<6)+(CPMVP<<4).

Further, the control point motion vectors may be clipped, so that bit depth of the control point motion vectors is equal to first motion vector bit depth.

For example, the bit depth of the control point motion vectors is compared with the first motion vector bit depth. When the bit depth of the control point motion vectors is greater than the first motion vector bit depth, the control point motion vectors are clipped, so that the bit depth of the control point motion vectors is equal to the first motion vector bit depth.

For example, the following formula (13) may be used to clip the control point motion vectors, so that the bit depth of the control point motion vectors is equal to the first motion vector bit depth.

$$vx=\text{Clip3}(-2^{bitDepth-1}, 2^{bitDepth-1}-1, vx)$$

$$vy=\text{Clip3}(-2^{bitDepth-1}, 2^{bitDepth-1}-1, vy) \quad (13)$$

where (vx, vy) is the control point motion vector of the current affine coding block, and a definition of Clip3 means clipping a value of z within an interval [x, y]:

$$\text{Clip3}(x, y, z) = \begin{cases} x; & z < x \\ y; & z > y \\ z; & \text{otherwise} \end{cases}''$$

For example, if the first motion vector resolution is 1/16 pixel accuracy, the first motion vector bit depth is 18 bits, and a range that can be represented by the MV is ($-2^{13}$, $2^{13}-1$), to enable a value range of the control point motion vector to be ($-2^{13}$, $2^{13}-1$), the bit depth of the control point motion vector may be clipped, that is, 18 bits are substituted into formula (13), so that the bit depth of the control point motion vector is equal to the first motion vector bit depth.

S903. Derive a motion vector of each motion compensation unit in the current affine coding block based on the control point motion vectors.

Motion information of each motion compensation unit in the current affine coding block is determined based on control point motion information and by using an affine transform model.

For each motion compensation unit of the current affine coding block, motion information of a pixel at a preset position in the motion compensation unit may be used to indicate motion information of all pixels in the motion compensation unit. It is assumed that a size of the motion compensation unit is M×N, the pixel at the preset position may be a pixel at a center point (M/2, N/2), the top-left sample (0, 0), the top-right sample (M−1, 0), or another position of the motion compensation unit. The following uses the center point of the motion compensation unit as an example for description.

The size M×N of the motion compensation unit is a size determined by using a same rule and agreed upon by an encoder and a decoder, and may be fixed as 4×4, 8×8, or the like, or may be determined based on control point motion vector differences, motion vector resolution, and a distance between control points.

It should be noted that the size of the motion compensation unit of the current affine coding block may be determined by using another method, and details are not described in this application.

Coordinates of the center point of the motion compensation unit relative to the top-left sample of the current affine coding block may be calculated according to formula (14).

$$\begin{cases} x_{(i,j)} = M \times i + \dfrac{M}{2}, & i = 0, 1 \ldots \\ y_{(i,j)} = N \times j + \dfrac{N}{2}, & j = 0, 1 \ldots \end{cases} \quad (14)$$

where i is an ith motion compensation unit (from left to right) in a horizontal direction, j is a jth motion compensation unit (from top to bottom) in a vertical direction, ($x_{(i,j)}$, $y_{(i,j)}$) represents coordinates of a center point of an (i, j)th motion compensation unit relative to the top-left sample of the current affine coding block. Then, ($x_{(i,j)}$, $y_{(i,j)}$) is substituted into formula (15) to obtain motion information of a center point of each motion compensation unit, and the motion information is used as motion information ($vx_{(i,j)}$, $vy_{(i,j)}$) of all pixels in the motion compensation unit.

$$\begin{cases} vx = \dfrac{vx_1 - vx_0}{W}x + \dfrac{vx_2 - vy_0}{H}y + vx_0 \\ vy = \dfrac{vy_1 - vy_0}{W}x + \dfrac{vy_2 - vx_0}{H}y + vy_0 \end{cases} \quad (15)$$

A specific implementation operation may be performed based on the following procedure, where Log 2 is a function of taking a logarithm of 2, "<<" indicates left shift, and ">>" indicates right shift:

log 2W=Log 2(W)

log 2H=Log 2(H)

mvScaleHor=vx0<<7 mvScaleVer=vy0<<7 dHorX=(vx1−vx0)<<(7−log 2W)

dVerX=(vy1−vy0)<<(7−log 2W)

If a current affine decoding block is a 6-parameter affine decoding block, let:

dHorY=(vx2−vx0)<<(7−log 2H)

dVerY=(vy2−vy0)<<(7−log 2H)

If a current affine decoding block is a 4-parameter affine decoding block, let:

dHorY=−dVerX dVerY=dHorX

Then, a motion compensation motion vector may be calculated based on the following formulas:

vx=Round(mvScaleHor+dHorX*x+dHorY*y)

vy=Round(mvScaleVer+dVerX*x+dVerY*y)

Operations of the Round function are as follows: For any input K and mvShift, output K is obtained in the following manner:

offset=1<<(mvShift−1)

K=K>=0?(K+offset)>>mvShift:−((−K+offset)>>mvShift)

An obtained motion vector (vx, vy) is then clipped so that the motion vector does not exceed a dynamic range of 18 bits.

For example, when the resolution of the CPMV is ¼ pixel accuracy, mvShift may be set to 5, to obtain that motion vector resolution of the motion compensation unit is 1/16 pixel accuracy. When the resolution of the CPMV is 1/16 pixel accuracy, mvShift may be set to 7, to obtain that the motion vector resolution of the motion compensation unit is 1/16 pixel accuracy. When the resolution of the CPMV is 1/16 pixel accuracy, mvShift may be set to 9, to obtain that the motion vector resolution of the motion compensation unit is ¼ pixel accuracy.

For example, when control point motion vector resolution is 1/16 pixel accuracy, and the bit depth of the control point motion vector is 18 bits, mvShift may be set to 7, so that the motion vector resolution of the motion compensation unit is 1/16 pixel accuracy, and motion vector bit depth of the motion compensation unit is 18 bits.

S904. Obtain a reconstructed block of the current affine coding block based on the motion vector of each motion compensation unit.

For example, motion compensation is performed based on the motion vector of each motion compensation unit, to obtain a prediction block of the current affine coding block. For each motion compensation unit of the current affine coding block, motion compensation prediction is performed by using the motion information obtained in S903, to obtain a predictor of each motion compensation unit. Then, the reconstructed block of the current affine coding block is obtained based on the prediction block and the motion vector of each motion compensation unit.

Optionally, the prediction block and a residual block of the current affine coding block are added to obtain the reconstructed block of the current affine coding block; or the prediction block is updated based on the motion vector of each motion compensation unit, and an updated prediction block and a residual block of the current affine coding block are added to obtain the reconstructed block of the current affine coding block; or the prediction block and a residual block of the current affine coding block are added to obtain the reconstructed block of the current affine coding block, and filtering processing is performed on the reconstructed block based on the motion vector of each motion compensation unit; or the prediction block and a residual block of the current affine coding block are added to obtain the reconstructed block of the current affine coding block, and the motion vector of each motion compensation unit and the reconstructed block are used as prediction information of a subsequent current affine coding block.

If it is obtained based on S903 that the motion vector resolution of the motion compensation unit is motion vector resolution of the storage unit, for example, ¼ pixel accuracy, S905 may not need to be performed.

If it is obtained based on S903 that the motion vector resolution of the motion compensation unit is not the motion vector resolution of the storage unit, for example, ¼ pixel accuracy, S905 needs to be performed.

S905. Process motion vector resolution of the motion compensation unit to meet preset second motion vector resolution, and/or process motion vector bit depth of the motion compensation unit to meet preset second motion vector bit depth.

In a subsequent decoding procedure, for example, a de-blocking filter, overlapping block motion compensation, and motion information derivation of a subsequent coding block, the motion information of the current affine coding block needs to be used. Therefore, the motion information of the motion compensation unit obtained in S903 needs to be stored.

Generally, a size of a motion information storage unit is 4×4, and motion information of each 4×4 storage unit in the motion compensation unit is set as motion information of the motion compensation unit.

It should be noted that if the motion vector resolution of the motion compensation unit is different from the motion vector resolution of the storage unit, the motion vector of the motion compensation unit needs to be quantized as the motion vector resolution of the storage unit for storage. For example:

The following formula (16) may be used to obtain a processed motion vector of the motion compensation unit.

$$MCUMV'=(MCUMV>>mvrShift3) \quad (16)$$

where MCUMV' represents the processed motion vector of the motion compensation unit, MCUMV represents a motion vector of the motion compensation unit before processing, and mvrShift3 represents a third shift value.

It should be noted that the third shift value may be determined based on the second motion vector resolution and resolution of the MCUMV. For example, the second motion vector resolution is $½^k$, the resolution of the MCUMV is $½^n$, and the third shift value may be a difference obtained after n minus k.

In a first feasible implementation, when the second motion vector resolution is ¼ ($½^2$) pixel accuracy, and the resolution of the MCUMV is 1/16 ($½^4$) pixel accuracy, the third shift value is equal to 2, and the processed motion vector of the motion compensation unit is MCUMV'= (MCUMV>>2).

In a second feasible implementation, when the second motion vector resolution is ¼ pixel accuracy, and the resolution of the MCUMV is 1/32 ($½^5$) pixel accuracy, the third shift value is equal to 3, and the processed motion vector of the motion compensation unit is MCUMV'= (MCUMV>>3).

In a third feasible implementation, when the second motion vector resolution is ¼ pixel accuracy, and the resolution of the MCUMV is 1/64 ($½^6$) pixel accuracy, the third shift value is equal to 4, and the processed motion vector of the motion compensation unit is MCUMV'= (MCUMV>>4).

Particularly, when the second motion vector resolution is ¼ pixel accuracy, and the resolution of the MCUMV is ¼ pixel accuracy, the third shift value is equal to 0, and the processed motion vector of the motion compensation unit is MCUMV'=MCUMV. It may be understood that it is unnecessary to perform pixel accuracy reduction processing on the motion vector of the motion compensation unit.

Optionally, the processed motion vector resolution of the motion compensation unit may be directly derived according to formula (15), to meet the second motion vector resolution. Alternatively, the motion vector resolution of the motion compensation unit obtained in S903 may be directly quantized, so that the processed motion vector of the motion compensation unit meets the second motion vector resolution. For example, a quantization method is a round function in S903. For example, the motion vector resolution of the motion compensation unit is 1/16 pixel accuracy, the processed motion vector resolution of the motion compensation unit is ¼ pixel accuracy, and mvShift may be set to 2.

Further, bit depth of the processed motion vector of the motion compensation unit may be clipped, so that the bit depth of the processed motion vector of the motion compensation unit is equal to the second motion vector bit depth.

For example, when the bit depth of the processed motion vector of the motion compensation unit is greater than the second motion vector bit depth, the processed motion vector of the motion compensation unit is clipped, so that the bit depth of the processed motion vector of the motion compensation unit is equal to the second motion vector bit depth. For details, refer to the description of formula (13), and details are not described.

For example, if the second motion vector resolution is ¼ pixel accuracy, the second motion vector bit depth is 16 bits, and a range that can be represented by the MV is $(-2^{11}, 2^{11}-1)$, to enable the value range of the processed motion vector of the motion compensation unit to be $(-2^{11}, 2^{11}-1)$, the bit depth of the processed motion vector of the motion compensation unit may be clipped, that is, 16 bits are substituted into formula (13), so that the bit depth of the processed motion vector of the motion compensation unit is equal to the second motion vector bit depth.

It should be noted that the second motion vector resolution may be the motion vector resolution of the storage unit. The resolution of the CPMVP may be the same as the motion vector resolution of the storage unit. The second motion vector bit depth may be motion vector bit depth of the storage unit. The bit depth of the CPMVP may be the same as the bit depth of the storage unit.

S906. Store the processed motion vector of the motion compensation unit.

It should be noted that a sequence of steps of the inter prediction method provided in this embodiment of this application may be appropriately adjusted, and steps may also be correspondingly increased or decreased based on a situation. For example, S904 may be interchanged with S905 and S906 in terms of sequence, that is, the motion vector resolution of the motion compensation unit may be first processed to meet the preset second motion vector resolution, and/or the motion vector bit depth of the motion compensation unit is processed to meet the preset second motion vector bit depth, the processed motion vector of the motion compensation unit is stored, and then the reconstructed block of the current affine coding block is obtained based on the motion vector of each motion compensation unit. Any method that can be readily figured out by a person skilled in the art within the technical scope disclosed in this application shall fall within the protection scope of this application. Therefore, details are not described again.

Embodiment 1 of this application provides a resolution change process in the affine AMVP mode. By improving the control point motion vector resolution and bit depth and performing motion compensation, inter prediction accuracy of a coding block using the affine motion model can be effectively improved.

Figure 10:
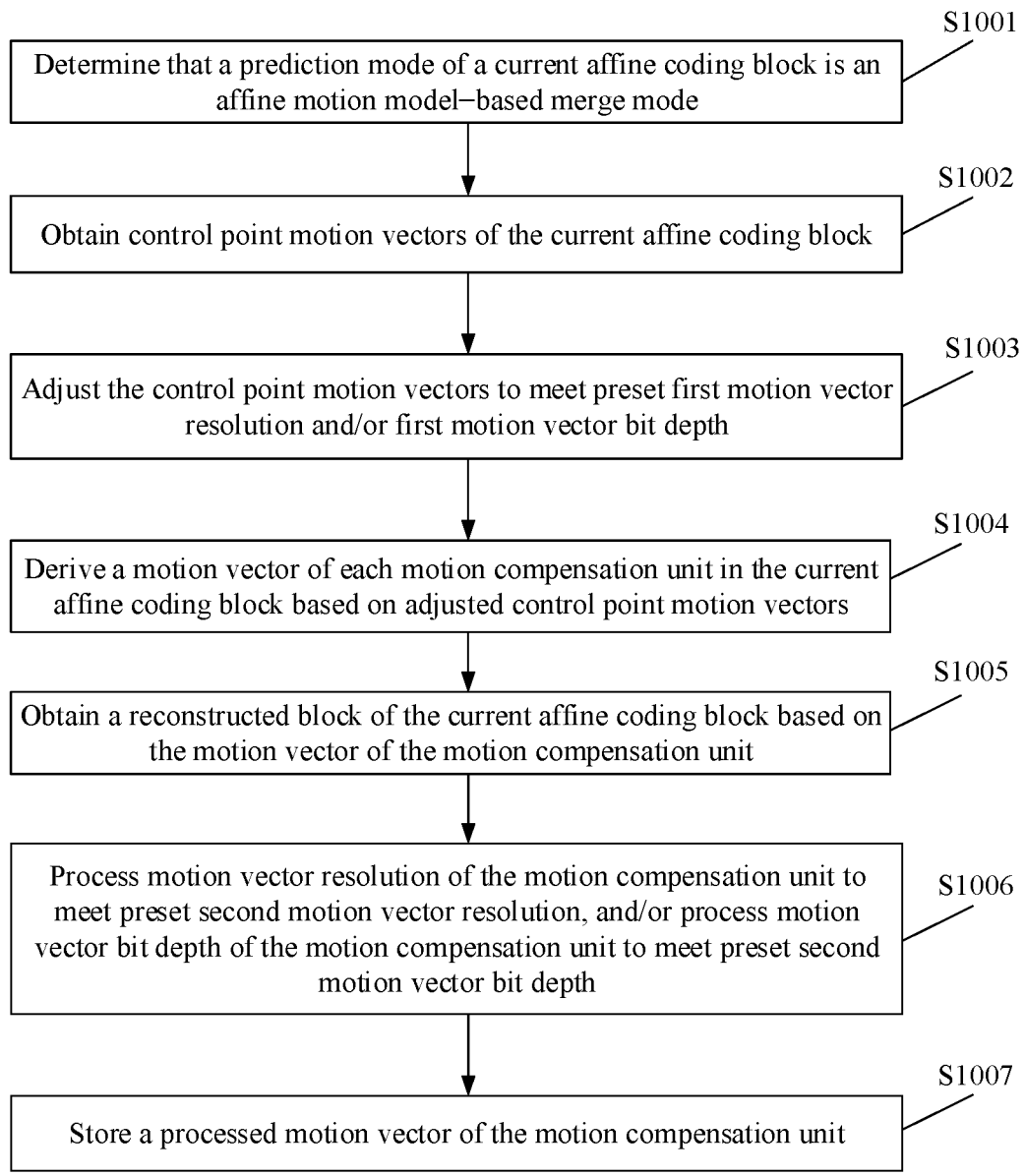
FIG. 10 is a flowchart of another inter prediction method according to an embodiment of this application.

FIG. 10 is a flowchart of an inter prediction method according to an embodiment of this application. It is assumed that a to-be-processed picture block is a current affine coding block. As shown in FIG. 10, the method may include the following steps.

S1001. Determine that a prediction mode of the current affine coding block is an affine motion model-based merge mode.

A method for determining an inter prediction mode of the current affine coding block may be obtained by parsing a syntax element. A specific determining method is not specifically limited in this application. If it is determined that the inter prediction mode of the current affine coding block is the affine motion model-based merge mode, the following steps are performed.

S1002. Obtain control point motion vectors of the current affine coding block.

For a method for obtaining control point motion information of the current affine coding block, refer to the descriptions of obtaining the control point motion information of the current affine coding block in the foregoing "affine merge mode (Affine merge mode)". Details are not described herein.

S1003. Adjust the control point motion vectors to meet preset first motion vector resolution and/or first motion vector bit depth.

The control point motion vectors may be obtained by using an inherited motion vector prediction method or a constructed motion vector prediction method. Therefore, control point motion vector resolution and bit depth of the control point motion vector may be obtained based on an adjacent affine unit of the current affine coding block. Motion vector resolution and bit depth of an adjacent block may be obtained by reading motion information of a storage unit. To save a storage space, the motion information of the storage unit is stored with low resolution. For example, the motion vector resolution of the storage unit is ¼ pixel accuracy, and the motion vector bit depth of the storage unit is 16 bits. The control point motion vector resolution is ¼ pixel accuracy, and the bit depth of the control point motion vector is 16 bits.

If prediction is still performed by using a low-resolution CPMV, inter prediction accuracy of the current affine coding block is relatively low. Therefore, the inter prediction accuracy of the current affine coding block may be improved by improving the resolution of the CPMV. The following describes in detail how to improve the resolution of the CPMV.

The control point motion vector resolution is compared with the preset first motion vector resolution. When the control point motion vector resolution is not equal to the first motion vector resolution, the control point motion vectors may be adjusted based on the control point motion vector and a first shift value, to obtain adjusted control point motion vectors, so that the adjusted control point motion vectors meet the first motion vector resolution.

Manner 1: The adjusted control point motion vectors may be obtained according to the following formula (17).

$$CPMV'=CPMV<<mvrShift1 \qquad (17)$$

where CPMV represents the control point motion vector, CPMV' represents the adjusted control point motion vector, and mvrShift1 represents the first shift value.

It should be noted that the first shift value may be determined based on the first motion vector resolution and the resolution of the CPMV. For example, the first motion vector resolution is $1/2^m$, the resolution of the CPMV is $1/2^n$, and the first shift value may be a difference obtained by subtracting n from m.

In a first feasible implementation, when the first motion vector resolution is 1/16 (½⁴) pixel accuracy, and the control point motion vector resolution is 1/16 pixel accuracy, the first shift value is equal to 0; when the first motion vector resolution is 1/16 pixel accuracy, and the control point motion vector resolution is ¼ (½²) pixel accuracy, the first shift value is equal to 2; and when the first motion vector resolution is 1/16 pixel accuracy, and the control point motion vector resolution is integral pixel accuracy (½⁰), the first shift value is equal to 4.

It should be understood that when the first shift value is equal to 0, in an embodiment, no shifting is performed.

For example, when the first motion vector resolution is 1/16 pixel accuracy, an adjusted control point motion vector of the current affine coding block may have the following values.

If the control point motion vector resolution is 1/16 pixel accuracy, a first shift value may be 0, and the adjusted control point motion vector of the current affine coding block is CPMV'=CPMV. It may be understood that the control point motion vector of the current affine coding block may not need to be adjusted.

If the control point motion vector resolution is ¼ pixel accuracy, the first shift value may be 2, and the adjusted control point motion vector of the current affine coding block is CPMV'=CPMV<<2.

If the control point motion vector resolution is integral pixel accuracy, the first shift value may be 4, and the adjusted control point motion vector of the current affine coding block is CPMV'=CPMV<<4.

In a second feasible implementation, when the first motion vector resolution is 1/32 (½⁵) pixel accuracy, and the control point motion vector resolution is 1/16 (½⁴) pixel accuracy, the first shift value is equal to 1; when the first motion vector resolution is 1/32 pixel accuracy, and the control point motion vector resolution is ¼ (½²) pixel accuracy, the first shift value is equal to 3; and when the first motion vector resolution is 1/32 pixel accuracy, and the control point motion vector resolution is integral pixel accuracy (½⁰), the first shift value is equal to 5.

For example, when the first motion vector resolution is 1/32 pixel accuracy, an adjusted control point motion vector of the current affine coding block may have the following values.

If the control point motion vector resolution is 1/16 pixel accuracy, the first shift value may be 1, and the adjusted control point motion vector of the current affine coding block is CPMV'=CPMV<<1. It may be understood that the control point motion vector of the current affine coding block may not need to be adjusted.

If the control point motion vector resolution is ¼ pixel accuracy, the first shift value may be 3, and the adjusted control point motion vector of the current affine coding block is CPMV'=CPMV<<3.

If the control point motion vector resolution is integral pixel accuracy, the first shift value may be 5, and the adjusted control point motion vector of the current affine coding block is CPMV'=CPMV<<5.

In a third feasible implementation, when the first motion vector resolution is 1/64 (½⁶) pixel accuracy, and the control point motion vector resolution is 1/16 (½⁴) pixel accuracy, the first shift value is equal to 2; when the first motion vector resolution is 1/64 pixel accuracy, and the control point motion vector resolution is ¼ (½²) pixel accuracy, the first shift value is equal to 4; and when the first motion vector resolution is 1/64 pixel accuracy, and the control point motion vector resolution is integral pixel accuracy (1/2⁰), the first shift value is equal to 6.

For example, when the first motion vector resolution is 1/64 pixel accuracy, an adjusted control point motion vector of the current affine coding block may have the following values.

If the control point motion vector resolution is 1/16 pixel accuracy, the first shift value may be 2, and the adjusted control point motion vector of the current affine coding block is CPMV'=CPMV<<2. It may be understood that the control point motion vector of the current affine coding block may not need to be adjusted.

If the control point motion vector resolution is 1/4 pixel accuracy, the first shift value may be 4, and the adjusted control point motion vector of the current affine coding block is CPMV'=CPMV<<4.

If the control point motion vector resolution is integral pixel accuracy, the first shift value may be 6, and the adjusted control point motion vector of the current affine coding block is CPMV'=CPMV<<6.

Manner 2: If the control point motion vectors are obtained by using an inherited motion vector prediction method, that is, a prediction mode of a processed adjacent picture block of the to-be-processed picture block is an affine motion model-based prediction mode, when the control point motion vectors of the to-be-processed picture block are derived based on control point motion vectors of the processed adjacent picture block, the adjusted control point motion vectors are obtained according to the following formulas:

$vx0=K1>=0?(K1+\text{offset})>>\text{mvShift}:-((-K1+\text{offset})>>\text{mvShift})$, $vy0=K2>=0?(K2+\text{offset})>>\text{mvShift}:-((-K2+\text{offset})>>\text{mvShift})$, $vx1=K3>=0?(K3+\text{offset})>>\text{mvShift}:-((-K3+\text{offset})>>\text{mvShift})$, $vy1=K4>=0?(K4+\text{offset})>>\text{mvShift}:-((-K4+\text{offset})>>\text{mvShift})$, $vx2=K5>=0?(K5+\text{offset})>>\text{mvShift}:-((-K5+\text{offset})>>\text{mvShift})$, $vy2=K6>=0?(K6+\text{offset})>>\text{mvShift}:-((-K6+\text{offset})>>\text{mvShift})$, where $K1=\text{mvScaleHor}+\text{dHorX}*(x0-x4-M/2)+\text{dHorY}*(y0-y4-N/2)$, $K2=\text{mvScaleVer}+\text{dVerX}*(x0-x4-M/2)+\text{dVerY}*(y0-y4-N/2)$, $K3=\text{mvScaleHor}+\text{dHorX}*(x1-x4-M/2)+\text{dHorY}*(y1-y4-N/2)$, $K4=\text{mvScaleVer}+\text{dVerX}*(x1-x4-M/2)+\text{dVerY}*(y1-y4-N/2)$, $K5=\text{mvScaleHor}+\text{dHorX}*(x2-x4-M/2)+\text{dHorY}*(y2-y4-N/2)$, $K6=\text{mvScaleVer}+\text{dVerX}*(x2-x4-M/2)+\text{dVerY}*(y2-y4-N/2)$, $\text{offset}=1<<(\text{mvShift}-1)$, $\text{mvScaleHor}=vx4<<7$, $\text{mvScaleVer}=vy4<<7$, $\text{dHorX}=(vx5-vx4)<<(7-\log 2(P))$, $\text{dVerX}=(vy5-vy4)<<(7-\log 2(Q))$, when the affine motion model of the processed adjacent picture block is a 6-parameter model, dHorY=(vx6-vx4)<<(7-log 2(P)), and dVerY=(vy6-vy4)<<(7-log 2(Q));

when the affine motion model of the processed adjacent picture block is a 4-parameter model, dHorY=-dVerX, and dVerY=dHorX;

Log 2( ) represents a function of taking a logarithm of 2, << represents left shift, >> represents right shift, P is a width of the processed adjacent picture block, and Q is a height of the processed adjacent picture block;

(vx0, vy0), (vx1, vy1), and (vx2, vy2) respectively represent horizontal components and vertical components of motion vectors of three control points of the to-be-processed picture block; to be specific, (vx0, vy0) is a horizontal component and a vertical component of a motion vector of a first control point of the to-be-processed picture block, (vx1, vy1) is a horizontal component and a vertical component of a motion vector of a second control point of the to-be-processed picture block, and (vx2, vy2) is a horizontal component and a vertical component of a motion vector of a third control point of the to-be-processed picture block;

(vx4, vy4), (vx5, vy5), and (vx6, vy6) respectively represent horizontal components and vertical components of motion vectors of three control points of the processed adjacent picture block; to be specific, (vx4, vy4) is a horizontal component and a vertical component of a motion vector of a first control point of the processed adjacent picture block, (vx5, vy5) is a horizontal component and a vertical component of a motion vector of a second control point of the processed adjacent picture block, and (vx6, vy6) is a horizontal component and a vertical component of a motion vector of a third control point of the processed adjacent picture block; and mvShift is determined based on control point motion vector resolution of the processed adjacent picture block.

It should be noted that the adjacent picture block may be a spatially adjacent affine coding block or a temporally adjacent affine coding block.

When resolution of the CPMV stored in the adjacent affine block is 1/4 pixel accuracy, the resolution of the CPMV of the to-be-processed picture block is obtained as 1/16 pixel accuracy by setting mvShift to 5. When the resolution of the CPMV stored in the adjacent affine block is 1/4 pixel accuracy, the resolution of the CPMV of the to-be-processed picture block may be obtained as 1/32 pixel accuracy by setting mvShift to 6. When the resolution of the CPMV stored in the adjacent affine block is 1/4 pixel accuracy, the resolution of the CPMV of the to-be-processed picture block may be obtained as 1/4 pixel accuracy by setting mvShift to 7. The resolution of the CPMV of the adjacent affine block may refer to stored motion vector resolution of a storage unit.

It should be noted that in an embodiment, the control point motion vectors may be adjusted in manner 2, that is, mvShift is set, so that the control point motion vectors meet the preset first motion vector resolution. If the control point motion vectors still cannot be enabled to meet the preset first motion vector resolution by using manner 2, the control point motion vectors may be further adjusted in manner 1, so that the control point motion vectors meet the preset first motion vector resolution. Certainly, the control point motion vectors may be directly adjusted in manner 1, so that the control point motion vectors meet the preset first motion vector resolution. This is not limited in this embodiment of this application.

Further, the adjusted control point motion vectors may be clipped, so that bit depth of the adjusted control point motion vectors is equal to first motion vector bit depth.

For example, the bit depth of the adjusted control point motion vectors is compared with the first motion vector bit depth. When the bit depth of the adjusted control point motion vectors is greater than the first motion vector bit depth, the adjusted control point motion vectors are clipped, so that the bit depth of the adjusted control point motion vectors is equal to the first motion vector bit depth. For details, refer to the description of formula (13), and details are not described.

For example, if the first motion vector resolution is 1/16 pixel accuracy, the first motion vector bit depth is 18 bits, and a range that can be represented by the MV is $(-2^{13}, 2^{13}-1)$, to enable a value range of the adjusted control point motion vectors to be $(-2^{13}, 2^{13}-1)$, the bit depth of the adjusted control point motion vectors may be clipped, that is, 18 bits are substituted into formula (13), so that the bit depth of the adjusted control point motion vectors is equal to the first motion vector bit depth.

S1004. Derive a motion vector of each motion compensation unit in the current affine coding block based on the adjusted control point motion vectors.

Motion information of each motion compensation unit in the current affine coding block is determined based on adjusted control point motion information and by using an affine transform model.

For each motion compensation unit of the current affine coding block, motion information of a pixel at a preset position in the motion compensation unit may be used to indicate motion information of all pixels in the motion compensation unit. It is assumed that a size of the motion compensation unit is M×N, the pixel at the preset position may be a pixel at a center point (M/2, N/2), the top-left sample (0, 0), the top-right sample (M−1, 0), or another position of the motion compensation unit. The following uses the center point of the motion compensation unit as an example for description.

The size M×N of the motion compensation unit is a size determined by using a same rule and agreed upon by an encoder and a decoder, and may be fixed as 4×4, 8×8, or the like, or may be determined based on control point motion vector differences, motion vector resolution, and a distance between control points.

It should be noted that the size of the motion compensation unit of the current affine coding block may be determined by using another method, and details are not described in this application.

Coordinates of the center point of the motion compensation unit relative to the top-left sample of the current affine coding block may be calculated according to formula (14).

$$\begin{cases} x_{(i,j)} = M \times i + \frac{M}{2}, i = 0, 1 \ldots \\ y_{(i,j)} = N \times j + \frac{N}{2}, j = 0, 1 \ldots \end{cases} \quad (14)$$

where i is an ith motion compensation unit (from left to right) in a horizontal direction, j is a jth motion compensation unit (from top to bottom) in a vertical direction, $(x_{(i,j)}, y_{(i,j)})$ represents coordinates of a center point of an (i, j)th motion compensation unit relative to the top-left sample of the current affine coding block. Then, $(x_{(i,j)}, y_{(i,j)})$ is substituted into formula (15) to obtain motion information of a center point of each motion compensation unit, and the motion information is used as motion information $(vx_{(i,j)}, vy_{(i,j)})$ of all pixels in the motion compensation unit.

$$\begin{cases} vx = \frac{vx_1 - vx_0}{W}x + \frac{vx_2 - vy_0}{H}y + vx_0 \\ vy = \frac{vy_1 - vy_0}{W}x + \frac{vy_2 - vx_0}{H}y + vy_0 \end{cases} \quad (15)$$

If the adjusted control point motion vector resolution is 1/16 pixel accuracy, and the bit depth of the adjusted control point motion vector is 18 bits, the motion vector resolution of the motion compensation unit is 1/16 pixel accuracy, and the motion vector bit depth of the motion compensation unit is 18 bits.

A specific implementation operation may be performed based on the following procedure, where Log 2 is a function of taking a logarithm of 2, "<<" indicates left shift, and ">>" indicates right shift:

log 2W=Log 2(W)

log 2H=Log 2(H)

mvScaleHor=vx0<<7 mvScaleVer=vy0<<7 dHorX=(vx1−vx0)<<(7−log 2W)

dVerX=(vy1−vy0)<<(7−log 2W)

If a current affine decoding block is a 6-parameter affine decoding block, let:

dHorY=(vx2−vx0)<<(7−log 2H)

dVerY=(vy2−vy0)<<(7−log 2H)

If a current affine decoding block is a 4-parameter affine decoding block, let:

dHorY=−dVerX dVerY=dHorX

Then, a motion compensation motion vector may be calculated based on the following formulas:

vx=Round(mvScaleHor+dHorX*x+dHorY*y)

vy=Round(mvScaleVer+dVerX*x+dVerY*y)

Operations of the Round function are as follows: For any input K and mvShift, output K is obtained in the following manner:

offset=1<<(mvShift−1)

K=K>=0?(K+offset)>>mvShift:−((−K+offset)>>mv-Shift)

An obtained motion vector (vx, vy) is then clipped so that the motion vector does not exceed a dynamic range of 18 bits.

For example, when the adjusted control point motion vector resolution is 1/16 pixel accuracy, mvShift may be set to 7, to obtain that the motion vector resolution of the motion compensation unit is 1/16 pixel accuracy. When the adjusted control point motion vector resolution is 1/16 pixel accuracy, mvShift may be set to 9, to obtain that the motion vector resolution of the motion compensation unit is ¼ pixel accuracy.

S1005. Obtain a reconstructed block of the current affine coding block based on the motion vector of each motion compensation unit.

For example, motion compensation is performed based on the motion vector of each motion compensation unit, to obtain a prediction block of the current affine coding block. For each motion compensation unit of the current affine coding block, motion compensation prediction is performed by using the motion information obtained in S1003, to obtain a predictor of each motion compensation unit. Then, the reconstructed block of the current affine coding block is obtained based on the prediction block and the motion vector of each motion compensation unit.

Optionally, the prediction block and a residual block of the current affine coding block are added to obtain the reconstructed block of the current affine coding block; or the prediction block is updated based on the motion vector of each motion compensation unit, and an updated prediction block and a residual block of the current affine coding block are added to obtain the reconstructed block of the current affine coding block; or the prediction block and a residual block of the current affine coding block are added to obtain the reconstructed block of the current affine coding block, and filtering processing is performed on the reconstructed block based on the motion vector of each motion compensation unit; or the prediction block and a residual block of the current affine coding block are added to obtain the reconstructed block of the current affine coding block, and the motion vector of each motion compensation unit and the reconstructed block are used as prediction information of a subsequent current affine coding block.

If it is obtained based on S1004 that the motion vector resolution of the motion compensation unit is motion vector resolution of the storage unit, for example, ¼ pixel accuracy, S1006 may not need to be performed.

If it is obtained based on S1004 that the motion vector resolution of the motion compensation unit is not the motion vector resolution of the storage unit, for example, ¼ pixel accuracy, S1006 needs to be performed.

S1006. Process motion vector resolution of the motion compensation unit to meet preset second motion vector resolution, and/or process motion vector bit depth of the motion compensation unit to meet preset second motion vector bit depth.

In a subsequent decoding procedure, for example, a de-blocking filter, overlapping block motion compensation, and motion information derivation of a subsequent coding block, the motion information of the current affine coding block needs to be used. Therefore, the motion information of the motion compensation unit obtained in S1004 needs to be stored.

Generally, a size of a motion information storage unit is 4×4, and motion information of each 4×4 storage unit in the motion compensation unit is set as motion information of the motion compensation unit.

It should be noted that if the motion vector resolution of the motion compensation unit is different from the motion vector resolution of the storage unit, the motion vector of the motion compensation unit needs to be quantized as the motion vector resolution of the storage unit for storage. For example:

The following formula (18) may be used to obtain a processed motion vector of the motion compensation unit.

$$MCUMV'=(MCUMV>>mvrShift2) \quad (18)$$

where MCUMV' represents the processed motion vector of the motion compensation unit, MCUMV represents a motion vector of the motion compensation unit before processing, and mvrShift2 represents a second shift value.

It should be noted that the second shift value may be determined based on the second motion vector resolution and resolution of the MCUMV. For example, the second motion vector resolution is $1/2^k$, the resolution of the MCUMV is $1/2^n$, and the second shift value may be a difference obtained after n minus k.

In an embodiment, when the second motion vector resolution is ¼ ($1/2^2$) pixel accuracy, and the resolution of the MCUMV is 1/16 ($1/2^4$) pixel accuracy, the second shift value is equal to 2, and the processed motion vector of the motion compensation unit is MCUMV'=(MCUMV>>2).

In an embodiment, when the second motion vector resolution is ¼ pixel accuracy, and the resolution of the MCUMV is 1/32 ($1/2^5$) pixel accuracy, the second shift value is equal to 3, and the processed motion vector of the motion compensation unit is MCUMV'=(MCUMV>>3).

In an embodiment, when the second motion vector resolution is ¼ pixel accuracy, and the resolution of the MCUMV is 1/64 ($1/2^6$) pixel accuracy, the second shift value is equal to 4, and the processed motion vector of the motion compensation unit is MCUMV'=(MCUMV>>4).

Particularly, when the second motion vector resolution is ¼ pixel accuracy, and the resolution of the MCUMV is ¼ pixel accuracy, the second shift value is equal to 0, and the processed motion vector of the motion compensation unit is MCUMV'=MCUMV. It may be understood that it is unnecessary to perform pixel accuracy reduction processing on the motion vector of the motion compensation unit.

Further, bit depth of the processed motion vector of the motion compensation unit may be clipped, so that the bit depth of the processed motion vector of the motion compensation unit is equal to the second motion vector bit depth.

For example, when the bit depth of the processed motion vector of the motion compensation unit is greater than the second motion vector bit depth, the processed motion vector of the motion compensation unit is clipped, so that the bit depth of the processed motion vector of the motion compensation unit is equal to the second motion vector bit depth. For details, refer to the description of formula (13), and details are not described.

For example, if the second motion vector resolution is ¼ pixel accuracy, the second motion vector bit depth is 16 bits, and a range that can be represented by the MV is $(-2^{11}, 2^{11}-1)$, to enable the value range of the processed motion vector of the motion compensation unit to be $(-2^{11}, 2^{11}-1)$, the bit depth of the processed motion vector of the motion compensation unit may be clipped, that is, 16 bits are substituted into formula (13), so that the bit depth of the processed motion vector of the motion compensation unit is equal to the second motion vector bit depth.

S1007. Store the processed motion vector of the motion compensation unit.

It should be noted that a sequence of steps of the inter prediction method provided in this embodiment of this application may be appropriately adjusted, and steps may also be correspondingly increased or decreased based on a situation. For example, S1005 may be interchanged with S1006 and S1007 in terms of sequence, that is, the motion vector resolution of the motion compensation unit may be first processed to meet the preset second motion vector resolution, and/or the motion vector bit depth of the motion compensation unit is processed to meet the preset second motion vector bit depth, the processed motion vector of the motion compensation unit is stored, and then the reconstructed block of the current affine coding block is obtained based on the motion vector of each motion compensation unit. Any method that can be readily figured out by a person skilled in the art within the technical scope disclosed in this application shall fall within the protection scope of this application. Therefore, details are not described again.

Embodiment 1 of this application provides a resolution change process in the affine AMVP mode. By improving the control point motion vector resolution and bit depth and performing motion compensation, inter prediction accuracy of a coding block using the affine motion model can be effectively improved.

An embodiment of this application provides an inter prediction apparatus. The apparatus may be a video decoder, a video encoder, or a decoder. Specifically, the inter prediction apparatus is configured to perform steps performed by a decoding apparatus in the foregoing inter prediction method. The inter prediction apparatus provided in this embodiment of this application may include a module corresponding to a corresponding step.

In this embodiment of this application, the inter prediction apparatus may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. In this embodiment of this application, module division is an example, and is merely a logical function division. In actual implementation, another division manner may be used.

Figure 11:
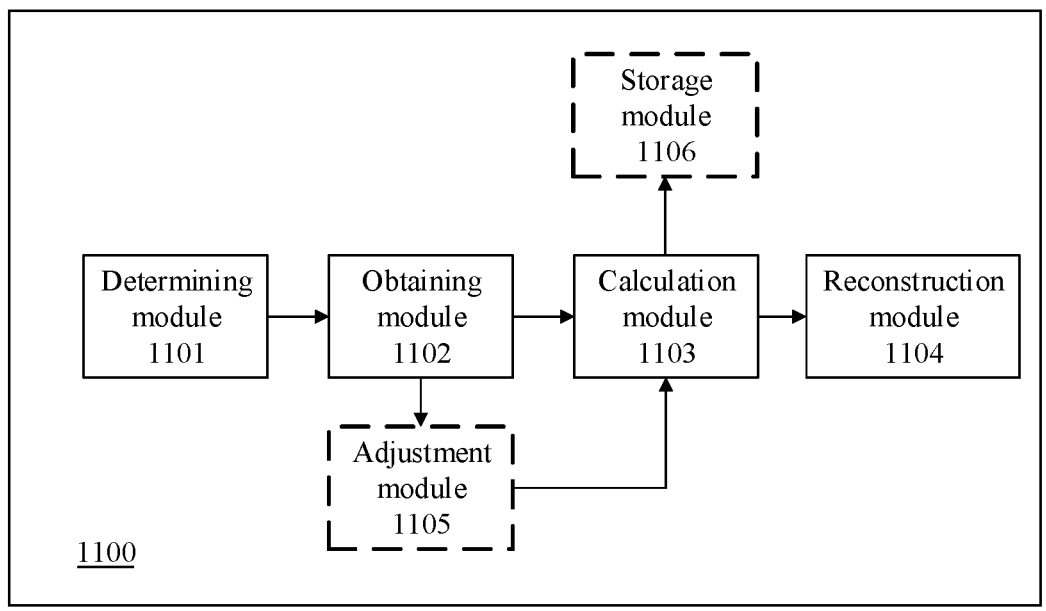
FIG. 11 is a schematic structural diagram of an inter prediction apparatus according to an embodiment of this application.

When each functional module corresponding to each function is obtained by division, FIG. 11 shows a possible schematic structural diagram of the inter prediction apparatus mentioned in the foregoing embodiment. As shown in FIG. 11, an inter prediction apparatus 1100 may include a determining module 1101, an obtaining module 1102, a calculation module 1103, and a reconstruction module 1104. Specifically, functions of each module are as follows:

The determining module 1101 is configured to determine that a prediction mode of a to-be-processed picture block is an affine motion model-based AMVP mode.

The obtaining module 1102 is configured to obtain control point motion vectors of the to-be-processed picture block, where the control point motion vectors meet preset first motion vector resolution and/or first motion vector bit depth.

The calculation module 1103 is configured to derive a motion vector of each motion compensation unit in the to-be-processed picture block based on the control point motion vectors.

The reconstruction module 1104 is configured to obtain a reconstructed block of the to-be-processed picture block based on the motion vector of each motion compensation unit.

The determining module 1101 is configured to support the inter prediction apparatus 1100 in performing S901, S1001, or the like in the foregoing embodiments, and/or is used in other processes of the technologies described in this specification. The obtaining module 1102 is configured to support the inter prediction apparatus 1100 in performing S902, S1002, or the like in the foregoing embodiments, and/or is used in other processes of the technologies described in this specification. The calculation module 1103 is configured to support the inter prediction apparatus 1100 in performing S903 and S905 or S1004, or the like in the foregoing embodiments, and/or is used in other processes of the technologies described in this specification. The reconstruction module 1104 is configured to support the inter prediction apparatus 1100 in performing S904, S1005, or the like in the foregoing embodiments, and/or is used in other processes of the technologies described in this specification.

Optionally, the inter prediction apparatus 1100 may further include an adjustment module 1105. The adjustment module 1105 is configured to adjust the control point motion vectors to meet the preset first motion vector resolution and/or first motion vector bit depth. The adjustment module 1105 is configured to support the inter prediction apparatus 1100 in performing S1003, S1006, and the like in the foregoing embodiments, and/or is used in other processes of the technologies described in this specification.

Further, as shown in FIG. 11, the inter prediction apparatus 1100 may further include a storage module 1106, configured to store a processed motion vector of the motion compensation unit. The storage module 1106 is configured to support the inter prediction apparatus 1100 in performing S906, S1007, and the like in the foregoing embodiments, and/or is used in other processes of the technologies described in this specification.

All content related to the steps in the foregoing method embodiments may be cited in function description of corresponding functional modules, and details are not described herein again.

Although specific aspects of this application have been described with respect to a video encoder and a video decoder, it should be understood that the technologies of this application may be applied by using many other video encoding and/or encoding units, processors, processing units, hardware-based encoding units such as encoders/decoders (CODEC), and the like. In addition, it should be understood that steps shown and described in FIG. 9 or 10 are provided only as an embodiment. That is, the steps shown in the feasible implementation of FIG. 11 do not necessarily need to be performed in the order shown in FIG. 11, and fewer, additional, or alternative steps may be performed.

Figure 12:
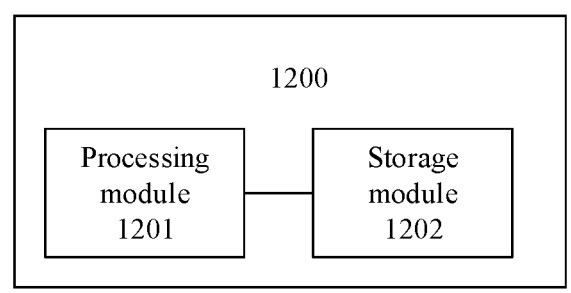
FIG. 12 is a schematic structural diagram of another inter prediction apparatus according to an embodiment of this application.

When an integrated unit is used, FIG. 12 is a schematic structural block diagram of an inter prediction apparatus 1200 according to an embodiment of this application. Specifically, the inter prediction apparatus 1200 includes a processing module 1201 and a storage module 1202 coupled to the processing module. The processing module 1201 is configured to execute the embodiment shown in FIG. 11 and various feasible implementations.

The processing module 1201 may be a processor or a controller, for example, may be a central processing unit (CPU), a general purpose processor, a digital signal processor (DSP), or an ASIC, an FPGA or another programmable logic device, a transistor logic device, a hardware component, or any combination thereof. The processor may implement or execute various example logical blocks, modules, and circuits described with reference to content disclosed in this application. The processor may be a combination of processors implementing a computing function, for example, a combination of one or more microprocessors, or a combination of the DSP and a microprocessor. The storage module 1202 may be a memory.

All content related to the scenarios in the foregoing method embodiments may be cited in function description of corresponding functional modules, and details are not described herein again.

Both the inter prediction apparatus 1100 and the inter prediction apparatus 1200 may perform the foregoing inter prediction method shown in FIG. 9 or FIG. 10. The inter prediction apparatus 1100 and the inter prediction apparatus 1200 may be specifically video decoding apparatuses or other devices that have a video encoding and decoding function. The inter prediction apparatus 1100 and the inter prediction apparatus 1200 may be configured to perform picture prediction in a decoding process.

An embodiment of this application provides an inter prediction apparatus. The inter prediction apparatus may be a video decoder, a video encoder, or a decoder. Specifically, the inter prediction apparatus is configured to perform the steps performed by the inter prediction apparatus in the foregoing inter prediction method. The inter prediction apparatus provided in this embodiment of this application may include a module corresponding to a corresponding step.

In this embodiment of this application, the inter prediction apparatus may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. In this embodiment of this application, module division is an example, and is merely a logical function division. In actual implementation, another division manner may be used.

This application further provides a terminal, and the terminal includes one or more processors, a memory, and a communication interface. The memory and the communication interface are coupled to the one or more processors; and the memory is configured to store computer program code. The computer program code includes an instruction. When the one or more processors execute the instruction, the terminal performs the inter prediction method in the embodiment of this application.

The terminal herein may be a video display device, a smartphone, a portable computer, or another device that can process or play a video.

This application further provides a video decoder, including a non-volatile storage medium and a central processing unit, where the non-volatile storage medium stores an executable program, and the central processing unit is connected to the non-volatile storage medium, and executes the executable program to implement the inter prediction method in the embodiment of this application.

This application further provides a decoder, where the decoder includes the inter prediction apparatus in the embodiment of this application.

Another embodiment of this application further provides a computer-readable storage medium. The computer-readable storage medium includes one or more pieces of program code. The one or more pieces of programs include an instruction. When a processor in a terminal executes the program code, the terminal performs the inter prediction method shown in FIG. 9 or FIG. 10.

In another embodiment of this application, a computer program product is further provided, where the computer program product includes computer executable instructions, and the computer executable instructions are stored in a computer-readable storage medium. At least one processor of a terminal may read the computer executable instructions from the computer-readable storage medium. The at least one processor executes the computer executable instructions, so that the terminal implements the inter prediction method shown in FIG. 9 or FIG. 10.

All or some of the foregoing embodiments may be implemented by means of software, hardware, firmware, or any combination thereof. When a software program is used to implement the embodiments, all or some of the embodiments may be implemented in a form of a computer program product. The computer program product includes one or more computer instructions. When the computer program instructions are loaded and executed on the computer, all or some of the procedures or functions according to the embodiments of this application are generated.

The computer may be a general purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

In addition, it should be understood that, depending on an embodiment, specific actions or events of any one of the methods described herein may be performed in different sequences, and may be added, combined, or omitted together (for example, not all described actions or events are necessary for practicing the method). In addition, in a specific feasible implementation, actions or events may be performed simultaneously, not sequentially, by, for example, multithread processing, interrupt processing, or a plurality of processors. In addition, although specific aspects of this application are described for clear purposes as being performed by a single module or unit, it should be understood that the technologies of this application may be performed by using a combination of units or modules associated with a video decoder.

In one or more embodiments, the described functions may be implemented by hardware, software, firmware, or any combination thereof. If implemented in software, the functions may be stored on or transmitted over a computer-readable medium as one or more instructions or code, and performed by a hardware-based processing unit. The computer-readable medium may include a computer-readable storage medium or a communication medium, where the computer-readable storage medium is corresponding to a tangible medium such as a data storage medium, and the communication medium includes any medium that facilitates transfer of a computer program, for example, from one place to another place according to a communication protocol.

In this manner, the computer-readable medium may correspond to, for example, (1) a non-transitory tangible computer-readable storage medium, or (2) a communication medium such as a signal or carrier. The data storage medium may be any available medium accessible by one or more computers or one or more processors to retrieve instructions, code, and/or data structures for implementing the techniques described in this application. A computer program product may include a computer-readable medium.

By way of an embodiment and not limitation, the computer-readable storage medium may include a RAM, a ROM, an EEPROM, a CD-ROM or another optical disk storage device, a magnetic disk storage device or another magnetic storage device, a flash memory, or desired code that may be configured to store in the form of instructions or data structures and any other medium accessible by a computer. Similarly, any connection may appropriately be referred to as a computer-readable medium. For example, if instructions are transmitted from a website, server, or other remote source using a coaxial cable, optical fiber, twisted pair, digital subscriber line (DSL), or wireless technology such as infrared, radio, and microwave, or wireless technologies such as infrared, radio and microwave are included in the definition of a medium.

However, it should be understood that the computer-readable storage medium and the data storage medium do not contain connections, carriers, signals, or other transient media, but instead are directed to non-transitory tangible storage media. As used herein, disks and optical discs include compact discs (CDs), laser discs, optical discs, digital versatile discs (DVDs), floppy disks, and Blu-ray discs, where disks typically reproduce data magnetically, and optical discs reproduce data optically by lasers. Combinations of the above should also be included within the scope of computer-readable media.

The instructions may be executed by one or more processors such as one or more digital signal processors (DSPs), general purpose microprocessors, application-specific integrated circuits (ASICs), field-programmable gate arrays (FPGAs), or other equivalent integrated or discrete logic circuits. Therefore, the term "processor" used in this specification may refer to the foregoing structure, or any other structure that may be applied to implementation of the technologies described in this specification. In addition, in some aspects, the functionalities described in this specification may be provided in a dedicated hardware and/or software module configured for encoding and decoding, or may be incorporated into a combined codec. Similarly, the technologies may be fully implemented in one or more circuits or logic elements.

The technologies in this application may be implemented in a wide variety of apparatuses or devices, including a wireless mobile phone, an integrated circuit (IC), or a set of ICs (for example, a chipset). Various components, modules, or units are described in this application to emphasize functional aspects of an apparatus configured to perform the disclosed technologies, but do not necessarily need to be implemented by using different hardware units. More specifically, as previously described, various units may be combined in codec hardware units or by interoperable hardware units (contains one or more processors as previously described) are provided in combination with a collection of suitable software and/or firmware.

The foregoing descriptions are merely example specific embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A video codec device, comprising:
a memory containing instructions; and
a processor in communication with the memory and, upon execution of the instructions, is configured to perform the operations of:
determining that a prediction mode of a to-be-processed picture block is not an affine motion model-based merge mode;
obtaining control point motion vectors of the to-be-processed picture block, wherein the control point motion vectors have a preset first motion vector resolution and/or a first motion vector bit depth, wherein the obtaining control point motion vectors of the to-be-processed picture block comprises:
obtaining control point motion vector differences (CPMVDs) and the control point motion vector predictors (CPMVPs); and
based on a resolution of the CPMVDs being not equal to the first motion vector resolution, obtaining the control point motion vectors of the to-be-processed picture block based on the CPMVDs and a first shift value; or
based on a resolution of the CPMVPs being not equal to the first motion vector resolution, obtaining the control point motion vectors of the to-be-processed picture block based on the CPMVPs and a second shift value;
deriving a motion vector of each motion compensation unit in the to-be-processed picture block based on the control point motion vectors of the to-be-processed picture block; and
obtaining a reconstructed block of the to-be-processed picture block based on the motion vector of each motion compensation unit in the to-be-processed picture block.

2. The device according to claim 1, wherein the control point motion vectors of the to-be-processed picture block are obtained according to the following formula:

CPMV=CPMVD'+CPMVP', wherein based on the resolution of the CPMVD being not equal to the first motion vector resolution, CPMVD'=CPMVD<<mvrShift1;
based on the resolution of the CPMVD being equal to the first motion vector resolution, CPMVD'=CPMVD;
based on the resolution of the CPMVP being not equal to the first motion vector resolution, CPMVP'=CPMVP<<mvrShift2;
based on the resolution of the CPMVP being equal to the first motion vector resolution, CPMVP'=CPMVP; and
CPMV represents the control point motion vector, mvrShift1 represents the first shift value, and mvrShift2 represents the second shift value.

3. The device according to claim 2, further comprising:
based on a bit depth of the control point motion vectors being greater than the first motion vector bit depth, clipping the control point motion vectors, so that the bit depth of the control point motion vectors is equal to the first motion vector bit depth.

4. The device according to claim 2, further comprising:
clipping the control point motion vectors, so that a bit depth of the control point motion vectors is equal to the first motion vector bit depth.

5. The device according to claim 1, wherein
based on the first motion vector resolution being 1/16 pixel accuracy and the resolution of the CPMVD being 1/4 pixel accuracy, the first shift value is equal to 2;

based on the first motion vector resolution being 1/16 pixel accuracy and the resolution of the CPMVD being integral pixel accuracy, the first shift value is equal to 4;

based on the first motion vector resolution being 1/16 pixel accuracy and the resolution of the CPMVP being 1/4 pixel accuracy, the second shift value is equal to 2; and based on the first motion vector resolution being 1/16 pixel accuracy and the resolution of the CPMVP being integral pixel accuracy, the second shift value is equal to 4.

6. The device according to claim 1, wherein the method further comprises:

processing a motion vector resolution of the motion compensation unit to meet a preset second motion vector resolution, and/or processing a motion vector bit depth of the motion compensation unit to meet a preset second motion vector bit depth; and storing a processed motion vector of the motion compensation unit.

7. The device according to claim 6, wherein the processed motion vector of the motion compensation unit is obtained according to the following formula:

MCUMV'=(MCUMV>>mvrShift3), wherein MCUMV' represents the processed motion vector of the motion compensation unit, MCUMV represents a motion vector of the motion compensation unit before processing, and mvrShift3 represents a third shift value.

8. The device according to claim 7, further comprising:

clipping a bit depth of the processed motion vector of the motion compensation unit, so that the bit depth of the processed motion vector of the motion compensation unit is equal to the second motion vector bit depth.

9. The device according to claim 7, further comprising:

based on a bit depth of the processed motion vector of the motion compensation unit being greater than the second motion vector bit depth, clipping the processed motion vector of the motion compensation unit, so that the bit depth of the processed motion vector of the motion compensation unit is equal to the second motion vector bit depth.

10. The device according to claim 7, wherein based on the second motion vector resolution being 1/4 pixel accuracy and resolution of the MCUMV being 1/16 pixel accuracy, the third shift value is equal to 2;

based on the second motion vector resolution being 1/4 pixel accuracy and the resolution of the MCUMV being 1/4 pixel accuracy, the third shift value is equal to 0; and based on the second motion vector resolution being 1/4 pixel accuracy and the resolution of the MCUMV being 1/32 pixel accuracy, the third shift value is equal to 3.

11. The device according to claim 1, wherein the obtaining a reconstructed block of the to-be-processed picture block based on the motion vector of each motion compensation unit comprises:

performing motion compensation based on the motion vector of each motion compensation unit, to obtain a prediction block of the to-be-processed picture block; and obtaining the reconstructed block of the to-be-processed picture block based on the prediction block and the motion vector of each motion compensation unit.

12. A video codec device, comprising:
a memory containing instructions; and
a processor in communication with the memory and, upon execution of the instructions, is configured to perform the operations of:

determining that a prediction mode of a to-be-processed picture block is an affine motion model-based merge prediction mode;

obtaining control point motion vectors of the to-be-processed picture block;

adjusting the control point motion vectors to meet a preset first motion vector resolution and/or a first motion vector bit depth, wherein the adjusting the control point motion vectors comprises:

based on a resolution of the control point motion vectors being not equal to the first motion vector resolution, obtaining the adjusted control point motion vectors based on the control point motion vectors and a first shift value;

deriving a motion vector of each motion compensation unit in the to-be-processed picture block based on adjusted control point motion vectors; and obtaining a reconstructed block of the to-be-processed picture block based on the motion vector of each motion compensation unit.

13. The device according to claim 12, wherein the adjusted control point motion vectors are obtained according to the following formula:

CPMV'=CPMV<<mvrShift1, wherein CPMV represents the control point motion vector, CPMV' represents the adjusted control point motion vector, and mvrShift1 represents the first shift value.

14. The device according to claim 12, comprising:

based on the first motion vector resolution being 1/16 pixel accuracy and the control point motion vector resolution being 1/16 pixel accuracy, the first shift value is equal to 0;

based on the first motion vector resolution being 1/16 pixel accuracy and the control point motion vector resolution being 1/4 pixel accuracy, the first shift value is equal to 2; and based on the first motion vector resolution being 1/16 pixel accuracy and the control point motion vector resolution being integral pixel accuracy, the first shift value is equal to 4.

15. The device according to claim 12, wherein a prediction mode of a processed adjacent picture block of the to-be-processed picture block is an affine motion model-based prediction mode, and when the control point motion vectors of the to-be-processed picture block are derived based on control point motion vectors of the processed adjacent picture block, the adjusted control point motion vectors are obtained according to the following formulas:

$vx0 = K1 >= 0 ? (K1+\text{offset}) >> \text{mvShift} : -((-K1+\text{offset}) >> \text{mvShift})$, $vy0 = K2 >= 0 ? (K2+\text{offset}) >> \text{mvShift} : -((-K2+\text{offset}) >> \text{mvShift})$, $vx1 = K3 >= 0 ? (K3+\text{offset}) >> \text{mvShift} : -((-K3+\text{offset}) >> \text{mvShift})$, $vy1 = K4 >= 0 ? (K4+\text{offset}) >> \text{mvShift} : -((-K4+\text{offset}) >> \text{mvShift})$, $vx2 = K5 >= 0 ? (K5+\text{offset}) >> \text{mvShift} : -((-K5+\text{offset}) >> \text{mvShift})$, $vy2 = K6 >= 0 ? (K6+\text{offset}) >> \text{mvShift} : -((-K6+\text{offset}) >> \text{mvShift})$, wherein $K1=\text{mvScaleHor}+\text{dHor}X*(x0-x4-M/2)+\text{dHor}Y*(y0-y4-N/2)$, $K2=\text{mvScaleVer}+\text{dVer}X*(x0-x4-M/2)+\text{dVer}Y*(y0-y4-N/2)$, $K3=\text{mvScaleHor}+\text{dHor}X*(x1-x4-M/2)+\text{dHor}Y*(y1-y4-N/2)$, $K4=\text{mvScaleVer}+\text{dVer}X*(x1-x4-M/2)+\text{dVer}Y*(y1-y4-N/2)$, $K5=\text{mvScaleHor}+\text{dHor}X*(x2-x4-M/2)+\text{dHor}Y*(y2-y4-N/2)$, $K6=\text{mvScaleVer}+\text{dVer}X*(x2-x4-M/2)+\text{dVer}Y*(y2-y4-N/2)$, offset=1<<(mvShift−1), mvScaleHor=vx4<<7, mvScaleVer=vy4<<7, dHorX=(vx5−vx4)<<(7−log 2(P)), dVerX=(vy5−vy4)<<(7−log 2(Q)), based on the affine motion model of the processed adjacent picture block being a 6-parameter model, dHorY=(vx6−vx4)<<(7−log 2(P)), and dVerY=(vy6−vy4)<<(7−log 2(Q));

based on the affine motion model of the processed adjacent picture block being a 4-parameter model, dHorY=−dVerX, and dVerY=dHorX;

Log 2( ) represents a function of taking a logarithm of 2, << represents left shift, >> represents right shift, P is a width of the processed adjacent picture block, and Q is a height of the processed adjacent picture block;

(vx0, vy0), (vx1, vy1), and (vx2, vy2) respectively represent horizontal components and vertical components of motion vectors of three control points of the to-be-processed picture block;

(vx4, vy4), (vx5, vy5), and (vx6, vy6) respectively represent horizontal components and vertical components of motion vectors of three control points of the processed adjacent picture block; and mvShift is determined based on control point motion vector resolution of the processed adjacent picture block.

16. The device according to claim 13, further comprising:
based on a bit depth of the adjusted control point motion vectors being greater than the first motion vector bit depth, clipping the adjusted control point motion vectors, so that the bit depth of the adjusted control point motion vectors is equal to the first motion vector bit depth.

17. The device according to claim 13, further comprising:
clipping the adjusted control point motion vectors, so that a bit depth of the adjusted control point motion vectors is equal to the first motion vector bit depth.

18. The device according to claim 12, wherein the method further comprises:
processing a motion vector resolution of the motion compensation unit to meet preset second motion vector resolution, and/or processing a motion vector bit depth of the motion compensation unit to meet preset second motion vector bit depth; and
storing a processed motion vector of the motion compensation unit.

19. The device according to claim 18, wherein the processed motion vector of the motion compensation unit is obtained according to the following formula:

MCUMV'=(MCUMV>>mvrShift2), wherein MCUMV' represents the processed motion vector of the motion compensation unit, MCUMV represents a motion vector of the motion compensation unit before processing, and mvrShift2 represents a second shift value.

20. The device according to claim 19, further comprising:
clipping a bit depth of the processed motion vector of the motion compensation unit, so that the bit depth of the processed motion vector of the motion compensation unit is equal to the second motion vector bit depth.

21. The device according to claim 19, further comprising:
when a bit depth of the processed motion vector of the motion compensation unit is greater than the second motion vector bit depth, clipping the processed motion vector of the motion compensation unit, so that the bit depth of the processed motion vector of the motion compensation unit is equal to the second motion vector bit depth.

22. The device according to claim 19, wherein
based on the second motion vector resolution being ¼ pixel accuracy and resolution of the MCUMV being ¹⁄₁₆ pixel accuracy, the second shift value is equal to 2;
based on the second motion vector resolution being ¼ pixel accuracy and the resolution of the MCUMV being ¼ pixel accuracy, the second shift value is equal to 0; and
based on the second motion vector resolution being ¼ pixel accuracy and the resolution of the MCUMV being ¹⁄₃₂ pixel accuracy, the second shift value is equal to 3.

23. The device according to claim 12, wherein the obtaining a reconstructed block of the to-be-processed picture block based on the motion vector of each motion compensation unit comprises:
performing motion compensation based on the motion vector of each motion compensation unit, to obtain a prediction block of the to-be-processed picture block; and
obtaining the reconstructed block of the to-be-processed picture block based on the prediction block and the motion vector of each motion compensation unit.

24. An inter prediction method, comprising:
determining that a prediction mode of a to-be-processed picture block is not an affine motion model-based merge mode;
obtaining control point motion vectors of the to-be-processed picture block, wherein the control point motion vectors have a preset first motion vector resolution and/or a first motion vector bit depth, wherein the obtaining control point motion vectors of the to-be-processed picture block comprises:
obtaining control point motion vector differences (CPMVDs) and the control point motion vector predictors (CPMVPs); and
based on a resolution of the CPMVDs being not equal to the first motion vector resolution, obtaining the control point motion vectors of the to-be-processed picture block based on the CPMVDs and a first shift value; or
based on a resolution of the CPMVPs being not equal to the first motion vector resolution, obtaining the control point motion vectors of the to-be-processed picture block based on the CPMVPs and a second shift value;

deriving a motion vector of each motion compensation unit in the to-be-processed picture block based on the control point motion vectors of the to-be-processed picture block; and obtaining a reconstructed block of the to-be-processed picture block based on the motion vector of each motion compensation unit in the to-be-processed picture block.

25. An inter prediction method, comprising:

determining that a prediction mode of a to-be-processed picture block is an affine motion model-based merge prediction mode;

obtaining control point motion vectors of the to-be-processed picture block;

adjusting the control point motion vectors to meet a preset first motion vector resolution and/or a first motion vector bit depth, wherein the adjusting the control point motion vectors comprises:
  based on a resolution of the control point motion vectors being not equal to the first motion vector resolution, obtaining the adjusted control point motion vectors based on the control point motion vectors and a first shift value;

deriving a motion vector of each motion compensation unit in the to-be-processed picture block based on adjusted control point motion vectors; and obtaining a reconstructed block of the to-be-processed picture block based on the motion vector of each motion compensation unit.

* * * * *